(12) United States Patent
Yoshioka

(10) Patent No.: US 7,468,691 B2
(45) Date of Patent: Dec. 23, 2008

(54) POSITIONING DEVICE, POSITIONING CONTROL METHOD, AND RECORDING MEDIUM

(75) Inventor: Hiroki Yoshioka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 55 days.

(21) Appl. No.: 11/790,861

(22) Filed: Apr. 27, 2007

(65) Prior Publication Data

US 2007/0252757 A1 Nov. 1, 2007

(30) Foreign Application Priority Data

| Apr. 27, 2006 | (JP) | ............................. 2006-123606 |
| Apr. 28, 2006 | (JP) | ............................. 2006-126177 |
| May 17, 2006 | (JP) | ............................. 2006-137618 |

(51) Int. Cl.
*G01S 5/14* (2006.01)

(52) U.S. Cl. .............................. 342/357.04; 342/357.12

(58) Field of Classification Search ............ 342/357.04, 342/357.12

See application file for complete search history.

(56) References Cited

U.S. PATENT DOCUMENTS

| 4,689,626 A | * | 8/1987 | Hori et al. ............... 342/357.12 |
| 6,236,673 B1 | * | 5/2001 | Julg ............................. 375/150 |

FOREIGN PATENT DOCUMENTS

| JP | 2000-266834 A | 9/2000 |
| JP | 2000-312163 A | 11/2000 |
| JP | 2002-122652 A | 4/2002 |
| JP | 2003-098244 A | 4/2003 |
| JP | 2004-501352 A | 1/2004 |
| JP | 2004-085222 A | 3/2004 |
| JP | 2005-024535 A | 1/2005 |
| WO | WO-01/79877 A2 | 10/2001 |

OTHER PUBLICATIONS

Dwarakanath V. Simili et al. "Code-Carrier Divergence Monitoring for the GPS Local Area Augmentation System" ION/IEEE Plans 2006, Apr. 25, 2006 Illinois Institute of Technology, Chicago, IL. pp. 483-493.

* cited by examiner

*Primary Examiner*—Gregory C Issing
(74) *Attorney, Agent, or Firm*—Global IP Counselors, LLP

(57) ABSTRACT

A positioning device includes a phase calculation section which performs a correlation process of a specific positioning base code replica and a positioning base code from a specific transmission source to calculate a present phase of the positioning base code, an estimated phase calculation section which calculates an estimated phase when estimating the present phase based on the phase used for preceding positioning, a Doppler shift of a frequency of a radio wave carrying the positioning base code, and an elapsed time from the preceding positioning, a phase difference evaluation section which determines whether or not a phase difference between the calculated present phase and the estimated phase is within a phase difference allowable range specified in advance, and a positioning section which locates a present position using the phase within the phase difference allowable range.

20 Claims, 40 Drawing Sheets

ESTIMATED FREQUENCY A1 =
TRANSMISSION FREQUENCY H1 + DOPPLER SHIFT H2

FIG. 12

EXPRESSION 1 : CPAe = CPA0 - (RELATIVE MOVING VELOCITY × dt)

SPEED OF LIGHT : $3 \times 10^8$ m/s
↓
TRANSMISSION FREQUENCY H1 OF RADIO WAVE S1 :
1,575.42MHz=$1,575.42 \times 10^6$Hz
↓
SPEED OF LIGHT/TRANSMISSION FREQUENCY H1=a=0.19
↓
RELATIVELY MOVING AT DOPPLER SHIFT 1 Hz = 0.19 m/s

FIG. 23

ESTIMATED FREQUENCY A2 =
TRANSMISSION FREQUENCY H1 + DOPPLER SHIFT H2

MEASUREMENTS : GPS SATELLITE 12a

|  | fB1 | CPB1 | PBmax1 | PBnoise1 |
|---|---|---|---|---|
| FREQUENCY SEQUENCE F1 | FREQUENCY fB11a | CODE PHASE CPB11a | PBmax11a | PBnoise11a |
| FREQUENCY SEQUENCE F2 | FREQUENCY fB12a | CODE PHASE CPB12a | PBmax12a | PBnoise12a |
| FREQUENCY SEQUENCE F3 | FREQUENCY fB13a | CODE PHASE CPB13a | PBmax13a | PBnoise13a |

MEASUREMENTS: : GPS SATELLITE 12a

|  | fB0 | CPB0 | PBmax0 | PBnoise0 |
|---|---|---|---|---|
| FREQUENCY SEQUENCE F1 | FREQUENCY fB01a | CODE PHASE CPB01a | PBmax01a | PBnoise01a |
| FREQUENCY SEQUENCE F2 | FREQUENCY fB02a | CODE PHASE CPB02a | PBmax02a | PBnoise02a |
| FREQUENCY SEQUENCE F3 | FREQUENCY fB03a | CODE PHASE CPB03a | PBmax03a | PBnoise03a |

FIG. 27

EXPRESSION 2 : CPBe = CPB0 − (RELATIVE MOVING VELOCITY × dt)

SPEED OF LIGHT : $3 \times 10^8$ m/s

TRANSMISSION FREQUENCY H1 OF RADIO WAVE S1 :
1,575.42MHz=$1,575.42 \times 10^6$Hz

SPEED OF LIGHT/TRANSMISSION FREQUENCY H1=a=0.19

RELATIVELY MOVING AT DOPPLER SHIFT 1 Hz = 0.19 m/s

FIG. 28
ESTIMATED CODE PHASE CPBe : GPS SATELLITE 12a
|  | CPBe |
|---|---|
| FREQUENCY SEQUENCE F1 | CPBe1a |
| FREQUENCY SEQUENCE F2 | CPBe2a |
| FREQUENCY SEQUENCE F3 | CPBe3a |
2164
FIG. 29
GPS SATELLITE 12a
$|CPB11a - CPBe1a| = dCPB11a$
$|CPB12a - CPBe2a| = dCPB12a$
$|CPB13a - CPBe3a| = dCPB13a$
$dCPB11a < dCPB12a < dCPB13a$
SELECTS dCPB11a

| GPS SATELLITE | SELECTED CODE PHASE CP1s |
|---|---|
| GPS SATELLITE 12a | CP1sa |
| GPS SATELLITE 12b | CP1sb |
| GPS SATELLITE 12c | CP1sc |
| GPS SATELLITE 12d | CP1sd |

| GPS SATELLITE | POSITIONING CODE PHASE CPB1f |
|---|---|
| GPS SATELLITE 12a | CPB1fa |
| GPS SATELLITE 12b | CPB1fb |
| GPS SATELLITE 12c | CPB1fc |
| GPS SATELLITE 12d | CPB1fd |

FIG. 44

ESTIMATED FREQUENCY A3 =
TRANSMISSION FREQUENCY H1 + DOPPLER SHIFT H2

FIRST PHASE WIDTH W1 = 1/32ND OF CHIP
FIRST SAMPLING PHASE SC1 =
PHASES AT INTERVALS OF FIRST PHASE WIDTH W1

FIG. 47

| | POSITIONING MODE (130a) | DRIFT TENDENCY (130b) | TRACKING SATELLITE COUNT (130c) | STRONG SATELLITE EXISTENCE (130d): PRESENCE OR ABSENCE OF SATELLITE WITH XPR OF 0.7 OR MORE (STRONG SATELLITE) | WEAK SATELLITE EXISTENCE (130e): PRESENCE OR ABSENCE OF SATELLITE WITH XPR OF 0.4 OR LESS (WEAK SATELLITE) | STRONG SATELLITE MAJORITY (130f): ARE ALL SATELLITES TRACKED STRONG SATELLITES? | WEAK SATELLITE MAJORITY (130g): ARE ALL SATELLITES TRACKED WEAK SATELLITES? | ELAPSED ACCUMULATION TIME (130h): IS ACCUMULATION TIME 12 SECONDS OR LESS? | CODE PHASE THRESHOLD VALUE β3 |
|---|---|---|---|---|---|---|---|---|---|
| Cond1 | NORMAL MODE | PRESENT | 8 OR MORE | PRESENT | ABSENT | YES | NO | YES | 19m |
| Cond2 | NORMAL MODE | ABSENT | 8 OR MORE | PRESENT | ABSENT | YES | NO | YES | 19m |
| Cond3 | NORMAL MODE | PRESENT | 8 OR MORE | PRESENT | ABSENT | YES | NO | NO | 25m |
| Cond4 | NORMAL MODE | ABSENT | 8 OR MORE | PRESENT | ABSENT | YES | NO | NO | 25m |
| Cond5 | NORMAL MODE | PRESENT | 7 | PRESENT | PRESENT | YES | NO | – | 39m |
| Cond6 | NORMAL MODE | ABSENT | 7 | PRESENT | PRESENT | YES | NO | – | 39m |
| Cond7 | NORMAL MODE | PRESENT | 3 OR MORE AND 6 OR LESS | PRESENT | ABSENT | YES | NO | YES | 52m |
| Cond8 | NORMAL MODE | ABSENT | 3 OR MORE AND 6 OR LESS | ABSENT | ABSENT | NO | NO | – | 52m |
| Cond9 | NORMAL MODE | PRESENT | 3 OR MORE AND 6 OR LESS | ABSENT | ABSENT | NO | NO | – | 52m |
| Cond10 | NORMAL MODE | PRESENT | 3 OR MORE AND 6 OR LESS | ABSENT | PRESENT | NO | YES | – | 80m |
| Cond11 | NORMAL MODE | ABSENT | 3 OR MORE AND 6 OR LESS | ABSENT | PRESENT | NO | YES | – | 80m |
| Cond12 | NORMAL MODE | PRESENT | 2 OR LESS | – | – | – | – | – | 80m |
| Cond13 | NORMAL MODE | ABSENT | 2 OR LESS | – | – | – | – | – | 80m |
| Cond14 | HIGH SENSITIVITY MODE | PRESENT | 8 OR MORE | PRESENT | ABSENT | YES | NO | YES | 19m |
| Cond15 | HIGH SENSITIVITY MODE | PRESENT | 8 OR MORE | PRESENT | ABSENT | YES | NO | NO | 25m |
| Cond16 | HIGH SENSITIVITY MODE | PRESENT | 7 | PRESENT | PRESENT | YES | NO | – | 39m |
| Cond17 | HIGH SENSITIVITY MODE | PRESENT | 3 OR MORE AND 6 OR LESS | ABSENT | ABSENT | NO | NO | – | 52m |
| Cond18 | HIGH SENSITIVITY MODE | PRESENT | 3 OR MORE AND 6 OR LESS | ABSENT | ABSENT | NO | NO | – | 52m |
| Cond19 | HIGH SENSITIVITY MODE | PRESENT | 3 OR MORE AND 6 OR LESS | ABSENT | PRESENT | NO | YES | – | 80m |
| Cond20 | HIGH SENSITIVITY MODE | PRESENT | 2 OR LESS | – | – | – | – | – | 80m |
| Cond21 | HIGH SENSITIVITY MODE | ABSENT | – | – | – | – | – | – | 80m |
| Cond22 | MOVEMENT MODE | – | – | – | – | – | – | – | 80m |

POSITIONING DEVICE, POSITIONING CONTROL METHOD, AND RECORDING MEDIUM

Japanese Patent Application No. 2006-123606 filed on Apr. 27, 2006, Japanese Patent Application No. 2006-126177 filed on Apr. 28, 2006, and Japanese Patent Application No. 2006-137618 filed on May 17, 2006, are hereby incorporated by reference in their entirety.

BACKGROUND OF THE INVENTION

The present invention relates to a positioning device which utilizes radio waves from transmission sources, a positioning control method, and a recording medium.

A positioning system has been used in practice which locates the present position of a GPS receiver utilizing a satellite navigation system such as a global positioning system (GPS).

The GPS receiver receives a clear and acquisition or coarse and access (C/A) code which is one type of pseudo-random noise code (hereinafter called "PN code") carried on a radio wave from a GPS satellite (hereinafter called "satellite radio wave") based on a navigation message indicating the orbit of the GPS satellite and the like (including almanac (approximate satellite orbital information), ephemeris (precise satellite orbital information), and the like). The C/A code is a code which forms the basis for positioning.

The GPS receiver determines the GPS satellite which has transmitted the received C/A code, and calculates the distance (pseudo-range) between the GPS satellite and the GPS receiver based on the phase of the C/A code (code phase), for example. The GPS receiver locates the position of the GPS receiver based on the pseudo-range between the GPS receiver and each of three or more GPS satellites and the position of each GPS satellite in the satellite orbit. For example, the C/A code has a bit rate of 1.023 Mbps and a code length of 1023 chips. Therefore, it is considered that the C/A codes line up in units of about 300 kilometers (km) over which a radio wave advances in 1 millisecond (ms). Therefore, the pseudo-range can be calculated by calculating the number of C/A codes between the GPS satellite and the GPS receiver from the position of the GPS satellite in the satellite orbit and the approximate position of the GPS receiver. In more detail, the pseudo-range can be calculated by calculating one cycle (1023 chips) of the C/A code (integer portion of the C/A code), and specifying the phase of the C/A code (fraction portion of the C/A code). The integer portion of the C/A code can be estimated when the approximate position of the GPS receiver has a specific accuracy (e.g. 150 km or less). Therefore, the GPS receiver can calculate the pseudo-range by specifying the phase of the C/A code.

The GPS receiver correlates the received C/A code with a C/A code replica generated by the GPS receiver, accumulates the correlation values, and specifies the phase of the C/A code when the correlation cumulative value reaches a specific level. The GPS receiver performs the correlation process while changing the phase and the frequency of the C/A code replica.

However, a sufficient signal strength cannot be obtained when the radio wave strength of the satellite radio wave carrying the C/A code is weak, whereby it becomes difficult to specify the phase of the C/A code.

In order to deal with this problem, technology has been proposed which coherently (synchronously) and successively combines the process results of segments of a received signal until a threshold signal-to-noise ratio (SNR) is achieved (e.g. JP-T-2004-501352).

However, since the GPS satellite and the GPS receiver move relatively, the arrival frequency of the satellite radio wave which reaches the GPS receiver changes due to the Doppler shift.

When the signal strength is weak, it may be difficult to synchronize the synchronization frequency of the GPS receiver with the arrival frequency which continuously changes.

When the synchronization frequency of the GPS receiver differs from the arrival frequency, the accuracy of the phase of the C/A code deteriorates even if the correlation cumulative value reaches a specific level. Therefore, the accuracy of the located position may deteriorate when locating the position using the above phase.

Accordingly, the present invention may provide a positioning device, a positioning control method, and a recording medium storing a positioning control program capable of verifying the accuracy of the phase of the positioning base code and accurately locating the position under a weak electric field in which the radio wave strength is weak.

SUMMARY

According to one aspect of the invention, there is provided a positioning device comprising:

a phase calculation section which performs a correlation process of a specific positioning base code replica and a positioning base code from a specific transmission source to calculate a present phase of the positioning base code;

an estimated phase calculation section which calculates an estimated phase when estimating the present phase based on the phase used during preceding positioning, a Doppler shift of a frequency of a radio wave carrying the positioning base code, and an elapsed time from the preceding positioning;

a phase difference evaluation section which determines whether or not a phase difference between the phase calculated by the phase calculation section and the estimated phase is within a specific phase difference allowable range; and a positioning section which locates a present position using the phase corresponding to the phase difference within the phase difference allowable range.

According to another aspect of the invention, there is provided a positioning control method comprising:

a phase calculation step of performing a correlation process of a specific positioning base code replica and a positioning base code from a specific transmission source to calculate a present phase of the positioning base code;

an estimated phase calculation step of calculating an estimated phase when estimating the present phase based on the phase used during preceding positioning, a Doppler shift of a frequency of a radio wave carrying the positioning base code, and an elapsed time from the preceding positioning;

a phase difference evaluation step of determining whether or not a phase difference between the phase calculated by the phase calculation section and the estimated phase is within a specific phase difference allowable range; and a positioning step of locating a present position using the phase corresponding to the phase difference within the phase difference allowable range.

According to a further aspect of the invention, there is provided a computer-readable recording medium having a positioning control program recorded thereon, the positioning control program causing a computer to execute:

a phase calculation step of performing a correlation process of a specific positioning base code replica and a positioning base code from a specific transmission source to calculate a present phase of the positioning base code;

an estimated phase calculation step of calculating an estimated phase when estimating the present phase based on the phase used for preceding positioning, a Doppler shift of a frequency of a radio wave carrying the positioning base code, and an elapsed time from the preceding positioning;

a phase difference evaluation step of determining whether or not a phase difference between the phase calculated in the phase calculation step and the estimated phase is within a specific phase difference allowable range; and a positioning step of locating a present position using the phase corresponding to the phase difference within the phase difference allowable range.

BRIEF DESCRIPTION OF THE SEVERAL VIEWS OF THE DRAWING

FIG. 12 is a view illustrative of an estimated code phase calculation program according to the first embodiment.

FIG. 23 is a view illustrative of an estimated frequency calculation program according to the second embodiment.

FIG. 25 is a view showing an example of present measurement information according to the second embodiment.

FIG. 26 is a view showing an example of preceding measurement information according to the second embodiment.

FIG. 27 is a view illustrative of an estimated code phase calculation program according to the second embodiment.

FIG. 28 is a view showing an example of estimated code phase information according to the second embodiment.

FIG. 29 is a view illustrative of a code phase selection program according to the second embodiment.

FIG. 30 is a view showing an example of selected code phase information according to the second embodiment.

FIG. 32 is a view showing an example of positioning code phase information according to the second embodiment.

FIG. 44 is a view illustrative of an estimated frequency calculation program according to the third embodiment.

FIG. 47 is a view illustrative of a code phase threshold value setting program according to the third embodiment.

DETAILED DESCRIPTION OF THE EMBODIMENT

Figure 1:
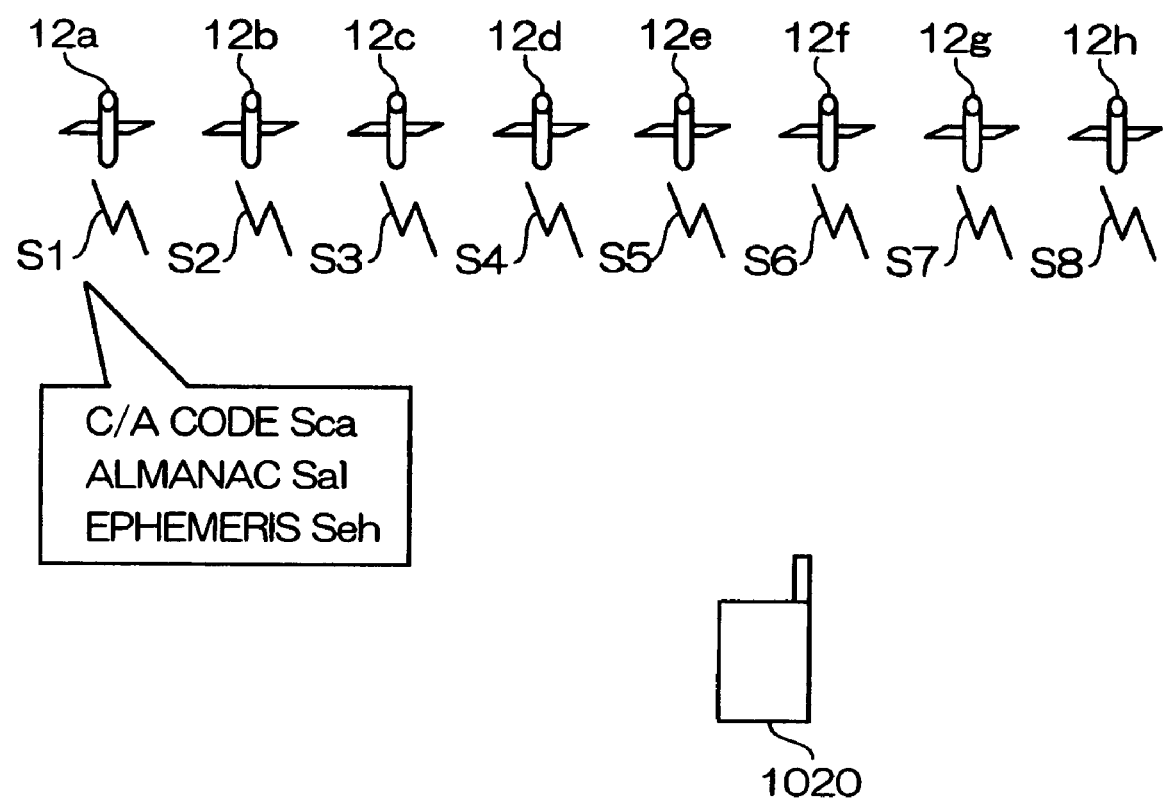
FIG. 1 is a schematic view showing a terminal and the like according to a first embodiment.

According to one embodiment of the invention, there is provided a positioning device comprising:

a phase calculation section which performs a correlation process of a specific positioning base code replica and a positioning base code from a specific transmission source to calculate a present phase of the positioning base code;

an estimated phase calculation section which calculates an estimated phase when estimating the present phase based on the phase used during preceding positioning, a Doppler shift of a frequency of a radio wave carrying the positioning base code, and an elapsed time from the preceding positioning;

a phase difference evaluation section which determines whether or not a phase difference between the phase calculated by the phase calculation section and the estimated phase is within a specific phase difference allowable range; and a positioning section which locates a present position using the phase corresponding to the phase difference within the phase difference allowable range.

According to this configuration, since the positioning device includes the phase difference evaluation section, the positioning device can determine whether or not the phase difference is within the phase difference allowable range. Specifically, the positioning device can verify the accuracy of the phase.

Since the positioning device includes the positioning section, the positioning device can locate the present position using the phase corresponding to the phase difference within the phase difference allowable range.

Therefore, the positioning device can verify the accuracy of the phase of the positioning base code and accurately locate the position under a weak electric field in which the radio wave strength is weak.

In the positioning device, the phase calculation section may calculate the phase using a plurality of frequency sequences; and the phase difference evaluation section may determine whether or not a phase difference between the phase calculated using one of the frequency sequences of which a signal strength of the positioning base code is maximum and the estimated phase is within the phase difference allowable range.

According to this configuration, the phase calculation section calculates the phase using a plurality of frequency sequences. The accuracy of the reception frequency of one of the frequency sequences should be higher than the accuracy of the reception frequencies of other frequency sequences. Therefore, the positioning device is likely to be able to calculate the phase at the reception frequency with high accuracy.

In general, it is estimated that the accuracy of the reception frequency calculated using the frequency sequence with the highest signal strength has the highest reliability. Therefore, it is generally estimated that the phase calculated using the frequency sequence with the highest signal strength has an accuracy higher than the accuracy of the phases calculated using other frequency sequences.

However, the reception frequency calculated using the frequency sequence with the highest signal strength does not necessarily have the highest reliability particularly under a weak electric field.

Since the positioning device can verify the accuracy of the phase calculated using the frequency sequence of which the signal strength of the positioning base code is the highest and exclude the phase from positioning, the positioning device can prevent a located position with poor accuracy from being calculated under a weak electric field in which the radio wave strength is weak.

In the positioning device, the phase calculation section may calculate the phase of the positioning base code by performing the correlation process of the specific positioning base code replica and the positioning base code from the transmission source using at least one frequency sequence in units of the transmission sources;

the positioning section may include:

a phase selection section which selects the phase of which the phase difference is minimum from the phases corresponding to the phase difference within the phase difference allowable range as a selected phase in units of the transmission sources;

a selected phase first evaluation section which determines whether or not a signal strength of the selected phase is maximum; and a selected phase second evaluation section which determines whether or not a number of times that the phase calculated using the frequency sequence to which the selected phase belongs has continuously fallen within the phase difference allowable range is within a predetermined count range specified in advance; and the positioning section may locate the present position using the selected phase when a determination result of the selected phase first evaluation section and/or a determination result of the selected phase second evaluation section is YES.

According to this configuration, since the positioning device includes the phase difference evaluation section, the positioning device can determine whether or not the phase difference is within the phase difference allowable range. Specifically, the positioning device can verify the accuracy of the phase.

Since the positioning device includes the phase selection section, the positioning device can calculate the selected phase in units of transmission sources. Since the selected phase is the phase with the minimum phase difference, the selected phase has accuracy higher than the accuracy of the phases calculated using other frequency sequences.

Since the positioning device includes the selected phase first evaluation section, the positioning device can determine whether or not the signal strength of the selected phase is maximum. If the signal strength of the selected phase is maximum, it is considered that the selected phase has a high accuracy in comparison with other phases. Since the positioning device includes the positioning section, the positioning device can locate the present position when the determination result of the selected phase first evaluation section is YES.

Therefore, the positioning device can verify the accuracy of the phase of the positioning base code and accurately locate the position under a weak electric field in which the radio wave strength is weak.

The phase with the minimum phase difference does not necessarily have the maximum signal strength under a weak electric field. Specifically, even if the selected phase has a high accuracy in comparison with other phases, the signal strength of the selected phase may not be maximum. Therefore, even if the signal strength is not maximum, it is desirable to use the selected phase for positioning as long as the accuracy of the selected phase can be verified.

Since the positioning device includes the selected phase second evaluation section, the positioning device can locate the present position using the selected phase when the number of times that the phase calculated using the frequency sequence, to which the selected phase belongs, has continuously fallen within the phase difference allowable range is within the predetermined count range.

Therefore, the positioning device can locate the position using the phase with a high accuracy, even if the determination result of the selected phase first evaluation section is NO.

In the positioning device, the estimated phase calculation section may calculate the estimated phase using the phase obtained during the preceding positioning and obtained when the correlation process has completed.

Since the signal-to-noise ratio (SNR) is increased so that the positioning base code can be more clearly distinguished from noise when the correlation process has been completed in comparison with the time when the correlation process has commenced, the phase has a high accuracy.

Since the estimated phase calculation section calculates the estimated phase using the phase obtained during the preceding positioning and obtained when the correlation process has been completed, the estimated phase with a high accuracy can be calculated.

Specifically, the positioning device can calculate the highly accurate estimated phase for accurate positioning.

The positioning device may comprise:

a reception frequency determination section which specifies a reception frequency when receiving the radio wave carrying the positioning base code;

a frequency difference evaluation section which determines whether or not a frequency difference between the reception frequency during the preceding positioning and the present reception frequency is within a frequency difference allowable range specified in advance; and a phase exclusion section which excludes the phase of the positioning base code corresponding to the frequency difference outside the frequency difference allowable range from positioning.

According to this configuration, since the positioning device includes the phase exclusion section, the positioning device can exclude the phase of the positioning base code corresponding to the frequency difference outside the frequency difference allowable range from positioning.

This means that the positioning device can verify not only the accuracy of the phase of the positioning base code, but also the accuracy of the reception frequency when calculating the phase. The higher the accuracy of the reception frequency, the higher the accuracy of the phase.

Therefore, the positioning device can verify the accuracy of the phase of the positioning base code and more accurately locate the position under a weak electric field in which the radio wave strength is weak.

The positioning device may comprise:

a reception frequency determination section which specifies a reception frequency when receiving the radio wave carrying the positioning base code;

a frequency difference evaluation section which determines whether or not a frequency difference between the reception frequency during the preceding positioning and the present reception frequency is within a frequency difference allowable range specified in advance; and a phase exclusion section which excludes the phase of the positioning base code corresponding to the frequency difference outside the frequency difference allowable range from positioning;

wherein the frequency sequences may differ by a frequency interval specified in advance; and wherein the frequency difference allowable range may be specified by a threshold value less than the frequency interval.

According to this configuration, when the frequency sequence with the largest signal strength has changed, the phase can be excluded from positioning. This means that the condition is used whereby the phase is used for positioning when the frequency sequence continuously has the highest signal strength.

Therefore, since the phase calculated using the frequency sequence which follows the Doppler shift of the frequency of the radio wave which reaches the positioning device in comparison with other frequency sequences can be used for positioning, the position can be more accurately determined under a weak electric field in which the radio wave strength is weak.

The positioning device may comprise:

a phase difference allowable range determination section which determines the phase difference allowable range based on a reception state of the positioning base code;

wherein the phase difference evaluation section may determine whether or not the phase difference is within the determined phase difference allowable range.

According to this configuration, since the positioning device includes the phase difference allowable range determination section, the positioning device can determine the phase difference allowable range based on the reception state of the positioning base code.

Since the positioning device includes the phase difference evaluation section, the positioning device can determine whether or not the phase difference is within the phase difference allowable range. Therefore, the positioning device can verify the accuracy of the phase.

Since the positioning device includes the positioning section, the positioning device can locate the present position using the phase corresponding to the phase difference within the phase difference allowable range.

Therefore, the positioning device can verify the accuracy of the phase of the positioning base code and accurately locate the position under a weak electric field in which the radio wave strength is weak.

In the positioning device, the reception state may include a number of the transmission sources from which the positioning device receives the positioning base code.

According to this configuration, the positioning device can use only the code phase with a relatively high accuracy for positioning by reducing the phase difference allowable range as the number of transmission sources from which the positioning device receives the positioning base code increases, for example.

Therefore, the positioning device can locate the position using the phase with relatively high accuracy under a weak electric field in which the signal strength is weak.

In the positioning device, the reception state may include a signal strength of the positioning base code received by the positioning device.

According to this configuration, the positioning device can use only the code phase with relatively high accuracy for positioning by reducing the phase difference allowable range as the number of transmission sources of which the positioning base code received by the positioning device has a high signal strength increases, for example.

Therefore, the positioning device can locate the position using the phase with a relatively high accuracy under a weak electric field in which the signal strength is weak.

In the positioning device, the reception state may include information indicating whether or not a drift of a reference clock of the positioning device is within a drift allowable range specified in advance.

According to this configuration, the positioning device can more accurately calculate the phase as the drift decreases.

For example, the positioning device can use only the code phase with a relatively high accuracy for positioning by reducing the phase difference allowable range when the drift is within the drift allowable range.

Therefore, the positioning device can locate the position using the phase with relatively high accuracy under a weak electric field in which the signal strength is weak.

In the positioning device, the reception state may include information indicating an elapsed time from commencement of the correlation process.

According to this configuration, the phase of the positioning base code can be more accurately specified as the elapsed time increases. For example, the positioning device can use only the code phase with relatively high accuracy for positioning by reducing the phase difference allowable range as the elapsed time increases.

Therefore, the positioning device can locate the position using the phase with a relatively high accuracy under a weak electric field in which the signal strength is weak.

In the positioning device, the phase difference allowable range determination section may decrease the phase difference allowable range as a number of the transmission sources from which the positioning device receives the positioning base code increases, and may increase the phase difference allowable range as the number of the transmission sources from which the positioning device receives the positioning base code decreases.

According to this configuration, since the positioning device reduces the phase difference allowable range as the number of transmission sources from which the positioning device receives the positioning base code increases, the positioning device locate the position using the phase with a high accuracy.

Since the positioning device increases the phase difference allowable range as the number of transmission sources from which the positioning device receives the positioning base code decreases, the possibility that the positioning device can calculate the located position is increased.

In the positioning device, the transmission source may be a satellite positioning system (SPS) satellite.

According to another embodiment of the invention, there is provided a positioning control method comprising:

a phase calculation step of performing a correlation process of a specific positioning base code replica and a positioning base code from a specific transmission source to calculate a present phase of the positioning base code;

an estimated phase calculation step of calculating an estimated phase when estimating the present phase based on the phase used during preceding positioning, a Doppler shift of a frequency of a radio wave carrying the positioning base code, and an elapsed time from the preceding positioning;

a phase difference evaluation step of determining whether or not a phase difference between the phase calculated in the phase calculation step and the estimated phase is within a specific phase difference allowable range; and a positioning step of locating a present position using the phase corresponding to the phase difference within the phase difference allowable range.

In the positioning control method, the phase calculation step may be a step of calculating the phase of the positioning base code by performing the correlation process of the specific positioning base code replica and the positioning base code from the transmission source using at least one frequency sequence in units of the transmission sources;

the positioning step may include:

a phase selection step of selecting the phase of which the phase difference is minimum from the phases corresponding to the phase difference within the phase difference allowable range as a selected phase in units of the transmission sources;

a selected phase first evaluation step of determining whether or not the signal strength of the selected phase is maximum; and a selected phase second evaluation step of determining whether or not a number of times that the phase calculated using the frequency sequence to which the selected phase belongs has continuously fallen within the phase difference allowable range is within a predetermined count range specified in advance; and the positioning step may be a step of locating the present position using the selected phase when a determination result of the selected phase first evaluation step and/or a determination result of the selected phase second evaluation step is YES.

The positioning control method may comprise:

a phase difference allowable range determination step of determining the phase difference allowable range based on a reception state of the positioning base code;

wherein the phase difference evaluation step may be a step of determining whether or not the phase difference is within the determined phase difference allowable range.

According to a further embodiment of the invention, there is provided a computer-readable recording medium having a positioning control program recorded thereon, the positioning control program causing a computer to execute:

a phase calculation step of performing a correlation process of a specific positioning base code replica and a positioning base code from a specific transmission source to calculate a present phase of the positioning base code;

an estimated phase calculation step of calculating an estimated phase when estimating the present phase based on the phase used for preceding positioning, a Doppler shift of a frequency of a radio wave carrying the positioning base code, and an elapsed time from the preceding positioning;

a phase difference evaluation step of determining whether or not a phase difference between the phase calculated in the phase calculation step and the estimated phase is within a specific phase difference allowable range; and a positioning step of locating a present position using the phase corresponding to the phase difference within the phase difference allowable range.

In the recording medium, the phase calculation step may be a step of calculating the phase of the positioning base code by performing the correlation process of the specific positioning base code replica and the positioning base code from the transmission source using at least one frequency sequence in units of the transmission sources;

the positioning step may include:

a phase selection step of selecting the phase of which the phase difference is minimum from the phases corresponding to the phase difference within the phase difference allowable range as a selected phase in units of the transmission sources;

a selected phase first evaluation step of determining whether or not the signal strength of the selected phase is maximum; and a selected phase second evaluation step of determining whether or not a number of times that the phase calculated using the frequency sequence to which the selected phase belongs has continuously fallen within the phase difference allowable range is within a predetermined count range specified in advance; and the positioning step may be a step of locating the present position using the selected phase when a determination result of the selected phase first evaluation step and/or a determination result of the selected phase second evaluation step is YES.

In the recording medium, the positioning control program may cause the computer to execute a phase difference allowable range determination step of determining the phase difference allowable range based on a reception state of the positioning base code; and the phase difference evaluation step may be a step of determining whether or not the phase difference is within the determined phase difference allowable range.

Preferred embodiments of the invention are described below in detail with reference to the drawings.

The following embodiments illustrate specific preferred embodiments of the invention and are provided with various technologically preferred limitations. Note that the scope of the invention is not limited to the following embodiments unless there is a description limiting the invention.

The following description generally illustrates three embodiments. These embodiments include common items. The common items are repeatedly described in order to clarify that a terminal according to each embodiment can be independently configured.

First Embodiment

FIG. 1 is a schematic view showing a terminal 1020 and the like according to a first embodiment.

As shown in FIG. 1, the terminal 1020 can receive radio waves S1, S2, S3, S4, S5, S6, S7, and S8 from global positioning system (GPS) satellites (positioning satellites) 12a, 12b, 12c, 12d, 12e, 12f, 12g, and 12h, for example. The GPS satellites 12a and the like exemplify a transmission source. The transmission source is not limited to the GPS satellite insofar as the transmission source is a satellite positioning system (SPS) satellite.

Various codes are carried on the radio waves S1 and the like. A C/A code Sca is one of such codes. The C/A code Sca is a signal having a bit rate of 1.023 Mbps and a bit length of 1023 bits (=1 msec). The C/A code Sca includes 1023 chips. The terminal 1020 exemplifies a positioning device which locates the present position, and locates the present position using the C/A code. The C/A code Sca exemplifies a positioning base code.

As information carried on the radio waves S1 and the like, an almanac Sal and an ephemeris Seh can be given. The almanac Sal is information indicating the approximate satellite orbits of all of the GPS satellites 12a and the like, and the ephemeris Seh is information indicating the precise satellite orbit of each of the GPS satellites 12a and the like. The almanac Sal and the ephemeris Seh are generically called a navigation message.

The terminal 1020 can locate the present position by specifying the phases of the C/A codes from three or more GPS satellites 12a and the like, for example.

Figure 2:
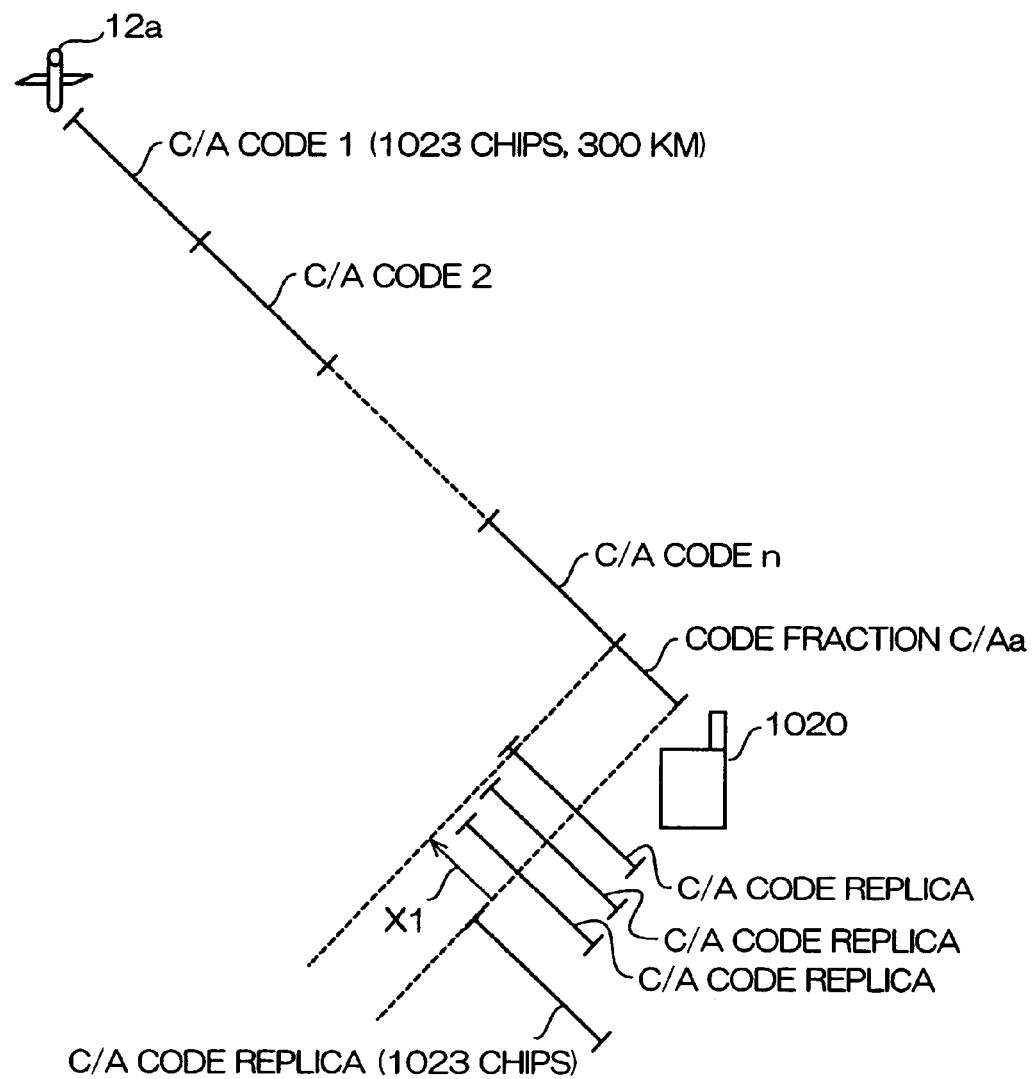
FIG. 2 is a schematic view showing a positioning method according to the first embodiment.

FIG. 2 is a schematic view showing an example of a positioning method.

As shown in FIG. 2, it may be considered that the C/A codes continuously line up between the GPS satellite 12a and the terminal 1020, for example. Since the distance between the GPS satellite 12a and the terminal 1020 is not necessarily a multiple of the length (300 kilometers (km)) of the C/A code, a code fraction C/Aa may exist. Specifically, a portion of a multiple of the C/A code and a fraction portion may exist between the GPS satellite 12a and the terminal 1020. The total length of the portion of a multiple of the C/A code and the fraction portion is the pseudo-range. The terminal 1020 locates the position using the pseudo-ranges for three or more GPS satellites 12a and the like.

In this embodiment, the fraction portion C/Aa of the C/A code is called a "code phase". The code phase may be indicated by the number of the chip included in the 1023 chips of the C/A code, or may be converted into distance, for example. When calculating the pseudo-range, the code phase is converted into distance.

The position of the GPS satellite 12a in the orbit can be calculated using the ephemeris Seh. The portion of a multiple of the C/A code can be specified by calculating the distance between the position of the GPS satellite 12a in the orbit and an initial position QA0 described later, for example. Since the length of the C/A code is 300 kilometers (km), the position error of the initial position QA0 must be 150 kilometers (km) or less.

As shown in FIG. 2, a correlation process is performed while moving the phase of a C/A code replica in the direction indicated by the arrow X1, for example. The terminal 1020 performs the correlation process while changing the synchronization frequency. The correlation process includes a coherent process and an incoherent process described later.

The phase having the maximum correlation cumulative value is the code fraction C/Aa.

Note that the terminal 1020 may locate the position using a radio wave from a portable telephone base station or the like, differing from the first embodiment. The terminal 1020 may locate the position by receiving a radio wave through a local area network (LAN), differing from the first embodiment.

Figure 3:
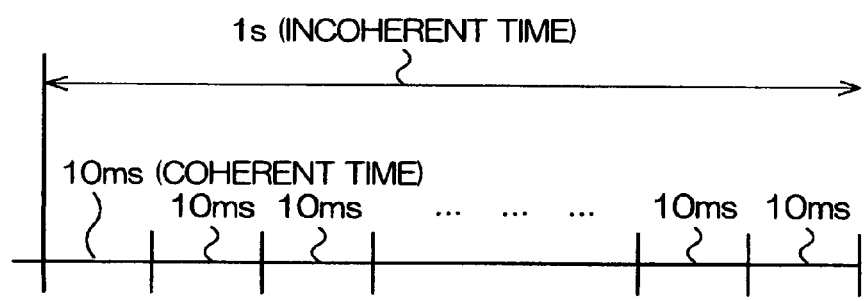
FIG. 3 is a view illustrative of a correlation process according to the first embodiment.

FIG. 3 is a view illustrative of the correlation process.

The coherent process is a process of correlating the C/A code received by the terminal 1020 with the C/A code replica. The C/A code replica is a code generated by the terminal 1020. The C/A code replica exemplifies a positioning base code replica.

For example, when the coherent time is 10 msec, as shown in FIG. 3, the correlation value between the C/A code synchronously accumulated over 10 msec and the C/A code replica and the like are calculated. The correlated phase (code phase) and the correlation value are output as a result of the coherent process.

The incoherent process is a process of calculating the correlation cumulative value (incoherent value) by accumulating the correlation values as the coherent results.

The code phase output by the coherent process and the correlation cumulative value are output as a result of the correlation process.

Figure 4:
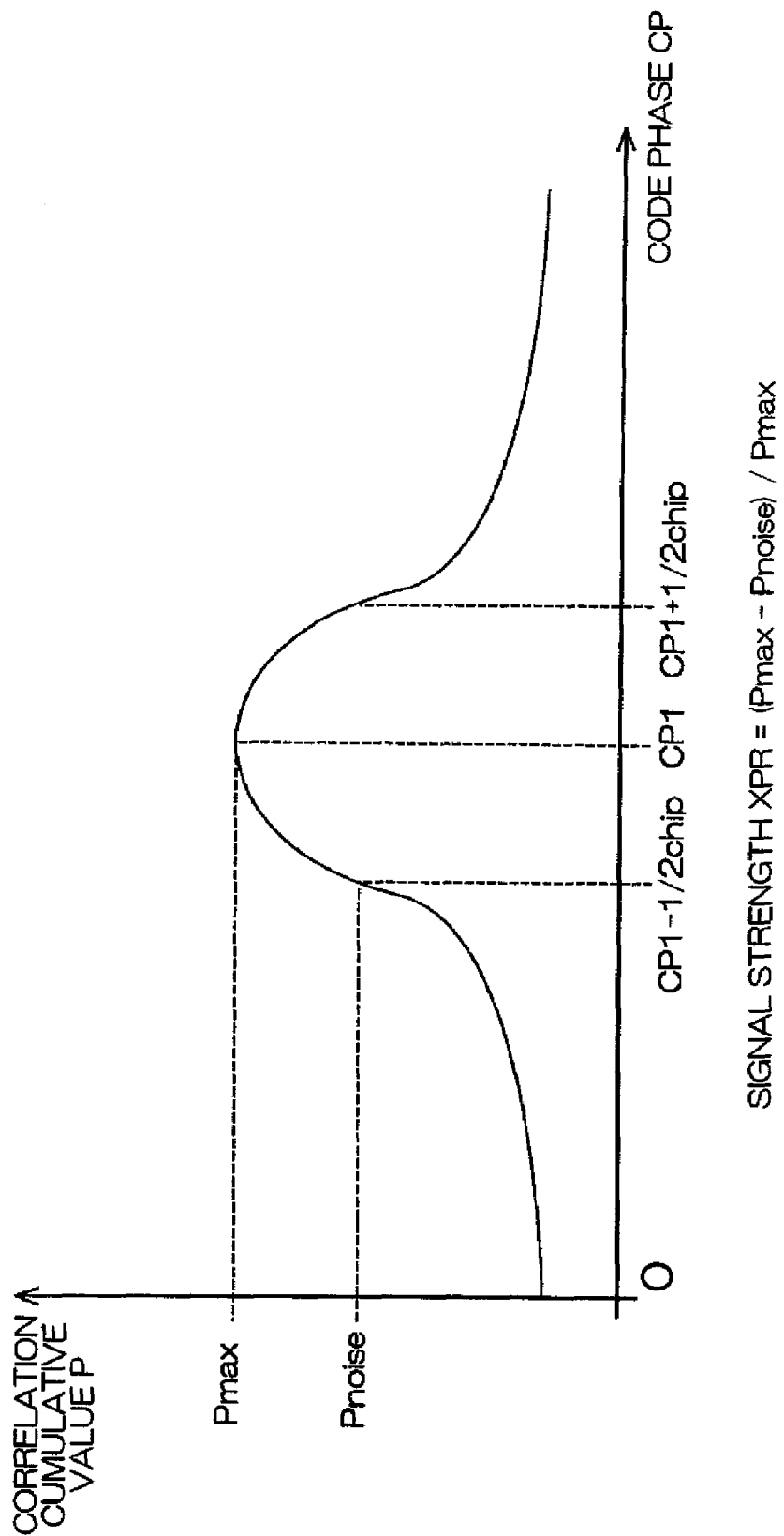
FIG. 4 is a view showing an example of the relationship between a correlation cumulative value and a code phase according to the first embodiment.

FIG. 4 is a view showing an example of the relationship between the correlation cumulative value and the code phase.

A code phase CP1 corresponding to the maximum correlation cumulative value Pmax shown in FIG. 4 is the code phase of the C/A code replica (i.e. the code phase of the C/A code).

The terminal 1020 sets the correlation cumulative value of one of the code phases at an interval of half of the chip from the code phase CP1 having a smaller correlation cumulative value to be a correlation cumulative value Pnoise of noise, for example.

The terminal 1020 specifies a value obtained by dividing the difference between the correlation cumulative values Pmax and Pnoise by the correlation cumulative value Pmax as a signal strength XPR. The signal strength XPR exemplifies a signal strength.

The terminal 1020 sets the code phase CP1 to be a candidate for the code phase used for positioning when the signal strength XPR is 0.2 or more, for example. This code phase is hereinafter also called a "candidate code phase". The candidate code phase is a candidate for the code phase used for positioning, and the terminal 1020 does not necessarily use the candidate code phase for positioning.

Figure 5:
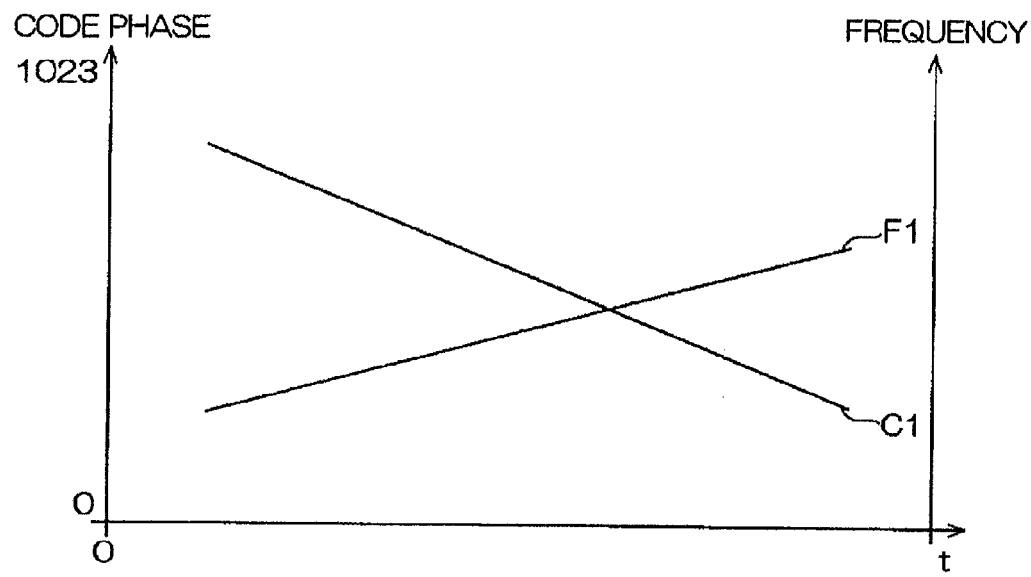
FIG. 5 is a view showing an example of the relationship between a candidate code phase and the passage of time and the like according to the first embodiment.
Figure 6:
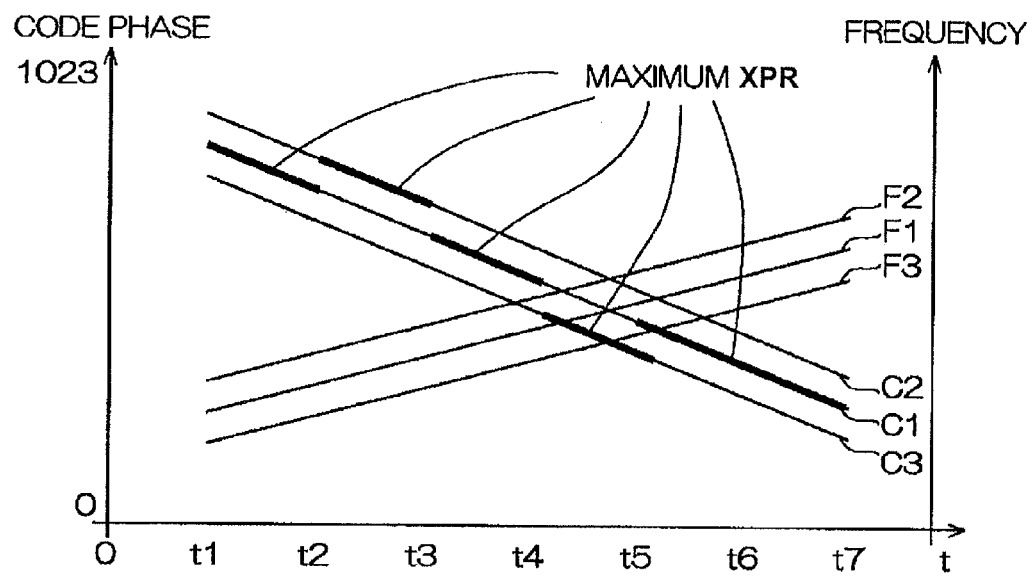
FIG. 6 is a view showing an example of the relationship between a candidate code phase and the passage of time and the like according to the first embodiment.

FIGS. 5 and 6 are views showing an example of the relationship between the candidate code phase and the passage of time and the like.

FIG. 5 shows a state in which the GPS satellite 12a approaches the terminal 1020, for example.

Since the distance between the GPS satellite 12a and the terminal 1020 decreases as the GPS satellite 12a approaches the terminal 1020, the candidate code phase C1 approaches zero with the passage of time.

The synchronization frequency F1 is set to become higher with the passage of time. This aims at dealing with a situation in which the arrival frequency of the radio wave S1 when the radio wave S1 reaches the terminal 1020 increases due to the Doppler shift which occurs when the GPS satellite 12a approaches the terminal 1020.

As shown in FIG. 6, the terminal 1020 uses three frequency sequences F1, F2, and F3 in order to efficiently achieve synchronization with the arrival frequency which changes, for example. The frequency sequences F1 and the like exemplify a frequency sequence. The frequency sequences F1 and F2 differ by a frequency width of 50 Hz. The frequency sequences F1 and F3 differ by a frequency width of 50 Hz. A frequency interval of 50 Hz is specified in advance. Specifically, a frequency interval of 50 Hz exemplifies a frequency interval. The frequency interval is set to be less than the frequency search step interval in the correlation process performed by the terminal 1020. For example, when the frequency search step interval is 100 Hz (see FIG. 11B), the frequency interval is set to be less than 100 Hz.

It suffices that the number of frequency sequences F1 and the like be two or more. For example, the number of frequency sequences F1 and the like may be four or more, differing from the first embodiment.

As shown in FIG. 6, each of the frequency sequences F1 and the like is set to change with the passage of time in expectation of the Doppler shift of the arrival frequency.

One of the frequency sequences F1 and the like should follow the Doppler shift of the arrival frequency with the highest accuracy.

The code phase C1 is calculated using the frequency sequence F1. The code phase C2 is calculated using the frequency sequence F2. The code phase C3 is calculated using the frequency sequence F3.

The three code phases C1 and the like are calculated in parallel in this manner. It is assumed that the candidate code phase calculated with the highest signal strength XPR has the highest reliability.

However, the frequency sequences F1 and the like do not necessarily have the highest signal strength XPR. As shown in FIG. 6, the signal strength XPR of the candidate code phase C1 calculated using the frequency sequence F1 is the highest between the times t1 and t2, and the signal strength XPR of the candidate code phase C2 calculated using the frequency sequence F2 is the highest between the times t2 and t3, for example.

Since the frequency of each of the frequency sequences F1 and the like is changed based on the expected Doppler shift, the accuracy of the candidate code phase calculated using one frequency sequence should be continuously higher than those of the candidate code phases calculated using other frequency sequences. In other words, the frequency sequence F1 should accurately follow the actual arrival frequency in comparison with other frequency sequences F2 and F3, for example.

Therefore, when the frequency sequence changes with the passage of time, the candidate code phase calculated with a high signal strength XPR does not necessarily have the highest accuracy.

The terminal 1020 can verify the accuracy of the candidate code phase and accurately locate the position under a weak electric field using the following hardware configuration and software configuration.

(Main Hardware Configuration of Terminal 1020)

Figure 7:
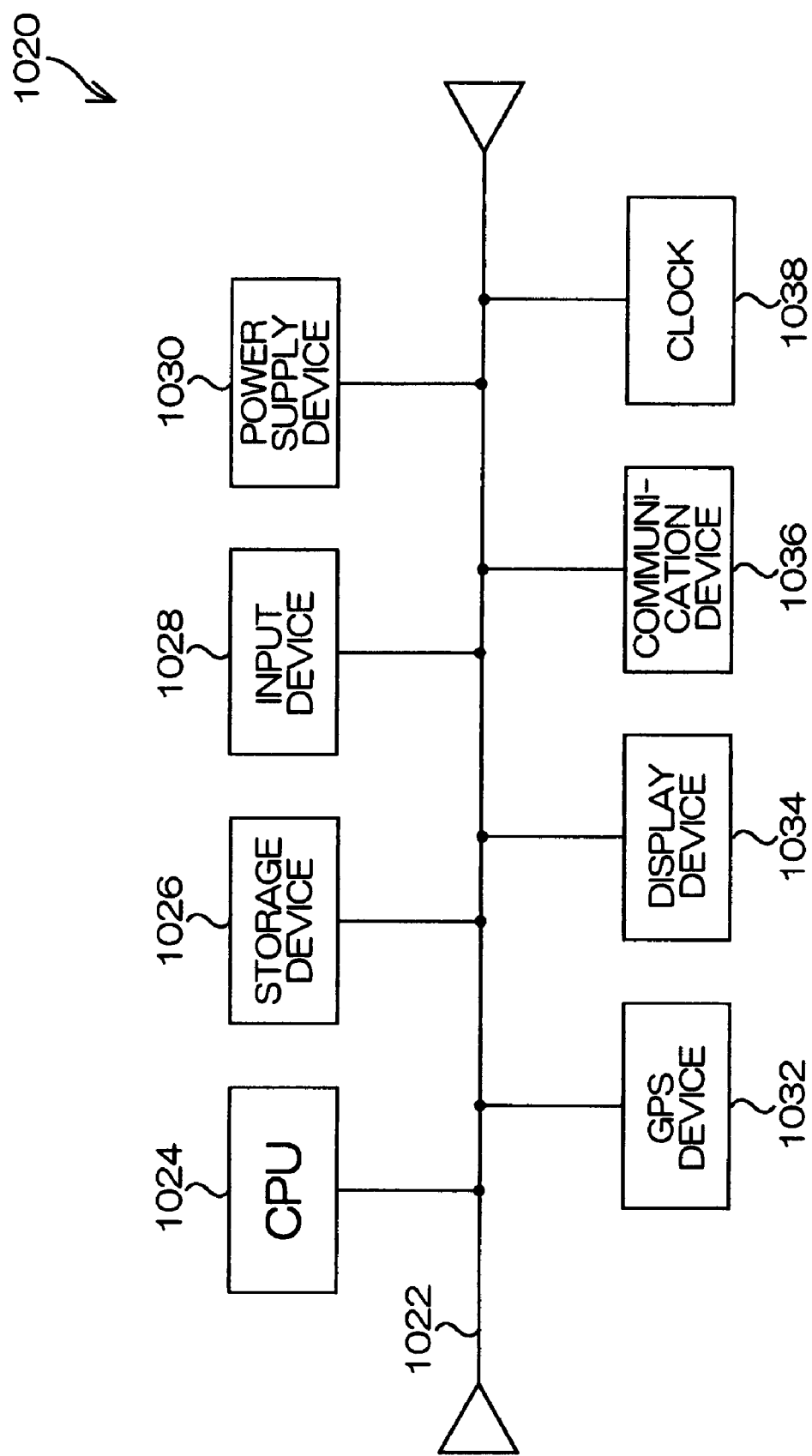
FIG. 7 is a schematic view showing the main hardware configuration of the terminal according to the first embodiment.

FIG. 7 is a schematic view showing the main hardware configuration of the terminal 1020.

As shown in FIG. 7, the terminal 1020 includes a computer which includes a bus 1022. A central processing unit (CPU) 1024, a storage device 1026, and the like are connected with the bus 1022. The storage device 1026 is a random access memory (RAM), a read only memory (ROM), or the like.

An input device 1028, a power supply device 1030, a GPS device 1032, a display device 1034, a communication device 1036, and a clock 1038 are also connected with the bus 1022.

(Configuration of GPS Device 1032)

Figure 8:
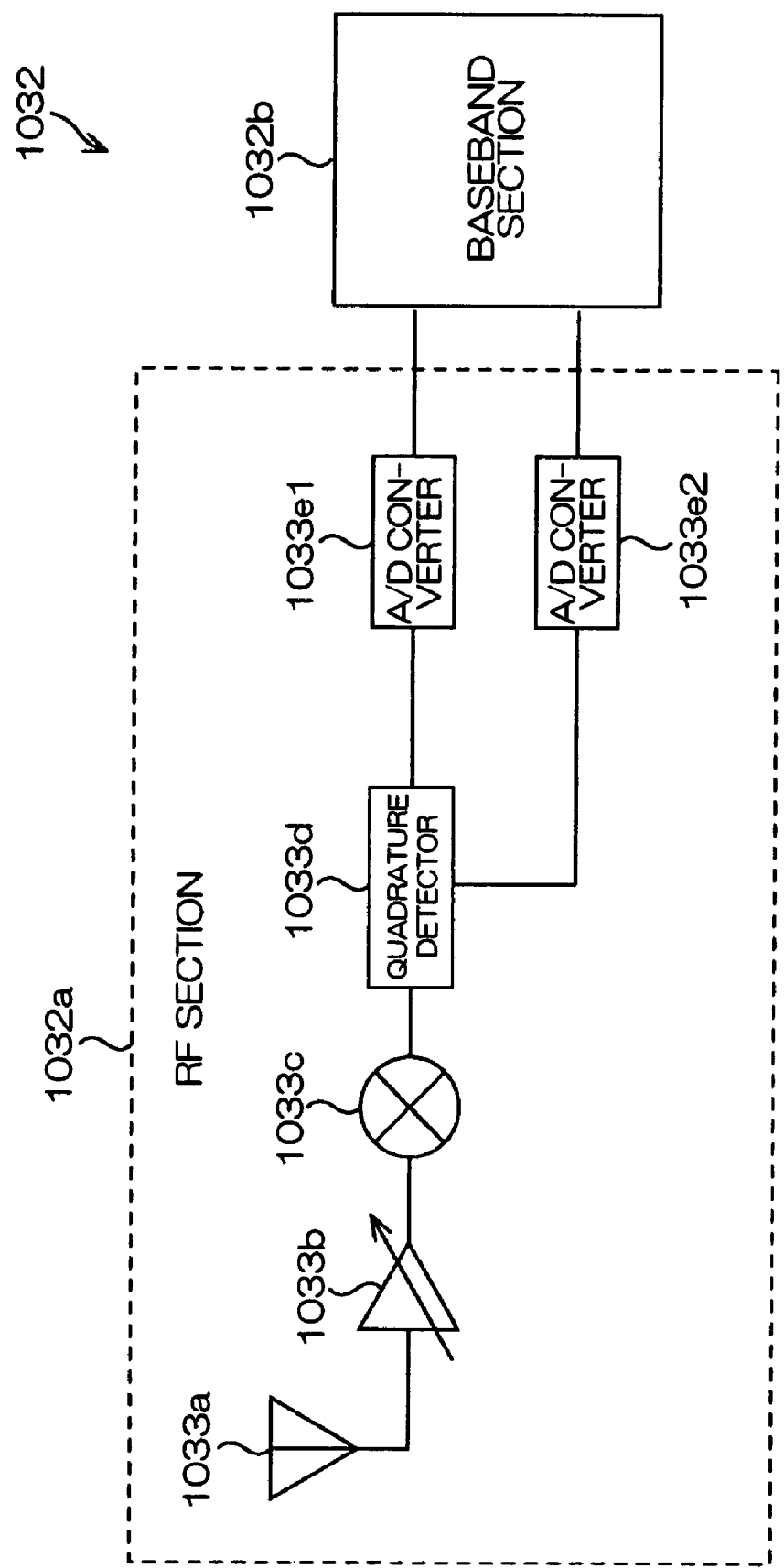
FIG. 8 is a schematic view showing an example of the configuration of a GPS device according to the first embodiment.

FIG. 8 is a schematic view showing the configuration of the GPS device 1032.

As shown in FIG. 8, the GPS device 1032 includes an RF section 1032a and a baseband section 1032b.

The RF section 1032a receives the radio waves S1 and the like through an antenna 1033a. An LNA 1033b (amplifier) amplifies the signal such as the C/A code carried on the radio wave S1. A mixer 1033c down-converts the frequency of the signal. A quadrature (IQ) detector 1033d separates the signal. A/D converters 1033e1 and 1033e2 convert the separated signals into digital signals.

The baseband section 1032b receives the digitally-converted signals from the RF section 1032a, samples and accumulates the signals, and correlates the signals with the C/A code held by the baseband section 1032b. The baseband section 1032b includes 128 correlators (not shown) and accumulators (not shown), and can perform the correlation process at the same time for 128 phases. The correlator has a configuration for performing the coherent process. The accumulator has a configuration for performing the incoherent process.

(Main Software Configuration of Terminal 1020)

Figures 9, 10:
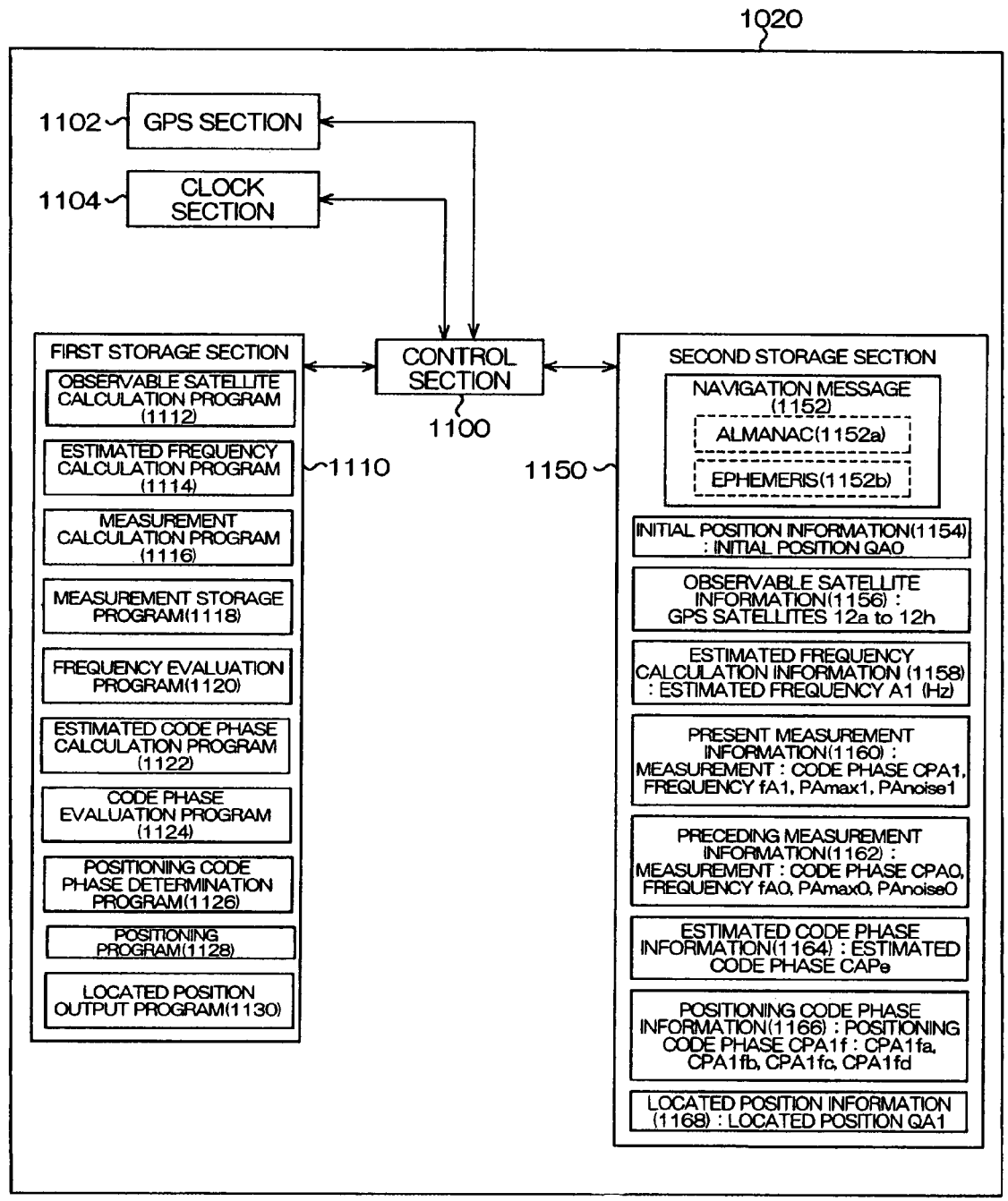
FIG. 9 is a schematic view showing the main software configuration of the terminal according to the first embodiment.
FIG. 10 is a view illustrative of an estimated frequency calculation program according to the first embodiment.

FIG. 9 is a schematic view showing the main software configuration of the terminal 1020.

As shown in FIG. 9, the terminal 1020 includes a control section 1100 which controls each section, a GPS section 1102 corresponding to the GPS device 1032 shown in FIG. 7, a clock section 1104 corresponding to the clock 1038, and the like.

The terminal 1020 also includes a first storage section 1110 which stores various programs, and a second storage section 1150 which stores various types of information.

As shown in FIG. 9, the terminal 1020 stores navigation message 1152 in the second storage section 1150. The navigation message 1152 includes an almanac 1152a and an ephemeris 1152b.

The terminal 1020 uses the almanac 1152a and the ephemeris 1152b for positioning.

As shown in FIG. 9, the terminal 1020 stores initial position information 1154 in the second storage section 1150. The initial position QA0 is the preceding located position, for example.

As shown in FIG. 9, the terminal 1020 stores an observable satellite calculation program 1112 in the first storage section 1110. The observable satellite calculation program 1112 is a program for causing the control section 1100 to calculate the observable GPS satellites 12a and the like based on the initial position QA0 indicated by the initial position information 1154.

In more detail, the control section 1100 determines the GPS satellites 12a and the like which can be observed at the present time measured by the clock section 1104 referring to the almanac 1152a. The control section 1100 stores observable satellite information 1156 indicating the observable GPS satellites 12a and the like (hereinafter called "observable satellite") in the second storage section 1150. In the first embodiment, the observable satellites are the GPS satellites 12a to 12h (see FIGS. 1 and 9).

As shown in FIG. 9, the terminal 1020 stores an estimated frequency calculation program 1114 in the first storage section 1110. The estimated frequency calculation program 1114 is a program for causing the control section 1100 to estimate the reception frequency of the radio waves S1 and the like from the GPS satellites 12a and the like.

The reception frequency is the arrival frequency when the radio wave S1 reaches the terminal 1020. In more detail, the reception frequency is the intermediate (IF) frequency when the radio wave S1 reaches the terminal 1020 and is down-converted in the terminal 1020.

FIG. 10 is a view illustrative of the estimated frequency calculation program 1114.

As shown in FIG. 10, the control section 1100 adds a Doppler shift H2 to a transmission frequency H1 from the GPS satellites 12a and the like to calculate an estimated frequency A1. The transmission frequency H1 of the GPS satellites 12a and the like is known (e.g. 1575.42 MHz).

The Doppler shift H2 occurs due to the relative movement between each of the GPS satellites 12a and the like and the terminal 1020. The control section 1100 calculates the line-of-sight velocity (velocity in the direction of the terminal 1020) of each of the GPS satellites 12a and the like at the present time using the ephemeris 1152b and the initial position QA0. The control section 1100 calculates the Doppler shift H2 based on the line-of-sight velocity.

The control section 1100 calculates the estimated frequency A1 in units of the GPS satellites 12a and the like (observable satellites).

The estimated frequency A1 includes an error of the drift of a clock (reference oscillator: not shown) of the terminal 1020. The term "drift" refers to a change in oscillation frequency due to a change in temperature.

Therefore, the control section 1100 searches for the radio waves S1 and the like around the estimated frequency A1 within a frequency range with a specific width. For example, the control section 1100 searches for the radio waves S1 and the like at intervals of 100 Hz within the range from (A1−100) kHz to (A1+100) kHz.

As shown in FIG. 9, the terminal 1020 stores a measurement calculation program 1116 in the first storage section 1110. The measurement calculation program 1116 is a program for causing the control section 1100 to perform the correlation process of the C/A code received from the GPS satellites 12a and the like and the C/A code replica generated by the terminal 1020 to calculate measurements including the maximum correlation cumulative value Pmax, the correlation cumulative value Pnoise of noise, the candidate code phase, and the reception frequency. The measurement calculation program 1116 and the control section 1100 exemplify a phase calculation section, and also exemplify a reception frequency determination section.

Figure 11A:
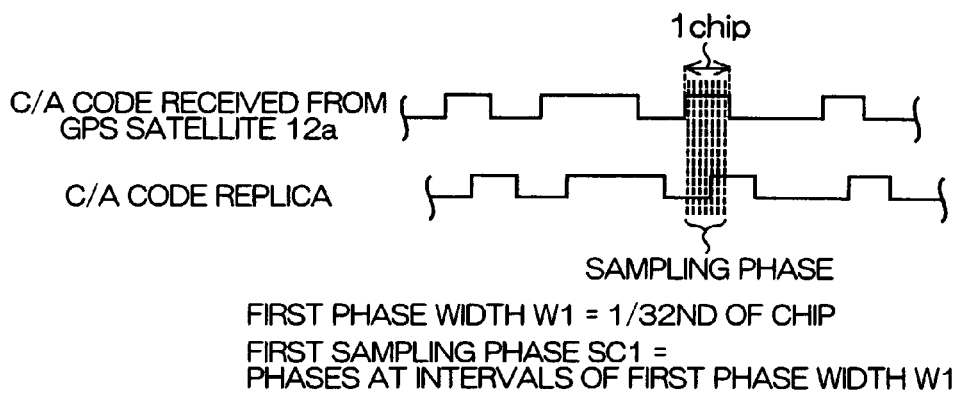
FIGS. 11A to 11C are views illustrative of a measurement calculation program according to the first embodiment.
Figure 11B:
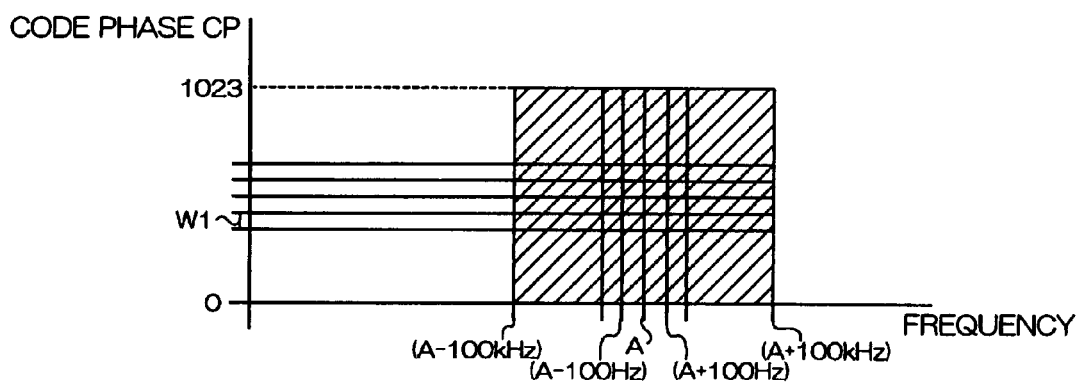
Figure 11C:
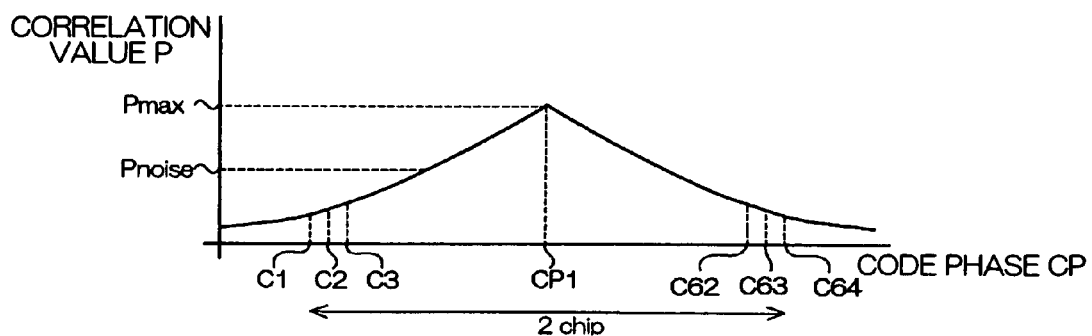

FIGS. 11A to 11C are views illustrative of the measurement calculation program 1116.

As shown in FIG. 11A, the control section 1100 equally divides one chip of the C/A code using the baseband section 1032b, and performs the correlation process, for example. One chip of the C/A code is equally divided into 32 sections, for example. Specifically, the control section 1100 performs the correlation process at intervals of a phase width of ½nd of the chip (first phase width W1). The phases at intervals of the first phase width W1 when the control section 1100 performs the correlation process are called first sampling phases SC1.

The first phase width W1 is specified as a phase width which allows detection of the maximum correlation value Pmax if the signal strength when the radio waves S1 and the like reach the terminal 1020 is −155 dBm or more. A simulation revealed that the maximum correlation value Pmax can be detected when the signal strength is −155 dBm or more by using a phase width of ½nd of the chip, even if the electric field is weak.

As shown in FIG. 11B, the control section 1100 performs the correlation process within the frequency range of ±1100 kHz around the estimated frequency A1 at intervals of the first phase width W1. The control section 1100 performs the correlation process while changing the frequency by 100 Hz.

As shown in FIG. 11C, the correlation cumulative values P corresponding to phases C1 to C64 of two chips are output from the baseband section 1032b. Each of the phases C1 to C64 is the first sampling phase SC1.

The control section 1100 searches for the first chip to the 1023rd chip of the C/A code based on the measurement calculation program 1116, for example.

The control section 1100 calculates the signal strength XPR based on the correlation cumulative values Pmax and Pnoise, and uses a code phase CPA1, a reception frequency fA1, and correlation cumulative values PAmax1 and PAnoise1 corresponding to the highest signal strength XPR as the present measurement information 1160. The code phase CPA1, the reception frequency fA1, and the correlation cumulative values PAmax1 and PAnoise1 are each generically called a measurement. The terminal 1020 calculates the measurements in units of the GPS satellites 12a and the like.

The code phase CPA1 is converted into distance. Since the code length of the C/A code is 300 kilometers (km), for example, the code phase which is the fraction portion of the C/A code can also be converted into distance.

The control section 1100 calculates the measurements for each of six GPS satellites 12a and the like among the observable satellites, for example. The measurements of a single GPS satellite 12a or the like are called corresponding measurements. For example, the code phase CPA1 of the GPS satellite 12a and the frequency fA1 of the GPS satellite 12a are corresponding measurements. The frequency fA1 is the reception frequency when receiving the radio wave S1 from the GPS satellite 12a.

A narrow correlator method (see JP-A-2000-312163, for example) may be employed as the method of the correlation process, differing from the first embodiment.

As shown in FIG. 9, the terminal 1020 stores a measurement storage program 1118 in the first storage section 1110. The measurement storage program 1118 is a program for causing the control section 1100 to store the measurements in the second storage section 1150.

The control section 1100 stores new measurements in the second storage section 1150 as the present measurement information 1160, and stores the existing present measurement information 1160 in the second storage section 1150 as preceding measurement information 1162. The preceding measurement information 1162 includes the code phase CPA0, the frequency fA0, and the correlation cumulative values PAmax0 and PAnoise0 during the preceding positioning.

As shown in FIG. 9, the terminal 1020 stores a frequency evaluation program 1120 in the first storage section 1110. The frequency evaluation program 1120 is a program for causing the control section 1100 to determine whether or not the difference between the reception frequency fA0 during the preceding positioning and the reception frequency fA1 during the present positioning is equal to or less than a frequency threshold value $\alpha 1$. A range equal to or less than the frequency threshold value $\alpha 1$ is specified in advance by a threshold value less than the frequency interval between the frequency sequences F1, F2, and F3. When the frequency interval is 50 Hz, as described above, the frequency threshold value $\alpha 1$ is 30 Hz, for example. The frequency evaluation program 1120 and the control section 1100 exemplify a frequency difference evaluation section. A range equal to or less than the frequency threshold value $\alpha 1$ exemplifies a frequency difference allowable range specified in advance.

As shown in FIG. 9, the terminal 1020 stores an estimated code phase calculation program 1122 in the first storage section 1110. The estimated code phase calculation program 1122 is a program for causing the control section 1100 to estimate the present phase and calculate an estimated code phase CPAe based on the code phase CPA0 during the preceding positioning, the Doppler shift of the radio waves S1 and the like, and an elapsed time dt from the preceding positioning time. The estimated code phase CPAe exemplifies an estimated phase. The estimated code phase calculation program 1122 and the control section 1100 exemplify an estimated phase calculation section.

The estimated code phase CPAe is converted into distance.

FIG. 12 is a view illustrative of the estimated code phase calculation program 1122.

As shown in FIG. 12, the control section 1100 calculates the estimated code phase CPAe using the expression 1, for example.

As indicated by the expression 1, the control section 1100 calculates the estimated code phase CPAe by subtracting a value obtained by multiplying the relative moving velocity between the GPS satellite 12a and the terminal 1020 by the elapsed time dt from the preceding positioning from the code phase CPA0 during the preceding positioning, for example.

In the expression 1, the estimated code phase CPAe and the preceding code phase CPA0 are converted into distance.

The radio waves S1 and the like propagate at the speed of light. Therefore, an approximate velocity corresponding to a Doppler shift of 1 Hz can be calculated by dividing the speed of light by the transmission frequency H1 of the radio waves S1 and the like. Specifically, when the Doppler shift is +1 Hz, the GPS satellite 12a approaches the terminal 1020 at 0.19 meters per second (m/s). Therefore, the estimated code phase CPAe becomes shorter than the code phase CPA0 during the preceding positioning. The Doppler shift is the difference between the frequency fA0 during the preceding positioning and the transmission frequency H1, for example.

On the other hand, when the Doppler shift is −1 Hz, the GPS satellite 12a moves away from the terminal 1020 at 0.19 meters per second (m/s). Therefore, the estimated code phase CPAe becomes longer than the code phase CPA0 during the preceding positioning.

Note that the expression 1 is satisfied provided that the time elapsed from the preceding positioning is short. In other words, the expression 1 is satisfied when the relationship between the code phase and the elapsed time can be indicated by a straight line on a graph.

The average value of the difference between the frequency fA0 during the preceding positioning and the transmission frequency H1 and the difference between the frequency fA1 during the present positioning and the transmission frequency H1 may be used as the Doppler shift, differing from the first embodiment. This allows the estimated code phase CPAe to be calculated more accurately.

The control section 1100 stores estimated code phase information 1164 indicating the calculated estimated code phase CPAe in the second storage section 1150.

As shown in FIG. 9, the terminal 1020 stores a code phase evaluation program 1124 in the first storage section 1110. The code phase evaluation program 1124 is a program for causing the control section 1100 to determine whether or not the difference between the present code phase CPA1 and the estimated code phase CPAe is equal to or less than a code phase threshold value $\beta 1$ (hereinafter called "threshold value $\beta 1$"). A range equal to or less than the threshold value $\beta 1$ exemplifies a phase difference allowable range. The code phase evaluation program 1124 and the control section 1100 exemplify a phase difference evaluation section.

The threshold value $\beta 1$ is specified in advance. The threshold value $\beta 1$ is 80 meters (m), for example.

The control section 1100 uses the code phase CPA1, which is determined to have a frequency difference equal to or less than the threshold value $\alpha 1$ based on the frequency evaluation program 1120, for determination based on the code phase evaluation program 1124.

As shown in FIG. 9, the terminal 1020 stores a positioning code phase determination program 1126 in the first storage section 1110. The positioning code phase determination program 1126 is a program for causing the control section 1100 to determine the code phase CPA1 and the like of the GPS satellites 12a and the like having a frequency difference equal to or less than the frequency threshold value $\alpha 1$ and a code phase difference equal to or less than the threshold value $\beta 1$ to be a positioning code phase CPA1f.

The control section 1100 excludes the code phases CPA1 and the like of the GPS satellites 12a and the like corresponding to a frequency difference which is not equal to or less than the frequency threshold value $\alpha 1$ from the positioning code phase CPA1f used for positioning. The control section 1100 uses the code phase CPA1 corresponding to a frequency difference equal to or less than the frequency threshold value $\alpha 1$ and a code phase difference equal to or less than the threshold value $\beta 1$ for positioning. Specifically, the positioning code phase determination program 1126 and the control section 1100 exemplify a phase exclusion section.

In the first embodiment, the positioning code phases CPA1f include the code phases CPA1fa, CPA1fb, CPA1fc, and CPA1fd respectively corresponding to the GPS satellites 12a, 12b, 12c, and 12d, for example.

The control section 1100 stores positioning code phase information 1166 indicating the positioning code phase CPA1f in the second storage section 1150.

As shown in FIG. 9, the terminal 1020 stores a positioning program 1128 in the first storage section 1110. The positioning program 1128 is a program for causing the control section 1100 to locate the present position using the positioning code phase CPA1f. The positioning program 1128 and the control section 1100 exemplify a positioning section.

The positioning code phase CPA1f is the code phase CPA1 or the like equal to or less than the threshold value $\beta 1$. Specifically, the term "locate the present position using the positioning code phase CPA1f" is synonymous with "locate the present position using the code phase CPA1 or the like equal to or less than the threshold value $\beta 1$".

When the number of positioning code phases CPA1ƒ is three or more, the control section 1100 locates the present position using the positioning code phases CPA1ƒ to calculate the located position QA1.

The control section 1100 stores located position information 1168 indicating the calculated located position QA1 in the second storage section 1150.

As shown in FIG. 9, the terminal 1020 stores a located position output program 1130 in the first storage section 1110. The located position output program 1130 is a program for causing the control section 1100 to display the located position QA1 on the display device 1034 (see FIG. 7).

The terminal 1020 is configured as described above.

The terminal 1020 can determine whether or not the difference between the present code phase CPA1 and the estimated code phase CPAe is equal to or less than the threshold value β1 specified in advance. Therefore, the terminal 1020 can verify the accuracy of the code phase CPA1.

The terminal 1020 can locate the present position using the code phase CPA1 corresponding to a code phase difference equal to or less than the threshold value β1.

Therefore, the terminal 1020 can verify the accuracy of the code phase of the positioning base code and accurately locate the position under a weak electric field in which the signal strength is weak.

The terminal 1020 can exclude the code phase CPA1 corresponding to the frequency fA1 outside the range equal to or less than the frequency threshold value α1 from positioning.

This means that the terminal 1020 can verify not only the accuracy of the code phase CPA1 of the C/A code, but also the accuracy of the reception frequency fA1 when calculating the code phase CPA1.

Therefore, the terminal 1020 can verify the accuracy of the code phase of the positioning base code and more accurately locate the position under a weak electric field in which the signal strength is weak.

The configuration of the terminal 1020 according to the first embodiment has been described above. An operation example of the terminal 1020 is described below mainly using FIG. 13.

Figure 13:
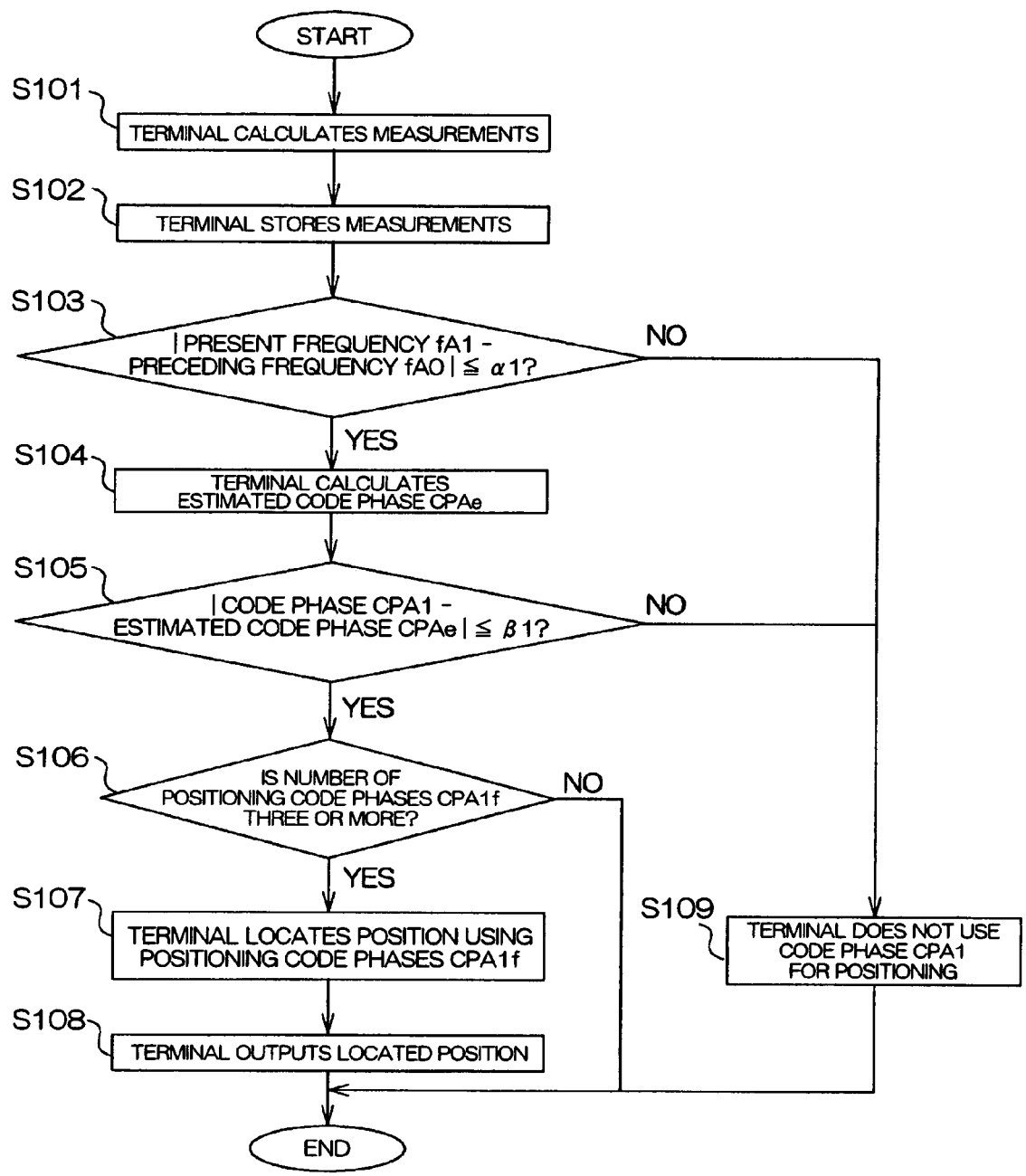
FIG. 13 is a schematic flowchart showing an operation example of the terminal according to the first embodiment.

FIG. 13 is a schematic flowchart showing an operation example of the terminal 1020.

The terminal 1020 receives the radio waves S1 and the like and calculates the measurements (step S101 in FIG. 13). The step S101 exemplifies a phase calculation step.

The terminal 1020 stores the measurements (step S102).

The terminal 1020 determines whether or not the absolute value of the difference between the present frequency fA1 and the preceding frequency fA0 is equal to or less than the frequency threshold value α1 (step S103).

The terminal 1020 does not use the code phase CPA1 corresponding to the frequency difference which has been determined to be greater than the frequency threshold value α1 in the step S103 for positioning (step S109). Specifically, the terminal 1020 does not use the code phase CPA1 as the positioning code phase CPA1ƒ.

On the other hand, the terminal 1020 calculates the estimated code phase CPAe for the code phase CPA1 corresponding to the frequency difference which has been determined to be equal to or less than the frequency threshold value α1 in the step S103 (step S104). The step S104 exemplifies an estimated phase calculation step.

The terminal 1020 determines whether or not the absolute value of the difference between the code phase CPA1 and the estimated code phase CPAe is equal to or less than the threshold value β1 (step S105). The step S105 exemplifies a phase evaluation step. The terminal 1020 uses the code phase CPA1 of which the absolute value of the code phase difference has been determined to be equal to or less than the threshold value β1 as the positioning code phase CPA1ƒ.

The terminal 1020 determines whether or not the number of positioning code phases CPA1ƒ is three or more (step S106).

When the terminal 1020 has determined that the number of positioning code phases CPA1ƒ is less than three in the step S106, the process is terminated since the position cannot be determined.

When the terminal 1020 has determined that the number of positioning code phases CPA1ƒ is three or more in the step S106, the terminal 1020 locates the position using the positioning code phases CPA1ƒ (step S107). The step S107 exemplifies a positioning step.

The terminal 1020 then outputs the located position QA1 (see FIG. 9) (step S108).

The above steps allow the terminal 1020 to verify the accuracy of the phase of the positioning base code and accurately locate the position under a weak electric field in which the signal strength is weak.

Second Embodiment

Figure 14:
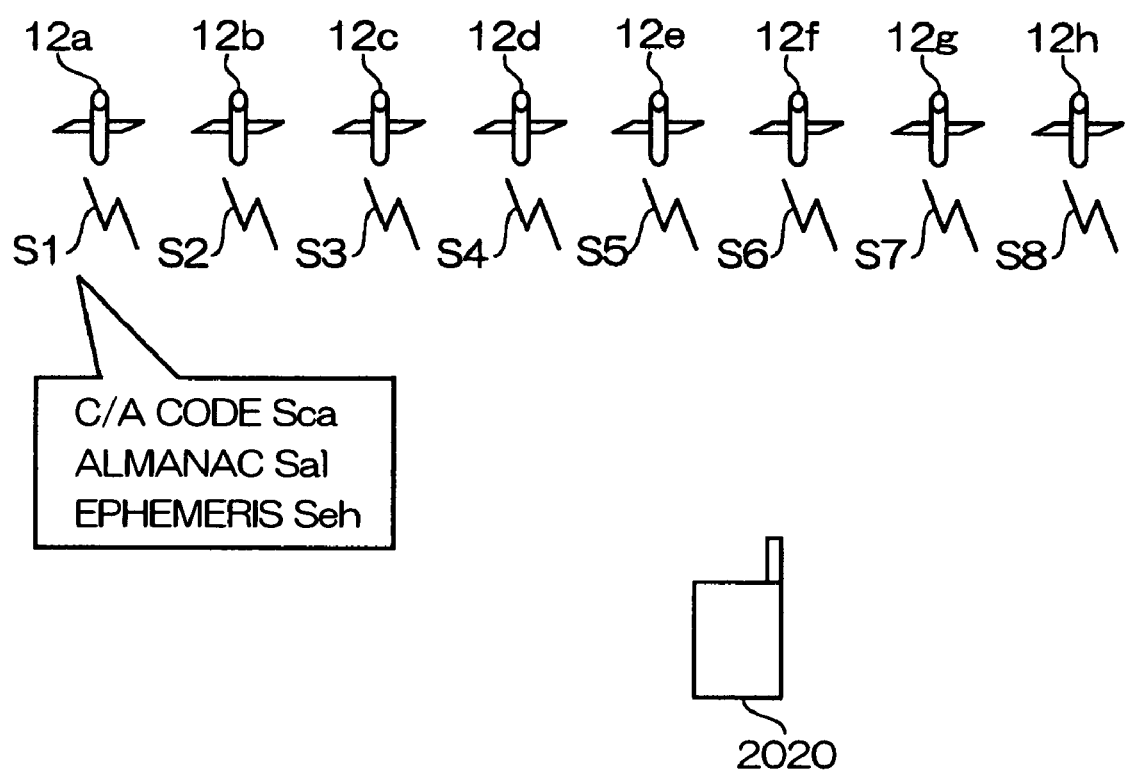
FIG. 14 is a schematic view showing a terminal and the like according to a second embodiment.

FIG. 14 is a schematic view showing a terminal 2020 and the like according to a second embodiment.

As shown in FIG. 14, the terminal 2020 can receive radio waves S1, S2, S3, S4, S5, S6, S7, and S8 from GPS satellites (positioning satellites) 12*a*, 12*b*, 12*c*, 12*d*, 12*e*, 12*f*, 12*g*, and 12*h*, for example. The GPS satellites 12*a* and the like exemplify a transmission source. The positioning satellite is not limited to the GPS satellite, but may be a satellite generally used in a satellite positioning system (SPS).

Various codes are carried on the radio waves S1 and the like. A C/A code Sca is one of such codes. The C/A code Sca is a signal having a bit rate of 1.023 Mbps and a bit length of 1023 bits (=1 msec). The C/A code Sca includes 1023 chips. The terminal 2020 exemplifies a positioning device which locates the present position, and locates the present position using the C/A code. The C/A code Sca exemplifies a positioning base code.

As information carried on the radio waves S1 and the like, an almanac Sal and an ephemeris Seh can be given. The almanac Sal is information indicating the approximate satellite orbits of all of the GPS satellites 12*a* and the like, and the ephemeris Seh is information indicating the precise satellite orbit of each of the GPS satellites 12*a* and the like. The almanac Sal and the ephemeris Seh are generically called a navigation message.

The terminal 2020 can specify the code phases (phases) of the C/A codes from three or more different GPS satellites 12*a* and the like to locate the present position, for example.

Figure 15:
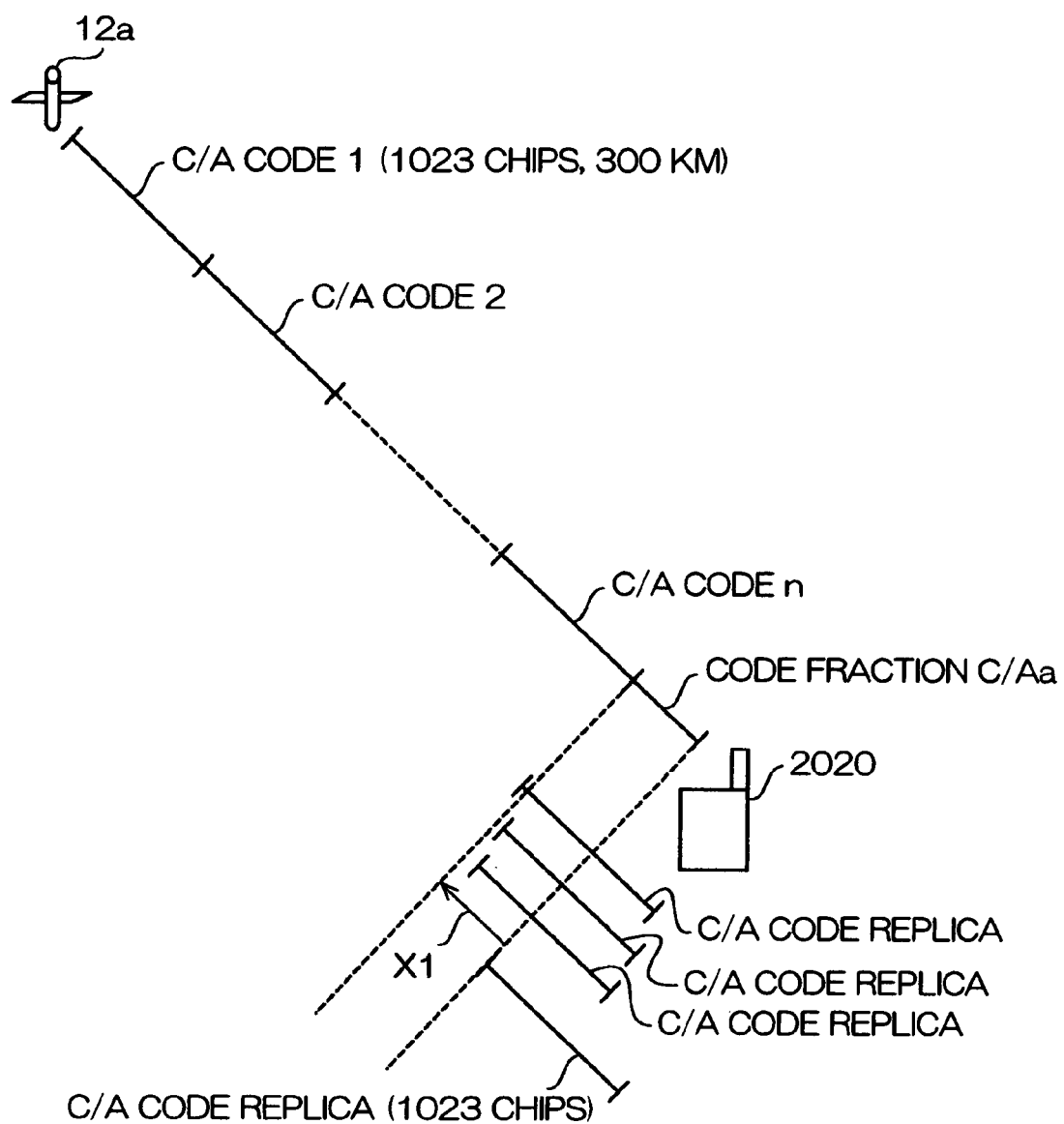
FIG. 15 is a schematic view showing a positioning method according to the second embodiment.

FIG. 15 is a schematic view showing an example of a positioning method.

As shown in FIG. 15, it may be considered that the C/A codes continuously line up between the GPS satellite 12*a* and the terminal 2020, for example. Since the distance between the GPS satellite 12*a* and the terminal 2020 is not necessarily a multiple of the length (300 kilometers (km)) of the C/A code, a code fraction C/Aa may exist. Specifically, a portion of a multiple of the C/A code and a fraction portion may exist between the GPS satellite 12*a* and the terminal 2020. The total length of the portion of a multiple of the C/A code and the fraction portion is the pseudo-range. The terminal 2020 locates the position using the pseudo-ranges for three or more GPS satellites 12*a* and the like.

In this embodiment, the fraction portion C/Aa of the C/A code is called a "code phase (phase)". The code phase may be indicated by the number of the chip included in the 1023 chips of the C/A code, or may be converted into distance, for example. When calculating the pseudo-range, the code phase is converted into distance.

The position of the GPS satellite 12*a* in the orbit can be calculated using the ephemeris Seh. The portion of a multiple of the C/A code can be specified by calculating the distance between the position of the GPS satellite 12*a* in the orbit and an initial position QB0 described later, for example. Since the length of the C/A code is 300 kilometers (km), the position error of the initial position QB0 must be 150 kilometers (km) or less.

As shown in FIG. 15, a correlation process is performed while moving the phase of a C/A code replica in the direction indicated by the arrow X1, for example. The terminal 2020 performs the correlation process while changing the synchronization frequency. The correlation process includes a coherent process and an incoherent process described later.

The phase having the maximum correlation cumulative value is the code fraction C/Aa.

Note that the terminal 2020 may locate the position using a radio wave from a portable telephone base station or the like, differing from the second embodiment. The terminal 2020 may locate the position by receiving a radio wave through a local area network (LAN), differing from the second embodiment.

Figure 16:
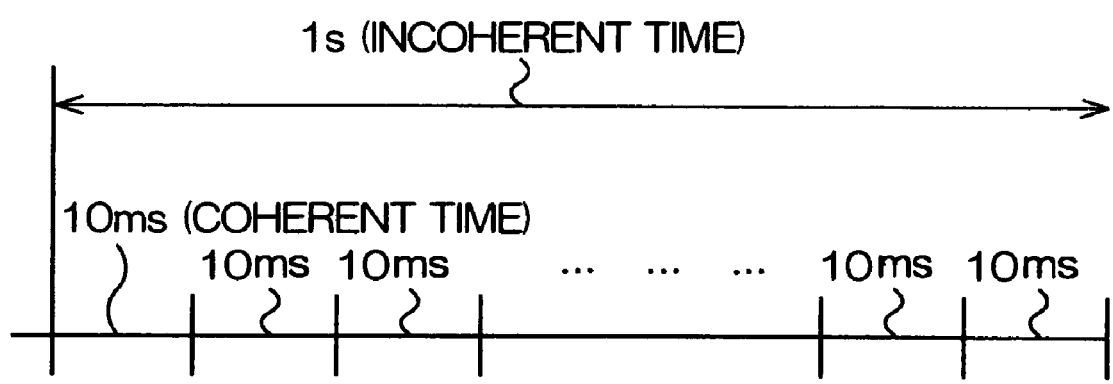
FIG. 16 is a view illustrative of a correlation process according to the second embodiment.

FIG. 16 is a view illustrative of the correlation process.

The coherent process is a process of correlating the C/A code received by the terminal 2020 with the C/A code replica. The C/A code replica is a code generated by the terminal 2020. The C/A code replica exemplifies a positioning base code replica.

For example, when the coherent time is 10 msec, as shown in FIG. 16, the correlation value between the C/A code synchronously accumulated over 10 msec and the C/A code replica and the like are calculated. The correlated code phase and the correlation value are output as a result of the coherent process.

The incoherent process is a process of calculating the correlation cumulative value (incoherent value) by accumulating the correlation values as the coherent results.

The code phase output by the coherent process and the correlation cumulative value are output as a result of the correlation process.

Figure 17:
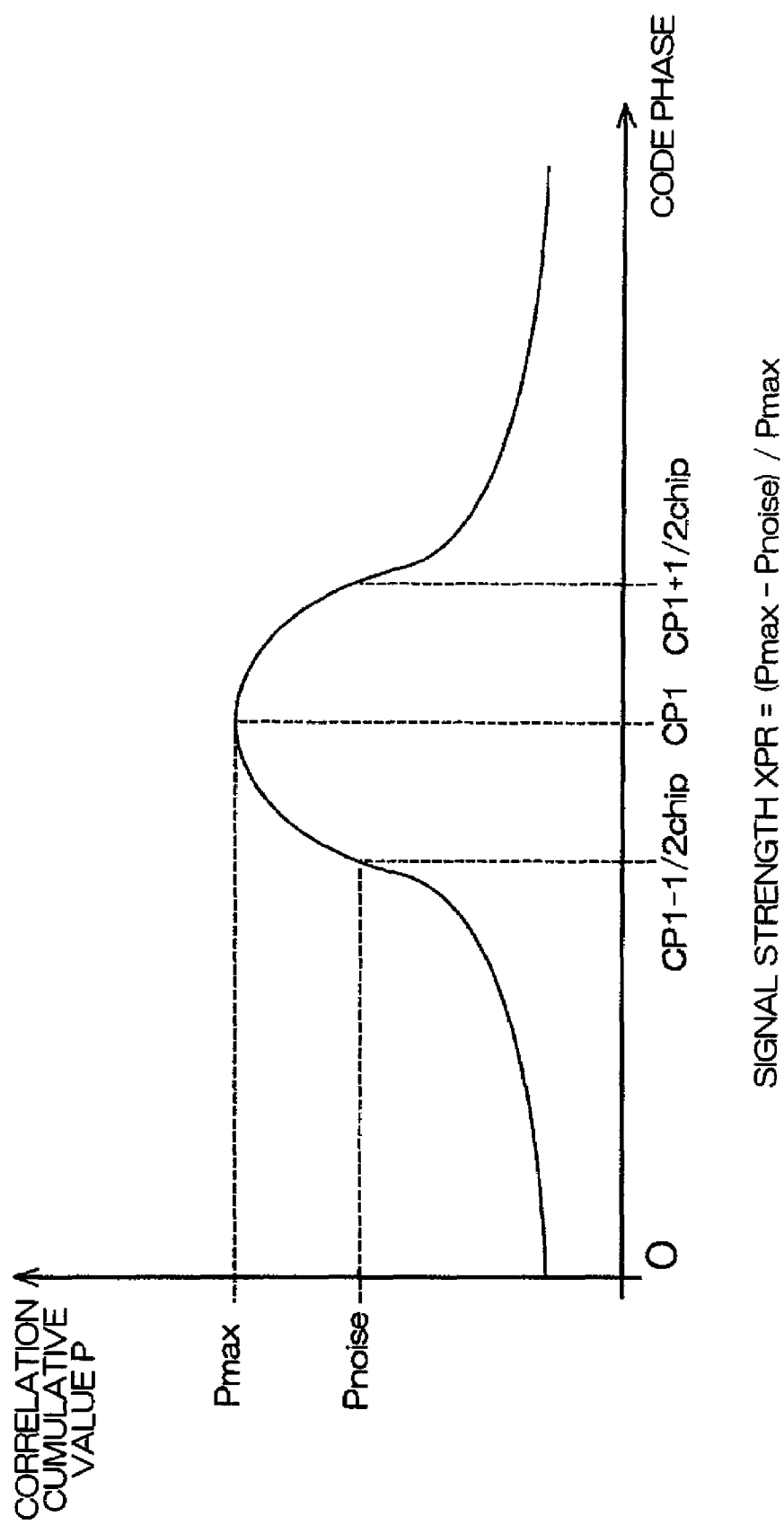
FIG. 17 is a view showing an example of the relationship between a correlation cumulative value and a code phase according to the second embodiment.

FIG. 17 is a view showing an example of the relationship between the correlation cumulative value and the code phase.

A code phase CP1 corresponding to the maximum correlation cumulative value Pmax shown in FIG. 17 is the code phase of the C/A code (equal to the code phase of the C/A code replica).

The terminal 2020 sets the correlation cumulative value of one of the code phases at an interval of half of the chip from the code phase CP1 having a smaller correlation cumulative value to be a correlation cumulative value Pnoise of noise, for example.

The terminal 2020 specifies a value obtained by dividing the difference between the correlation cumulative values Pmax and Pnoise by the correlation cumulative value Pmax as a signal strength XPR. The signal strength XPR exemplifies a signal strength.

The terminal 2020 sets the code phase CP1 to be a candidate for the code phase used for positioning when the signal strength XPR is 0.2 or more, for example. This code phase is hereinafter also called a "candidate code phase". The candidate code phase is a candidate for the code phase used for positioning, and the terminal 2020 does not necessarily use the candidate code phase for positioning.

Figure 18:
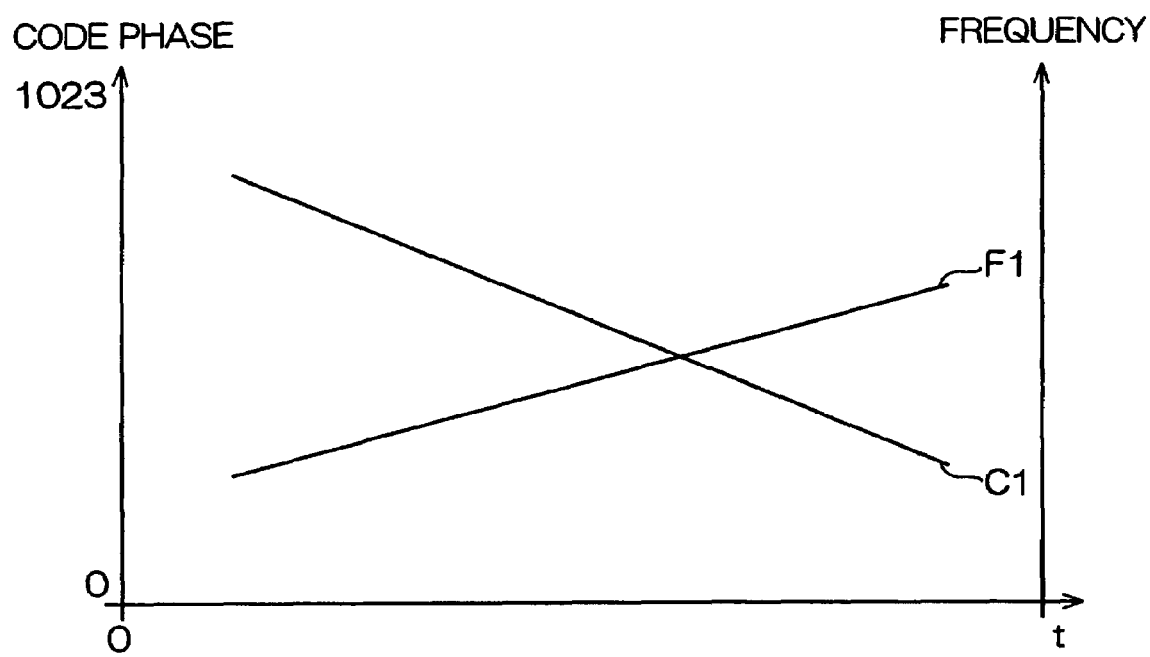
FIG. 18 is a view showing an example of the relationship between a candidate code phase and the passage of time and the like according to the second embodiment.
Figure 19:
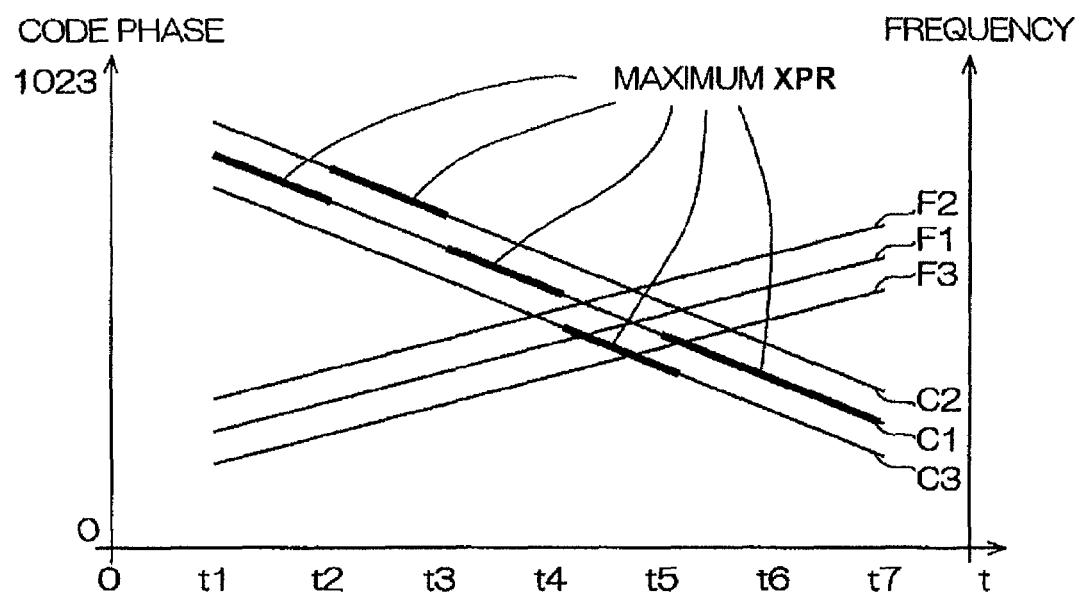
FIG. 19 is a view showing an example of the relationship between a candidate code phase and the passage of time and the like according to the second embodiment.

FIGS. 18 and 19 are views showing an example of the relationship between the candidate code phase and the passage of time and the like.

FIG. 18 shows a state in which the GPS satellite 12*a* approaches the terminal 2020, for example.

For example, since the distance between the GPS satellite 12*a* and the terminal 2020 decreases as the GPS satellite 12*a* approaches the terminal 2020, the candidate code phase C1 approaches zero with the passage of time.

The frequency belonging to a frequency sequence F1 is set to become higher with the passage of time. This aims at dealing with a situation in which the arrival frequency of the radio wave S1 when the radio wave S1 reaches the terminal 2020 increases due to the Doppler shift which occurs when the GPS satellite 12*a* approaches the terminal 2020.

As shown in FIG. 19, the terminal 2020 uses three frequency sequences F1, F2, and F3 in order to efficiently achieve synchronization with the arrival frequency which changes, for example. The frequency sequences F1 and the like exemplify a frequency sequence. The frequency sequences F1 and F2 differ by a frequency width of 50 Hz, for example. The frequency sequences F1 and F3 also differ by a frequency width of 50 Hz. A frequency interval of 50 Hz is specified in advance. Specifically, a frequency interval of 50 Hz exemplifies a frequency interval. The frequency interval is set to be less than the frequency search step interval in the correlation process performed by the terminal 2020. For example, when the frequency search step interval is 100 Hz (see FIG. 24B), the frequency interval is set to be less than 100 Hz.

It suffices that the number of frequency sequences F1 and the like be at least one. For example, the number of frequency sequences F1 and the like may be one or four or more, differing from the second embodiment.

As shown in FIG. 19, each of the frequency sequences F1 and the like is set to change with the passage of time in expectation of the Doppler shift of the arrival frequency.

One of the frequency sequences F1 and the like should follow the Doppler shift of the arrival frequency with the highest accuracy.

The code phase C1 is calculated using the frequency sequence F1. The code phase C2 is calculated using the frequency sequence F2. The code phase C3 is calculated using the frequency sequence F3.

The three code phases C1 and the like are calculated in parallel in this manner. The code phase calculated with the highest signal strength XPR generally has the highest reliability.

However, the frequency sequences F1 and the like with the highest signal strength XPR are not necessarily maintained. As shown in FIG. 19, the signal strength XPR of the code phase C1 calculated using the frequency sequence F1 is the highest between the times t1 and t2, and the signal strength XPR of the code phase C2 calculated using the frequency sequence F2 is the highest between the times t2 and t3, for example.

Since the frequency of each of the frequency sequences F1 and the like is changed based on the expected Doppler shift (common factor), the accuracy of the code phase calculated using one frequency sequence should be continuously higher than those of the code phases calculated using other frequency sequences.

The term "high accuracy" means that the difference between the calculated code phase and the true code phase is small.

For example, when the accuracy of the frequency sequence F1 is higher than those of the frequency sequences F2 and F3, the frequency sequence F1 should accurately follow the actual arrival frequency in comparison with the frequency sequences F2 and F3. Therefore, even if a time zone exists in the frequency sequence F1 in which the signal strength XPR is low in comparison with the frequency sequences F2 and F3, the candidate code phase calculated using the frequency sequence F1 should have the highest accuracy.

The terminal 2020 can verify the accuracy of the candidate code phase and accurately locate the position under a weak electric field using the following hardware configuration and software configuration.

(Main Hardware Configuration of Terminal 2020)

Figure 20:
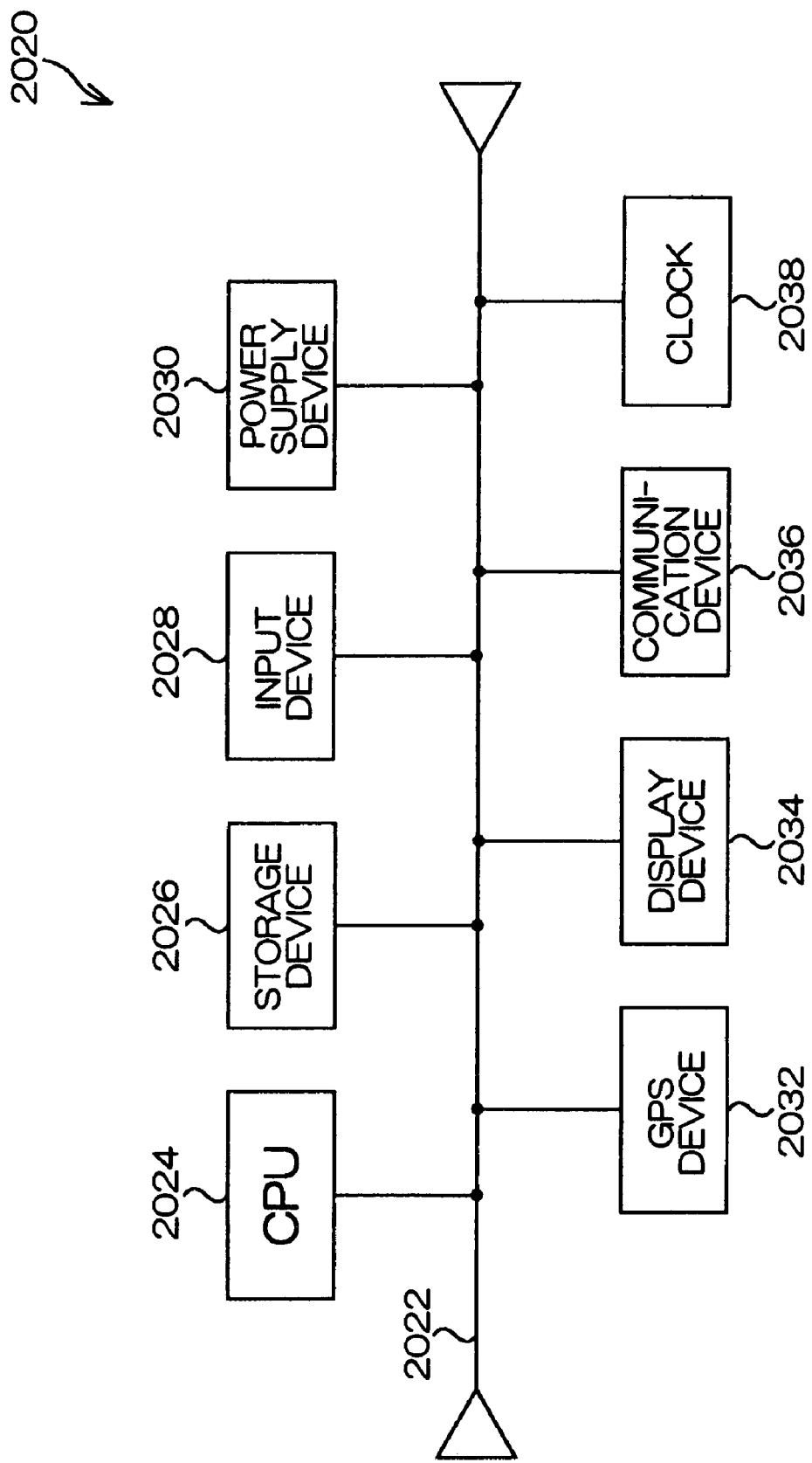
FIG. 20 is a schematic view showing the main hardware configuration of the terminal according to the second embodiment.

FIG. 20 is a schematic view showing the main hardware configuration of the terminal 2020.

As shown in FIG. 20, the terminal 2020 includes a computer which includes a bus 2022. A central processing unit (CPU) 2024, a storage device 2026, and the like are connected with the bus 2022. The storage device 2026 is a random access memory (RAM), a read only memory (ROM), or the like.

An input device 2028, a power supply device 2030, a GPS device 2032, a display device 2034, a communication device 2036, and a clock 2038 are also connected with the bus 2022.

(Configuration of GPS Device 2032)

Figure 21:
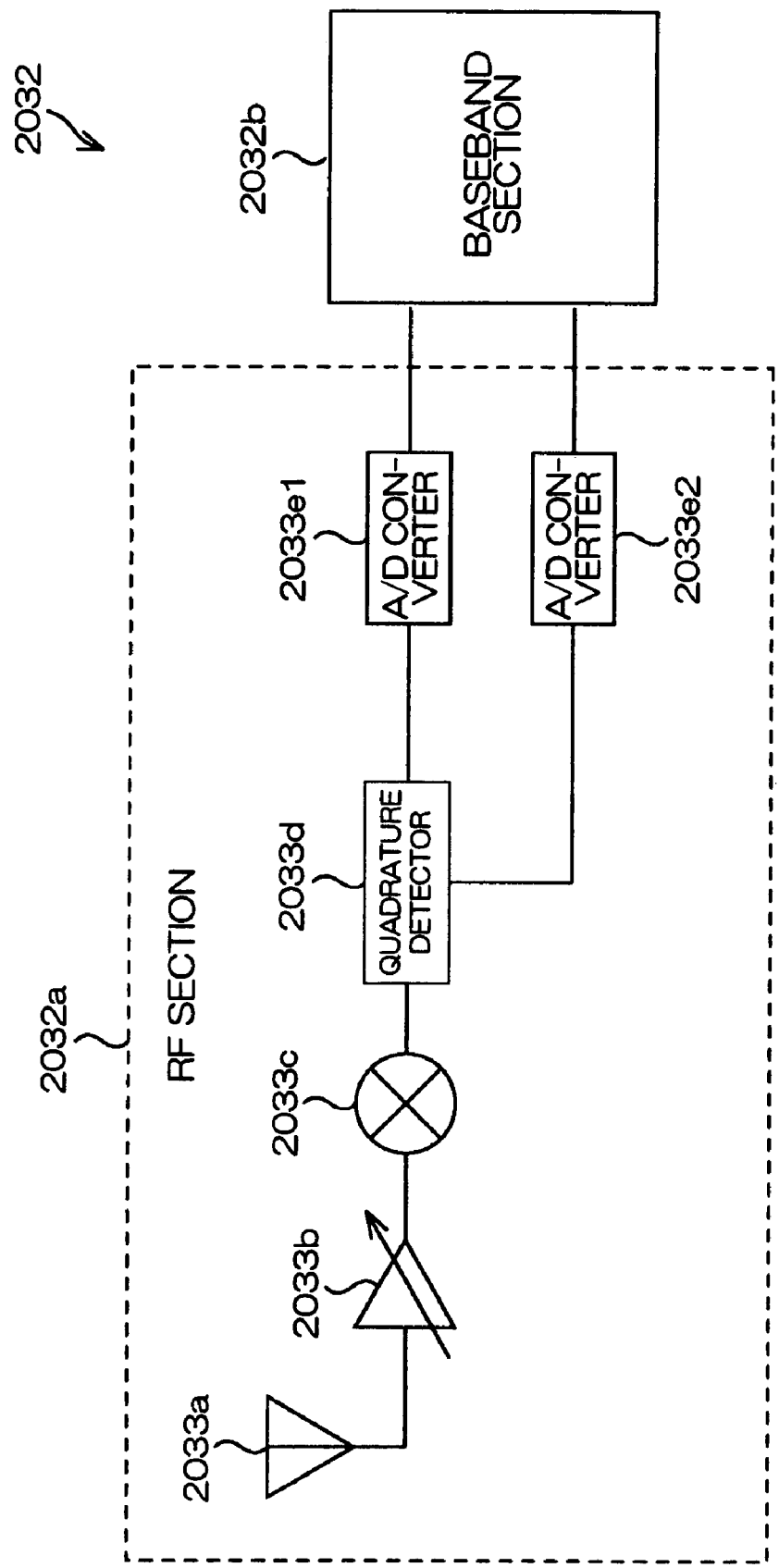
FIG. 21 is a schematic view showing an example of the configuration of a GPS device according to the second embodiment.

FIG. 21 is a schematic view showing the configuration of the GPS device 2032.

As shown in FIG. 21, the GPS device 2032 includes an RF section 2032a and a baseband section 2032b.

The RF section 2032a receives the radio waves S1 and the like through an antenna 2033a. An LNA 2033b (amplifier) amplifies the signal such as the C/A code carried on the radio wave S1. A mixer 2033c down-converts the frequency of the signal. A quadrature (IQ) detector 2033d separates the signal. A/D converters 2033e1 and 2033e2 convert the separated signals into digital signals.

The baseband section 2032b receives the digitally-converted signals from the RF section 2032a, samples and accumulates the signals, and correlates the signals with the C/A code held by the baseband section 2032b. The baseband section 2032b includes 128 correlators (not shown) and accumulators (not shown), and can perform the correlation process at the same time for 128 phases. The correlator has a configuration for performing the coherent process. The accumulator has a configuration for performing the incoherent process.

(Main Software Configuration of Terminal 2020)

Figure 22:
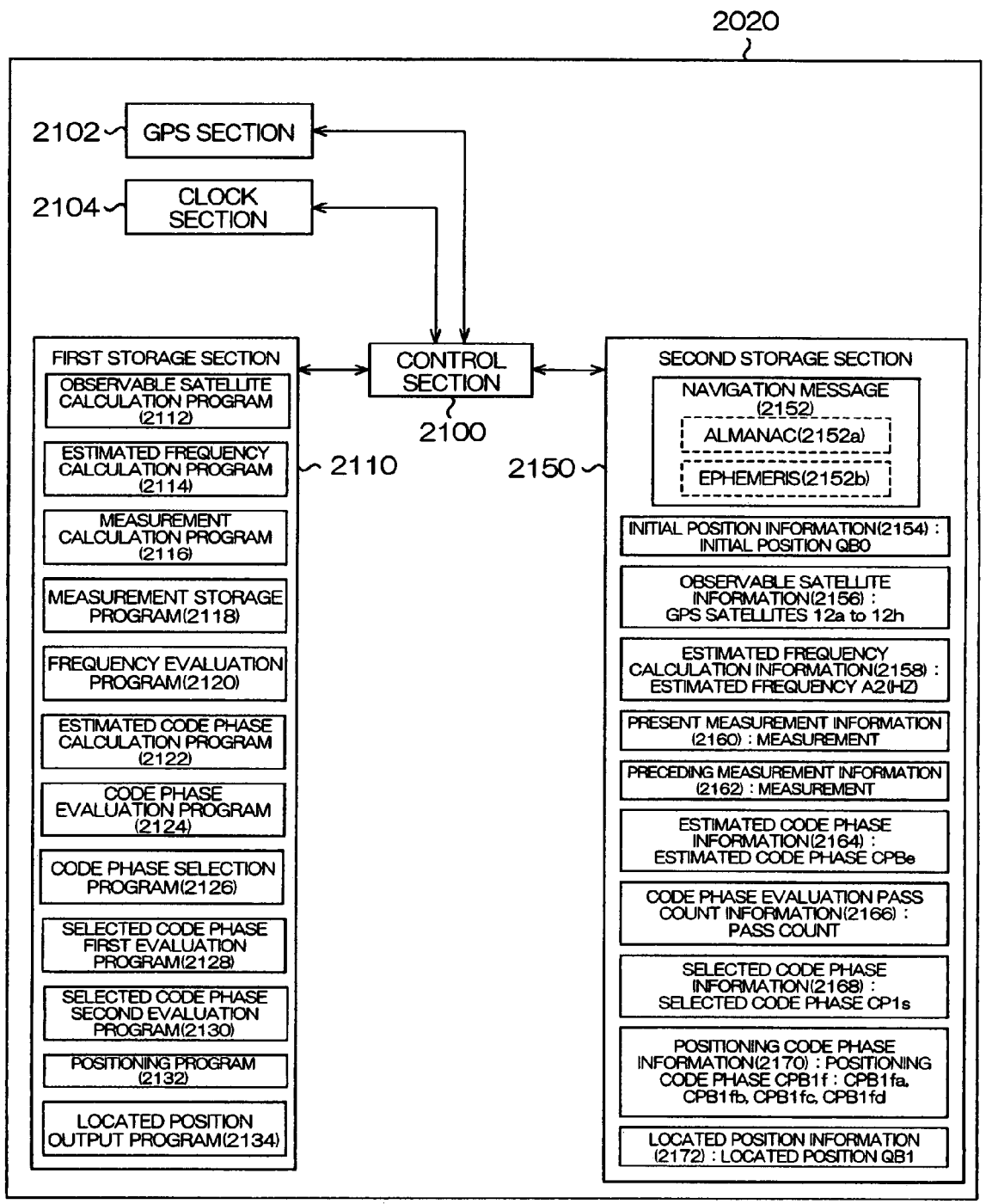
FIG. 22 is a schematic view showing the main software configuration of the terminal according to the second embodiment.

FIG. 22 is a schematic view showing the main software configuration of the terminal 2020.

As shown in FIG. 22, the terminal 2020 includes a control section 2100 which controls each section, a GPS section 2102 corresponding to the GPS device 2032 shown in FIG. 20, a clock section 2104 corresponding to the clock 2038, and the like.

The terminal 2020 also includes a first storage section 2110 which stores various programs, and a second storage section 2150 which stores various types of information.

As shown in FIG. 22, the terminal 2020 stores a navigation message 2152 in the second storage section 2150. The navigation message 2152 includes an almanac 2152a and an ephemeris 2152b.

The terminal 2020 uses the almanac 2152a and the ephemeris 2152b for positioning.

As shown in FIG. 22, the terminal 2020 stores initial position information 2154 in the second storage section 2150. The initial position QB0 is the preceding located position, for example.

As shown in FIG. 22, the terminal 2020 stores an observable satellite calculation program 2112 in the first storage section 2110. The observable satellite calculation program 2112 is a program for causing the control section 2100 to calculate the observable GPS satellites 12a and the like based on the initial position QB0 indicated by initial position information 2154.

In more detail, the control section 2100 determines the GPS satellites 12a and the like which can be observed at the present time measured by the clock section 2104 referring to the almanac 2152a. The control section 2100 stores observable satellite information 2156 indicating the observable GPS satellites 12a and the like (hereinafter called "observable satellite") in the second storage section 2150. In the second embodiment, the observable satellites are the GPS satellites 12a to 12h (see FIGS. 1 and 22).

As shown in FIG. 22, the terminal 2020 stores an estimated frequency calculation program 2114 in the first storage section 2110. The estimated frequency calculation program 2114 is a program for causing the control section 2100 to estimate the arrival reception frequency of the radio waves S1 and the like from the GPS satellites 12a and the like.

The arrival frequency is the frequency when the radio wave S1 reaches the terminal 2020. In more detail, the arrival frequency is the intermediate (IF) frequency when the radio wave S1 reaches the terminal 2020 and is down-converted in the terminal 2020.

FIG. 23 is a view illustrative of the estimated frequency calculation program 2114.

As shown in FIG. 23, the control section 2100 adds a Doppler shift H2 to a transmission frequency H1 from the GPS satellites 12a and the like to calculate an estimated frequency A2. The transmission frequency H1 of the GPS satellites 12a and the like is known (e.g. 1575.42 MHz).

The Doppler shift H2 occurs due to the relative movement between each of the GPS satellites 12a and the like and the terminal 2020. The control section 2100 calculates the line-of-sight velocity (velocity in the direction of the terminal 2020) of each of the GPS satellites 12a and the like at the present time using the ephemeris 2152b and the initial position QB0. The control section 2100 calculates the Doppler shift H2 based on the line-of-sight velocity.

The control section 2100 calculates the estimated frequency A2 in units of the GPS satellites 12a and the like (observable satellites).

The estimated frequency A2 includes an error of the drift of a clock (reference oscillator: not shown) of the terminal 2020. The term "drift" refers to a change in oscillation frequency due to a change in temperature.

Therefore, the control section 2100 searches for the radio waves S1 and the like around the estimated frequency A2 within a frequency range with a specific width. For example, the control section 2100 searches for the radio waves S1 and the like at intervals of 100 Hz within the range from (A2−100) kHz to (A2+100) kHz.

When the drift can be estimated in advance, the control section 2100 may calculate the search start center frequency based on the estimated frequency A2 and the estimated drift, differing from the second embodiment.

As shown in FIG. 22, the terminal 2020 stores a measurement calculation program 2116 in the first storage section 2110. The measurement calculation program 2116 is a program for causing the control section 2100 to perform the correlation process of the C/A code received from the GPS satellites 12a and the like and the C/A code replica generated by the terminal 2020 using each of the frequency sequences F1 to F3 in units of the GPS satellites 12a and the like to calculate measurements including the maximum correlation cumulative value Pmax, the correlation cumulative value Pnoise of noise, the candidate code phase, and the reception frequency. The measurement calculation program 2116 and the control section 2100 exemplify a phase calculation section, and also exemplify a reception frequency determination section.

Figure 24A:
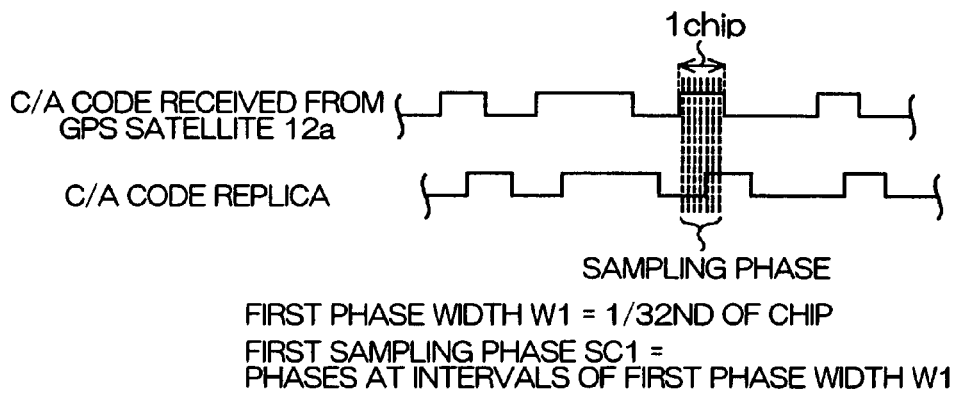
FIGS. 24A to 24C are views illustrative of a measurement calculation program according to the second embodiment.
Figure 24B:
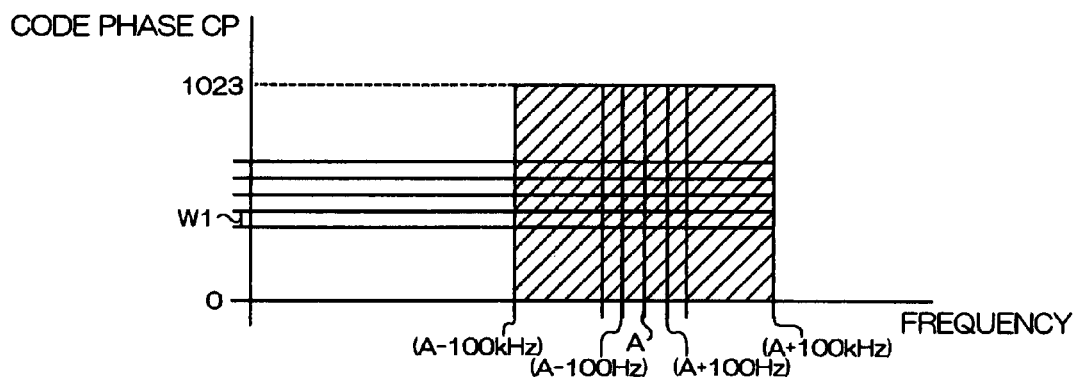
Figure 24C:
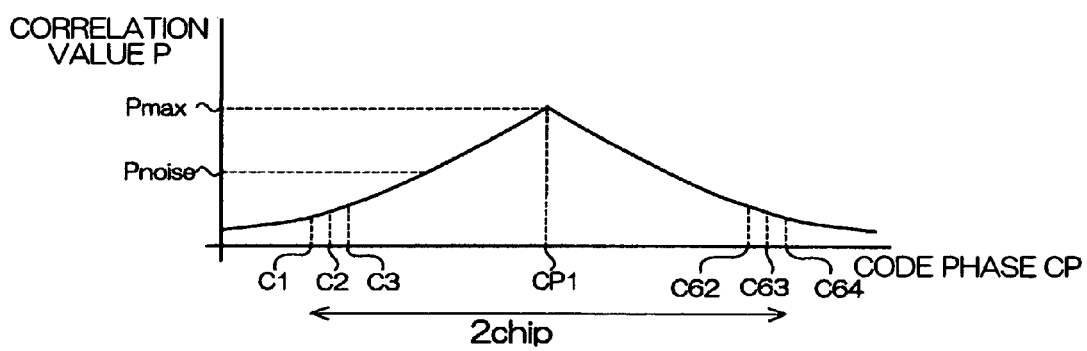

FIGS. 24A to 24C are views illustrative of the measurement calculation program 2116.

As shown in FIG. 24A, the control section 2100 equally divides one chip of the C/A code using the baseband section 2032*b*, and performs the correlation process, for example. One chip of the C/A code is equally divided into 32 sections, for example. Specifically, the control section 2100 performs the correlation process at intervals of a phase width of 1/32nd of the chip (first phase width W1). The phases at intervals of the first phase width W1 when the control section 2100 performs the correlation process are called first sampling phases SC1.

The first phase width W1 is specified as a phase width which allows detection of the maximum correlation value Pmax if the signal strength when the radio waves S1 and the like reach the terminal 2020 is −155 dBm or more. A simulation revealed that the maximum correlation value Pmax can be detected when the signal strength is −155 dBm or more by using a phase width of 1/32nd of the chip, even if the electric field is weak.

As shown in FIG. 24B, the control section 2100 performs the correlation process within the frequency range of ±100 kHz around the estimated frequency A2 at intervals of the first phase width W1. The control section 2100 performs the correlation process while changing the frequency by 100 Hz.

As shown in FIG. 24C, the correlation cumulative values P corresponding to phases C1 to C64 of two chips are output from the baseband section 2032*b*. Each of the phases C1 to C64 is the first sampling phase SC1.

The control section 2100 searches for the first chip to the 1023rd chip of the C/A code based on the measurement calculation program 2116, for example.

The control section 2100 calculates the code phase CPB1, the reception frequency fB1, and the correlation cumulative values PBmax1 and PBnoise1 using each of the frequency sequences F1 to F3 in units of the GPS satellites 12*a* and the like to obtain present measurement information 2160. The code phase CPB1, the reception frequency fB1, and the correlation cumulative values PBmax1 and PBnoise1 are each generically called a measurement.

The code phase CPB1 is converted into distance. Since the code length of the C/A code is 300 kilometers (km), for example, the code phase which is the fraction portion of the C/A code can be converted into distance.

FIG. 25 is a view showing an example of the present measurement information 2160.

As shown in FIG. 25, the present measurement information 2160 indicates a frequency fB11*a*, a code phase CPB11*a*, and correlation cumulative values PBmax11*a* and PBnoise11*a* for the GPS satellite 12*a* using the frequency sequence F1, for example.

The present measurement information 2160 also indicates a frequency fB12*a*, a code phase CPB12*a*, and correlation cumulative values PBmax12*a* and PBnoise12*a* for the GPS satellite 12*a* using the frequency sequence F2.

The present measurement information 2160 also indicates a frequency fB13*a*, a code phase CPB13*a*, and correlation cumulative values PBmax13*a* and PBnoise13*a* for the GPS satellite 12*a* using the frequency sequence F3.

The frequencies fB11*a* to fB13*a* are the reception frequencies when receiving the radio wave S1 from the GPS satellite 12*a*.

Likewise, the present measurement information 2160 indicates the frequencies f11*b* and the like for the GPS satellites 12*b* to 12*f* using the frequency sequences F1 to F3 and the like (not shown).

The measurements of a single GPS satellite 12*a* or the like in a single frequency sequence F1 or the like are called corresponding measurements. For example, the code phase CPB11*a* and the frequency fB11*a* for the GPS satellite 12*a* using the frequency sequence F1 are corresponding measurements.

A narrow correlator method (see JP-A-2000-312163, for example) may be employed as the method of the correlation process, differing from the second embodiment.

As shown in FIG. 22, the terminal 2020 stores a measurement storage program 2118 in the first storage section 2110. The measurement storage program 2118 is a program for causing the control section 2100 to store the measurements in the second storage section 2150.

The control section 2100 stores new measurements in the second storage section 2150 as the present measurement information 2160, and stores the existing present measurement information 2160 in the second storage section 2150 as preceding measurement information 2162. The preceding measurement information 2162 includes the code phase CPB0, the frequency fB0, and the correlation cumulative values PBmax0 and PBnoise0 during the preceding positioning.

FIG. 26 is a view illustrative of the preceding measurement information 2162.

As shown in FIG. 26, the preceding measurement information 2162 indicates the frequencies fB01*a* and the like calculated in each of the frequency sequences F1 to F3 for each of the GPS satellites 12*a* and the like. FIG. 26 shows only the measurements for the GPS satellite 12*a*, and the measurements for the other GPS satellite 12*b* and the like are omitted.

As shown in FIG. 22, the terminal 2020 stores a frequency evaluation program 2120 in the first storage section 2110. The frequency evaluation program 2120 is a program for causing the control section 2100 to determine whether or not the difference between the reception frequency fB0 during the preceding positioning and the reception frequency fB1 during the present positioning is equal to or less than a frequency threshold value α2. A range equal to or less than the frequency threshold value α2 is specified in advance by a threshold value less than the frequency interval between the frequency sequences F1, F2, and F3. When the frequency interval is 50 Hz, as described above, the frequency threshold value α2 is 30 Hz, for example.

The frequency evaluation program 2120 and the control section 2100 exemplify a frequency difference evaluation section. A range equal to or less than the frequency threshold value α2 exemplifies a frequency difference allowable range specified in advance.

The control section 2100 performs the above determination for all of the code phases CPB11*a* and the like (see FIG. 25) indicated by the present measurement information 2160. For example, the control section 2100 determines whether or not the difference between the present frequency fB11*a* and the preceding frequency fB01*a* for the GPS satellite 12*a* is equal to or less than the frequency threshold value α2. Likewise, the control section 2100 determines whether or not the difference between the frequency fB12*a* and the frequency fB02*a* is equal to or less than the frequency threshold value α2, and determines whether or not the difference between the frequency fB13a and the frequency fB03a is equal to or less than the frequency threshold value α2. The control section 2100 determines the frequency difference for the GPS satellites 12b to 12f in the same manner as described above.

When the frequency difference is not equal to or less than the frequency threshold value α2, the terminal 2020 does not use the corresponding code phases CPB11a and the like for positioning. Specifically, the frequency evaluation program 2120 and the control section 2100 exemplify a phase exclusion section.

As shown in FIG. 22, the terminal 2020 stores an estimated code phase program 2122 in the first storage section 2110. The estimated code phase program 2122 is a program for causing the control section 2100 to estimate the present phase and calculate an estimated code phase CPBe based on the code phase CPB0 during the preceding positioning, the Doppler shift of the radio waves S1 and the like, and an elapsed time dt from the preceding positioning time. The estimated code phase CPBe exemplifies an estimated phase. The estimated code phase program 2122 and the control section 2100 exemplify an estimated phase calculation section. The control section 2100 calculates the estimated code phase CPBe in each of the frequency sequences F1 to F3 for each of the GPS satellites 12a and the like.

The estimated code phase CPBe is converted into distance.

FIG. 27 is a view illustrative of the estimated code phase program 2122.

As shown in FIG. 27, the control section 2100 calculates the estimated code phase CPBe using the expression 2, for example.

As indicated by the expression 2, the control section 2100 calculates the estimated code phase CPBe by subtracting a value obtained by multiplying the relative moving velocity between the GPS satellite 12a and the terminal 2020 by the elapsed time dt from the preceding positioning from the code phase CPB0 during the preceding positioning, for example.

In the expression 2, the estimated code phase CPBe and the preceding code phase CPB0 are converted into distance.

The radio waves S1 and the like propagate at the speed of light. Therefore, an approximate velocity corresponding to a Doppler shift of 1 Hz can be calculated by dividing the speed of light by the transmission frequency H1 of the radio waves S1 and the like. Specifically, when the Doppler shift is +1 Hz, the GPS satellite 12a approaches the terminal 2020 at 0.19 meters per second (m/s). Therefore, the estimated code phase CPBe becomes shorter than the code phase CPB0 during the preceding positioning. The Doppler shift is the difference between the frequency fB0 during the preceding positioning and the transmission frequency H1, for example.

On the other hand, when the Doppler shift is −1 Hz, the GPS satellite 12a moves away from the terminal 2020 at 0.19 meters per second (m/s). Therefore, the estimated code phase CPBe becomes longer than the code phase CPB0 during the preceding positioning.

Note that the expression 2 is satisfied provided that the time elapsed from the preceding positioning is short. In other words, the expression 2 is satisfied when the relationship between the code phase and the elapsed time can be indicated by a straight line on a graph.

The average value of the difference between the frequency fB0 during the preceding positioning and the transmission frequency H1 and the difference between the frequency fB1 during the present positioning and the transmission frequency H1 may be used as the Doppler shift, differing from the second embodiment. This allows the estimated code phase CPBe to be calculated more accurately.

The control section 2100 may calculate the estimated code phase CPBe using the code phase CPB0 obtained during the preceding positioning when the correlation process is completed, differing from the second embodiment. Since noise has been reduced by accumulation from the code phase CPB0 obtained when the correlation process is completed, the code phase CPB0 has an accuracy higher than that of the code phase obtained when starting the correlation process or obtained during the correlation process, whereby the accuracy of the estimated code phase CPBe is increased.

The control section 2100 stores estimated code phase information 2164 indicating the calculated estimated code phase CPBe in the second storage section 2150.

FIG. 28 is a view showing an example of the estimated code phase information 2164.

As shown in FIG. 28, the estimated code phase information 2164 indicates an estimated code phase CPBe1a using the frequency sequence F1, an estimated code phase CPBe2a using the frequency sequence F2, and an estimated code phase CPBe3a using the frequency sequence F3 for the GPS satellite 12a, for example. Likewise, the estimated code phase information 2164 indicates estimated code phases CPBe1b and the like for the GPS satellites 12b to 12f in each of the frequency sequences F1 to F3 (not shown).

As shown in FIG. 22, the terminal 2020 stores a code phase evaluation program 2124 in the first storage section 2110. The code phase evaluation program 2124 is a program for causing the control section 2100 to determine whether or not the difference between the present code phase CPB1 and the estimated code phase CPBe is equal to or less than a code phase threshold value β2 (hereinafter called "threshold value β2"). A range equal to or less than the threshold value β2 exemplifies a phase difference allowable range. The code phase evaluation program 2124 and the control section 2100 exemplify a phase difference evaluation section.

The control section 2100 uses the code phase CPB1, which is determined to correspond to a frequency difference equal to or less than the threshold value α2 based on the frequency evaluation program 2120, for determination based on the code phase evaluation program 2124.

When the code phase difference is equal to or less than the threshold value β2, the control section 2100 increments a code phase difference evaluation pass count (hereinafter called "pass count") by one for each of the frequency sequences F1 to F3 in units of the GPS satellites 12a and the like based on the code phase evaluation program 2124. When the code phase difference is greater than the threshold value β2, the control section 2100 sets the pass count to zero for each of the frequency sequences F1 to F3 in units of the GPS satellites 12a and the like.

The control section 2100 stores code phase evaluation pass count information 2166 indicating the pass count in the second storage section 2150.

As shown in FIG. 22, the terminal 2020 stores a code phase selection program 2126 in the first storage section 2110. The code phase selection program 2126 is a program for causing the control section 2100 to select the code phase CPB1 with the minimum code phase difference from the code phases CPB1 corresponding to a code phase difference equal to or less than the threshold value β2 as a selected code phase CP1s in units of the GPS satellites 12a and the like. The selected code phase CP1s exemplifies a selected phase. The code phase selection program 2126 and the control section 2100 exemplify a phase selection section.

FIG. 29 is a view illustrative of the code phase selection program 2126.

As shown in FIG. 29, the control section 2100 calculates the absolute value dCPB11a of the difference between the code phases CPB11a and CPBe1a for the GPS satellite 12a using the frequency sequence F1, for example. The control section 2100 calculates the absolute value dCPB12a of the difference between the code phases CPB12a and CPBe2a using the frequency sequence F2, and calculates the absolute value dCPB13a of the difference between the code phases CPB13a and CPBe3a using the frequency sequence F3.

For example, when the absolute value dCPB11a is the smallest among the absolute values dCPB11a to dCPB13a, the control section 2100 selects the code phase CPB11a, as shown in FIG. 29.

The control section 2100 sets the code phase CPB11a to be the selected code phase CP1sa.

The control section 2100 selects the code phase as described above in units of the GPS satellites 12a and the like.

The control section 2100 stores selected code phase information 2168 indicating the selected code phase CP1s in the second storage section 2150.

FIG. 30 is a view showing an example of the selected code phase information 2168.

The selected code phase information 2168 indicates the code phase calculated in one of the frequency sequences F1 to F3 in units of the GPS satellites 12a and the like.

As shown in FIG. 22, the terminal 2020 stores a selected code phase first evaluation program 2128 in the first storage section 2110. The selected code phase first evaluation program 2128 is a program for causing the control section 2100 to determine whether or not the signal strength XPR of the selected code phase CP1sa and the like is maximum. The selected code phase first evaluation program 2128 and the control section 2100 exemplify a selected phase first evaluation section.

In more detail, the control section 2100 determines whether or not the signal strength XPR of the selected code phase CP1sa is maximum among the code phases CPB1 and the like in units of the GPS satellites 12a and the like.

As shown in FIG. 22, the terminal 2020 stores a selected code phase second evaluation program 2130 in the first storage section 2110. The selected code phase second evaluation program 2130 is a program for causing the control section 2100 to determine whether or not the pass count is equal to or more than γ. γ is three, for example. γ is specified in advance. A range equal to or more than γ exemplifies a predetermined count range. The selected code phase second evaluation program 2130 and the control section 2100 exemplify a selected phase second evaluation section.

The pass count is set at zero when the code phase difference is not continuously equal to or less than the threshold value β2. Therefore, when the pass count is equal to or more than γ, the code phase difference is continuously equal to or less than the threshold value β2 γ times or more.

The selected code phase second evaluation program 2130 is also a program for causing the control section 2100 to determine whether or not a decrease in the signal strength XPR has occurred during the accumulation time a predetermined number of times (e.g. 10 times) or more.

In more detail, when the control section 2100 has determined that the signal strength XPR of the selected code phase CP1sa is not maximum based on the selected code phase first evaluation program 2128, the control section 2100 performs the determination process based on the selected code phase second evaluation program 2130.

Figure 31A:
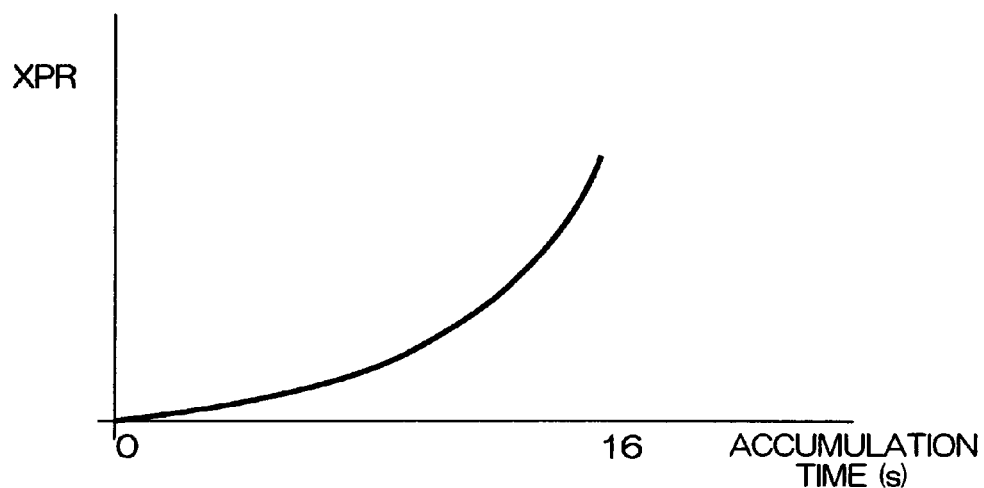
FIGS. 31A to 31C are views illustrative of a selected code phase second evaluation program according to the second embodiment.
Figure 31B:
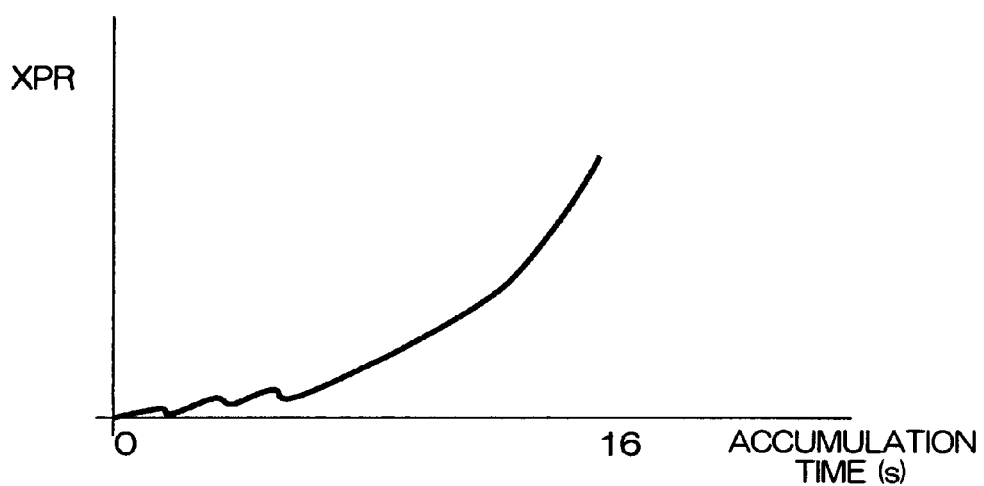
Figure 31C:
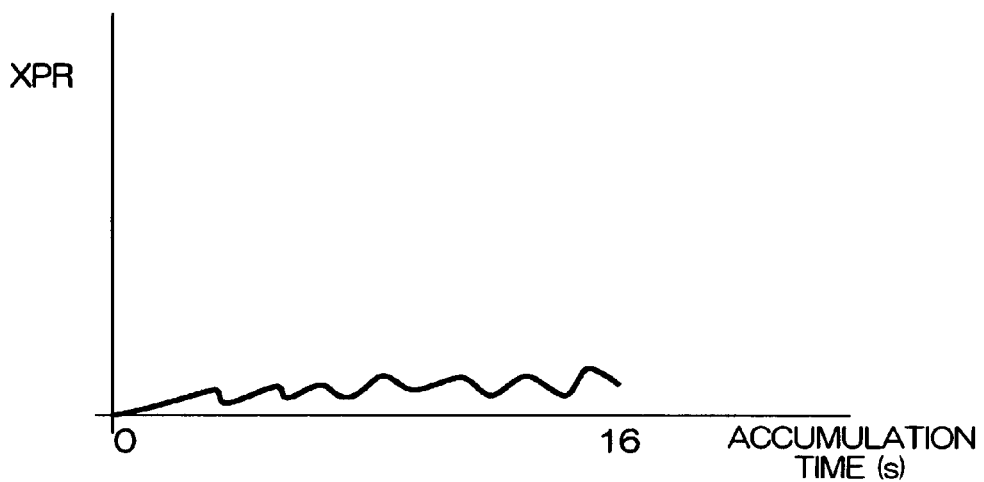

FIGS. 31A to 31C are views illustrative of the selected code phase second evaluation program 2130.

As shown in FIG. 31A, when the accumulation time is 16 seconds (s), the signal strength XPR is maximum when 16 seconds (s) has elapsed (when accumulation has been completed), for example. Specifically, while noise is canceled, the C/A code is accumulated. The code phase obtained when accumulation has been completed has high reliability.

The signal strength XPR theoretically increases from the commencement of accumulation to the completion of accumulation.

However, the signal strength XPR may decrease immediately after the commencement of accumulation, as shown in FIG. 31B. Therefore, the code phase cannot be accurately calculated.

When the signal received by the terminal 2020 is noise (false signal), the signal strength XPR does not increase even when accumulation has been completed, as shown in FIG. 31C. Therefore, it is difficult to calculate the code phase.

As described above, even if the radio wave received by the terminal 2020 is a radio wave carrying the C/A code or noise, the signal strength XPR is low and may decrease immediately after the commencement of accumulation. When the radio wave received by the terminal 2020 is a radio wave carrying the C/A code, the signal strength XPR increases with the passage of the accumulation time.

Therefore, when a state in which the code phase difference is equal to or less than the threshold value β2 continuously occurs after a specific period of time has elapsed after the commencement of accumulation, it is considered that the received signal is not noise.

On the other hand, when a decrease in the signal strength XPR occurs after a specific period of time has elapsed after the commencement of accumulation, the received signal is considered to be noise. In other words, when a decrease in the signal strength XPR does not occur after a specific period of time has elapsed after the commencement of accumulation, it is considered that the received signal is not noise.

Therefore, the terminal 2020 determines whether or not the received signal is noise based on whether or not a state in which the code phase difference is equal to or less than the threshold value β2 has continuously occurred and whether or not a decrease in the signal strength XPR has continuously occurred.

As shown in FIG. 22, the terminal 2020 stores a positioning program 2132 in the first storage section 2110. The positioning program 2132 is a program for causing the control section 2100 to locate the present position using the selected code phase CP1s as the positioning code phase CPB1f when the determination result based on the selected code phase first evaluation program 2128 or the selected code phase second evaluation program 2130. The positioning program 2132 and the control section 2100 exemplify a positioning section.

For example, when the signal strength XPR of the selected code phase CP1sa is maximum, the control section 2100 uses the selected code phase CP1sa as the positioning code phase CPB1fa.

Even if the signal strength XPR of the selected code phase CP1sa is not maximum, the control section 2100 uses the selected code phase CP1sa as the positioning code phase CPB1fa when the code phase evaluation pass count is equal to or more than γ and a decrease in the signal strength XPR has occurred less than 10 times.

When the signal strength XPR of the selected code phase CP1sa is not maximum and the code phase evaluation pass count is less than γ or a decrease in the signal strength XPR has occurred 10 times or more, the control section 2100 uses the code phase CPB12a or CP13a other than the selected code phase CP1sa (code phase CPB11a) with a higher signal strength XPR as the positioning code phase CPB1fa.

The control section 2100 stores positioning code phase information 2170 indicating the determined positioning code phase CPB1f in the second storage section 2150.

FIG. 32 is a view showing an example of the positioning code phase information 2170.

As shown in FIG. 32, the positioning code phase information 2170 is information indicating the positioning code phases CPB1fa, CPB1fb, CPB1fc, and CPB1fd respectively corresponding to the GPS satellites 12a, 12b, 12c, and 12d, for example.

The control section 2100 calculates the present position Q1 using the positioning code phases CPB1fa, CPB1fb, CPB1fc, and CPB1fd indicated by the positioning code phase information 2170.

The control section 2100 stores located position information 2172 indicating the calculated located position QB1 in the second storage section 2150.

As shown in FIG. 22, the terminal 2020 stores a located position output program 2134 in the first storage section 2110. The located position output program 2134 is a program for causing the control section 2100 to display the located position QB1 on the display device 2034 (see FIG. 20).

The terminal 2020 is configured as described above.

The terminal 2020 can determine whether or not the code phase difference is equal to or less than the threshold value β2. Specifically, the terminal 2020 can verify the accuracy of the code phase CPB1.

The terminal 2020 can select the code phase CPB1 with the minimum code phase difference from the code phases CPB1 corresponding to a code phase difference equal to or less than the threshold value β2 as the selected code phase CP1s in units of the GPS satellites 12a and the like. Since the selected code phase CP1s is the code phase with the minimum code phase difference, the selected code phase CP1s has high accuracy in comparison with the code phases CPB1 in other frequency sequences.

The terminal 2020 can determine whether or not the signal strength XPR of the selected code phase CP1s is maximum. If the signal strength XPR of the selected code phase CP1s is maximum, it is considered that the selected code phase CP1s has high accuracy in comparison with other code phases CPB1.

When the determination result based on the selected code phase first evaluation program 2128 is YES, the terminal 2020 can locate the present position using the selected code phase CP1s as the positioning code phase CPB1f.

Therefore, the terminal 2020 can verify the accuracy of the phase of the positioning base code and accurately locate the position under a weak electric field in which the radio wave strength is weak.

Since the terminal 2020 includes the selected code phase second evaluation program 2130, the terminal 2020 can locate the present position using the selected code phase CP1s when the code phase in one of the frequency sequences F1 to F3 to which the selected code phase CP1s belongs is continuously equal to or less than the threshold value β2 three times or more.

When the code phase calculated using the frequency sequence F1 or the like to which the selected code phase CP1s belongs is continuously equal to or less than the threshold value β2 three times or more, the code phase calculated using the frequency sequence F1 or the like to which the selected code phase CP1s belongs has high accuracy in comparison with the code phases calculated using other frequency sequences.

Therefore, the terminal 2020 can locate the position using the code phase with high accuracy, even if the determination result based on the selected code phase first evaluation program 2128 is NO.

The terminal 2020 can exclude the code phase CPB1 corresponding to the frequency fB1 outside the range equal to or less than the frequency threshold value α2 from positioning.

This means that the terminal 2020 can verify not only the accuracy of the code phase CPB1 of the C/A code, but also the accuracy of the reception frequency fB1 when calculating the code phase CPB1.

Therefore, the terminal 2020 can verify the accuracy of the code phase of the positioning base code and more accurately locate the position under a weak electric field in which the signal strength is weak.

The configuration of the terminal 2020 according to the second embodiment has been described above. An operation example of the terminal 2020 is described below mainly using FIG. 33.

Figure 33:
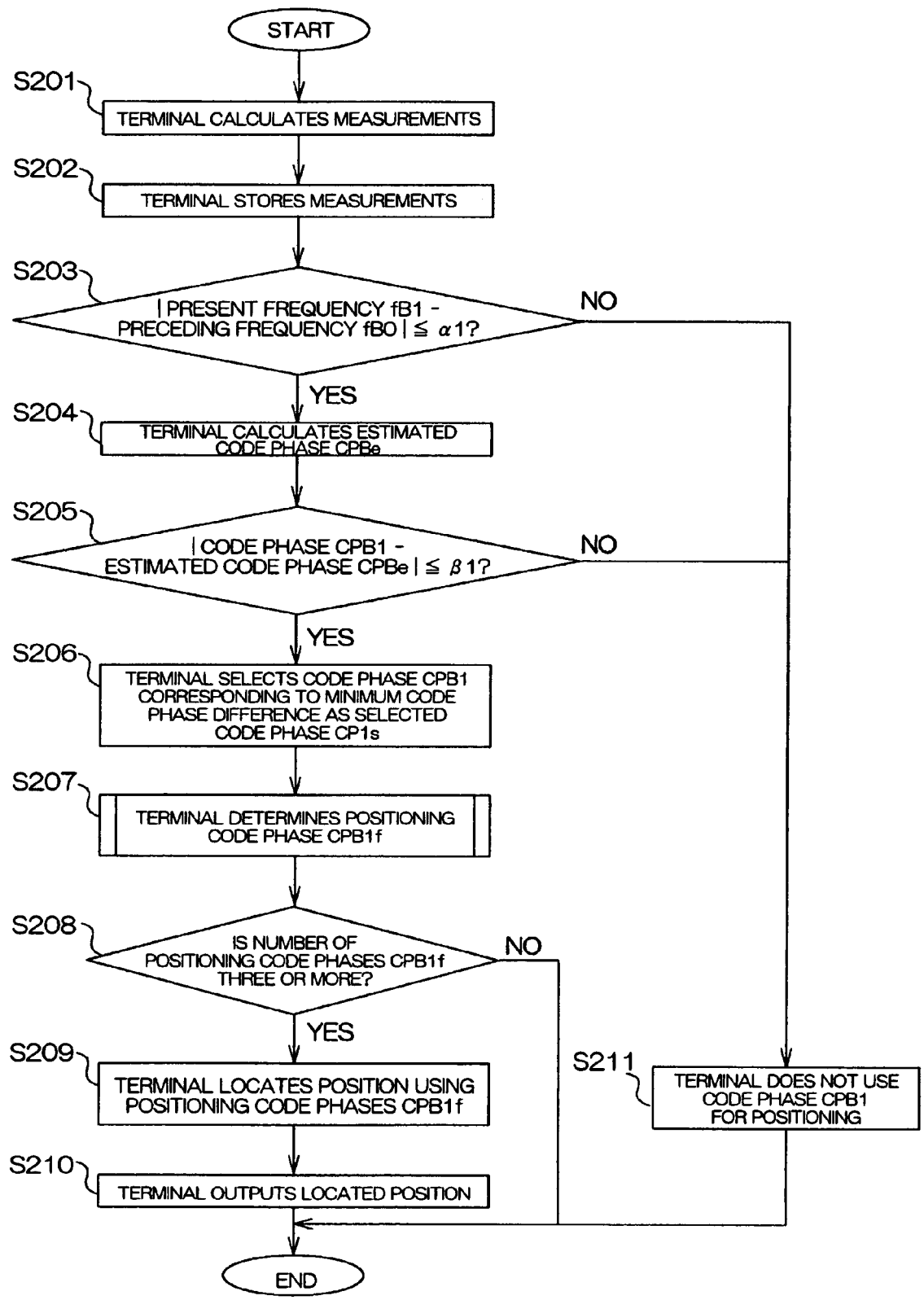
FIG. 33 is a schematic flowchart showing an operation example of the terminal according to the second embodiment.

FIG. 33 is a schematic flowchart showing an operation example of the terminal 2020.

The terminal 2020 receives the radio waves S1 and the like and calculates the measurements (step S201 in FIG. 33). The step S201 exemplifies a phase calculation step.

The terminal 2020 stores the measurements (step S202).

The terminal 2020 determines whether or not the absolute value of the difference between the present frequency fB1 and the preceding frequency fB0 is equal to or less than the frequency threshold value α2 (step S203).

The terminal 2020 does not use the code phase CPB1 corresponding to a frequency difference which has been determined to be greater than the frequency threshold value α2 in the step S203 for positioning (step S211).

On the other hand, the terminal 2020 calculates the estimated code phase CPBe for the code phase CPB1 corresponding to the frequency difference which has been determined to be equal to or less than the frequency threshold value α2 in the step S203 (step S204). The step S204 exemplifies an estimated phase calculation step.

The terminal 2020 determines whether or not the absolute value of the difference between the code phase CPB1 and the estimated code phase CPBe is equal to or less than the threshold value β2 (step S205). The step S205 exemplifies a phase evaluation step.

The terminal 2020 does not use the code phase CPB1 corresponding to a code phase difference which has been determined to be greater than the threshold value β2 in the step S205 for positioning (step S211).

The terminal 2020 selects the code phase CPB1 corresponding to the minimum code phase difference from the code phases CPB1 corresponding to the code phase difference which has been determined to be greater than the threshold value β2 in the step S205 as the selected code phase CP1s in units of the GPS satellites 12a and the like (step S206). The step S206 exemplifies a phase selection step.

The terminal 2020 determines the positioning code phase CPB1f (step S207).

The details of the step S207 are described below with reference to FIG. 34 taking an example of determining whether or not to use the selected code phase CP1s a in the positioning sequence F1 for the GPS satellite 12a for positioning.

Figure 34:
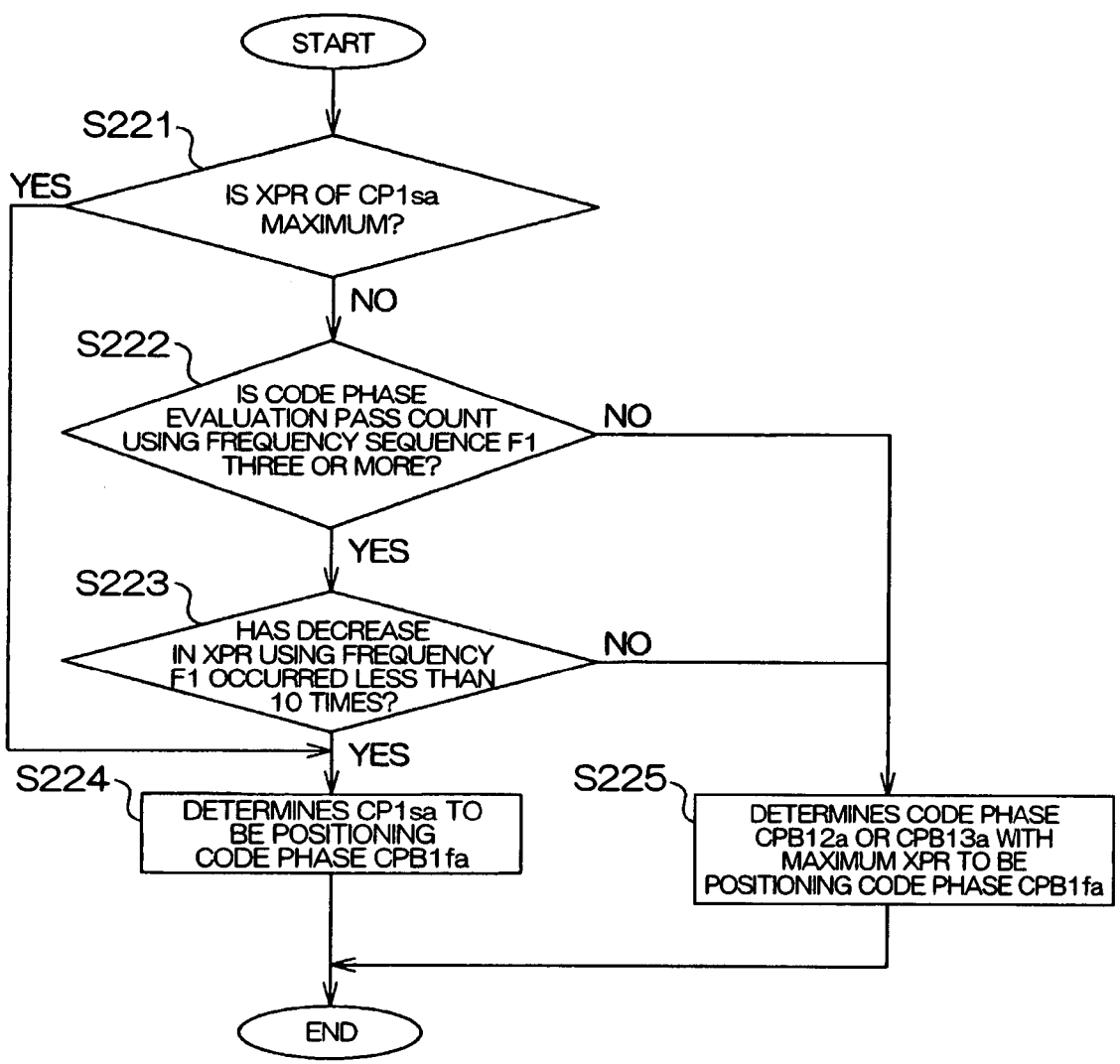
FIG. 34 is a schematic flowchart showing an operation example of the terminal according to the second embodiment.

FIG. 34 is a flowchart showing the details of the step S207.

The terminal 2020 determines whether or not the signal strength XPR of the selected code phase CP1sa is maximum (step S221 in FIG. 34). The step S221 exemplifies a selected phase first evaluation step.

When the determination result in the step S221 is YES, the terminal 2020 determines the selected code phase CP1sa to be the positioning code phase CPB1fa (step S224).

When the determination result in the step S221 is NO, the terminal 2020 determines whether or not the code phase evaluation pass count using the frequency sequence F1 is three or more (step S222). The step S222 exemplifies a selected phase second evaluation step.

When the determination result in the step S222 is YES, the terminal 2020 determines whether or not a decrease in the signal strength XPR using the frequency sequence F1 has occurred less than 10 times (step S223).

When the terminal 2020 has determined that a decrease in the signal strength XPR using the frequency sequence F1 has occurred less than 10 times in the step S223, the terminal 2020 determines the selected code phase CP1sa to be the positioning code phase CPB1fa (step S224).

When the determination result in the step S222 is NO, or when the terminal 2020 has determined that a decrease in the signal strength XPR using the frequency sequence F1 has occurred 10 times or more in the step S223, the terminal 2020 determines the code phase CP12a or CP13a with the maximum signal strength XPR to be the positioning code phase CPB1fa (step S225).

The terminal 2020 performs the above steps S221 to S225 in units of the GPS satellites 12a and the like.

The terminal 2020 determines whether or not the number of positioning code phases CPB1f is three or more (step S208).

When the terminal 2020 has determined that the number of positioning code phases CPB1f is less than three in the step S208, the process is terminated since the position cannot be determined.

When the terminal 2020 has determined that the number of positioning code phases CPB1f is three or more in the step S206, the terminal 2020 locates the position using the positioning code phases CPB1f (step S209). The step S209 exemplifies a positioning step.

The terminal 2020 then outputs the located position QB1 (see FIG. 22) (step S210).

The above steps allow the terminal 2020 to verify the accuracy of the phase of the positioning base code and accurately locate the position under a weak electric field in which the signal strength is weak.

Third Embodiment

Figure 35:
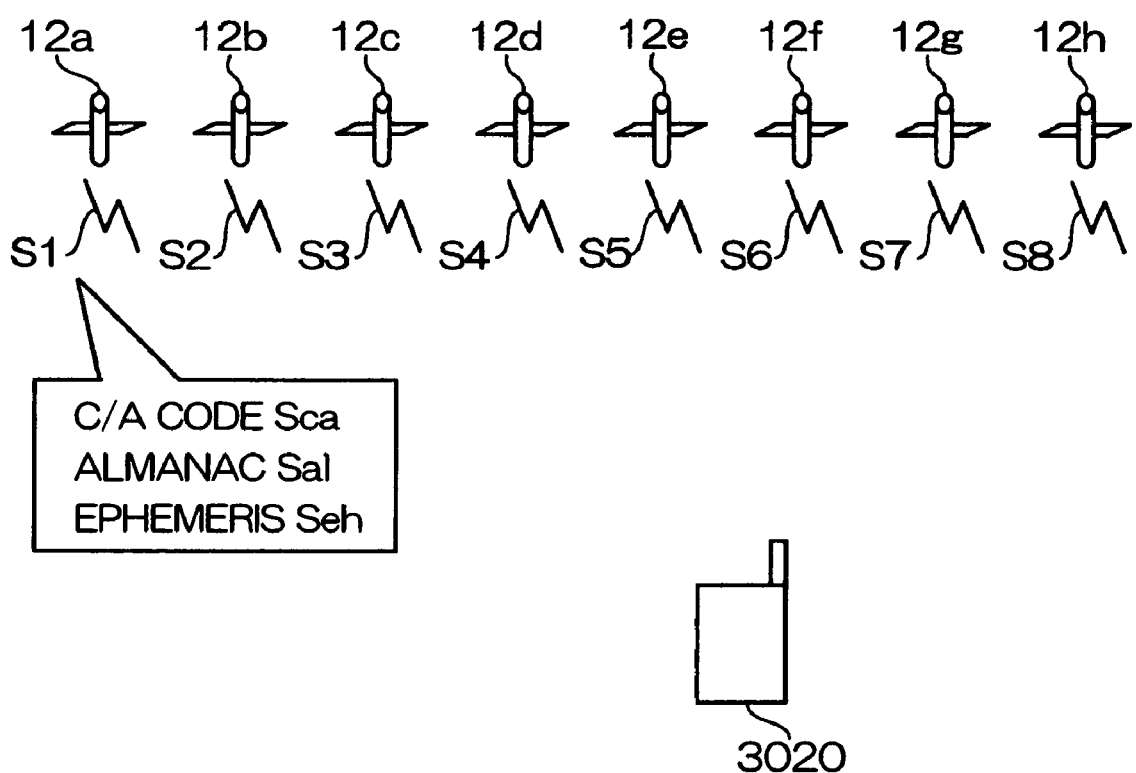
FIG. 35 is a schematic view showing a terminal and the like according to a third embodiment.

FIG. 35 is a schematic view showing a terminal 3020 and the like according to a third embodiment.

As shown in FIG. 35, the terminal 3020 can receive radio waves S1, S2, S3, S4, S5, S6, S7, and S8 from GPS satellites (positioning satellites) 12a, 12b, 12c, 12d, 12e, 12f, 12g, and 12h, for example. The GPS satellites 12a and the like exemplify a transmission source. The transmission source is not limited to the GPS satellite insofar as the transmission source is a satellite positioning system (SPS) satellite.

Various codes are carried on the radio waves S1 and the like. A C/A code Sca is one of such codes. The C/A code Sca is a signal having a bit rate of 1.023 Mbps and a bit length of 1023 bits (=1 msec). The C/A code Sca includes 1023 chips. The terminal 3020 exemplifies a positioning device which locates the present position, and locates the present position using the C/A code. The C/A code Sca exemplifies a positioning base code.

As information carried on the radio waves S1 and the like, an almanac Sal and an ephemeris Seh can be given. The almanac Sal is information indicating the approximate satellite orbits of all of the GPS satellites 12a and the like, and the ephemeris Seh is information indicating the precise satellite orbit of each of the GPS satellites 12a and the like. The almanac Sal and the ephemeris Seh are generically called a navigation message.

The terminal 3020 can locate the present position by specifying the phases of the C/A codes from three or more GPS satellites 12a and the like, for example.

Figure 36:
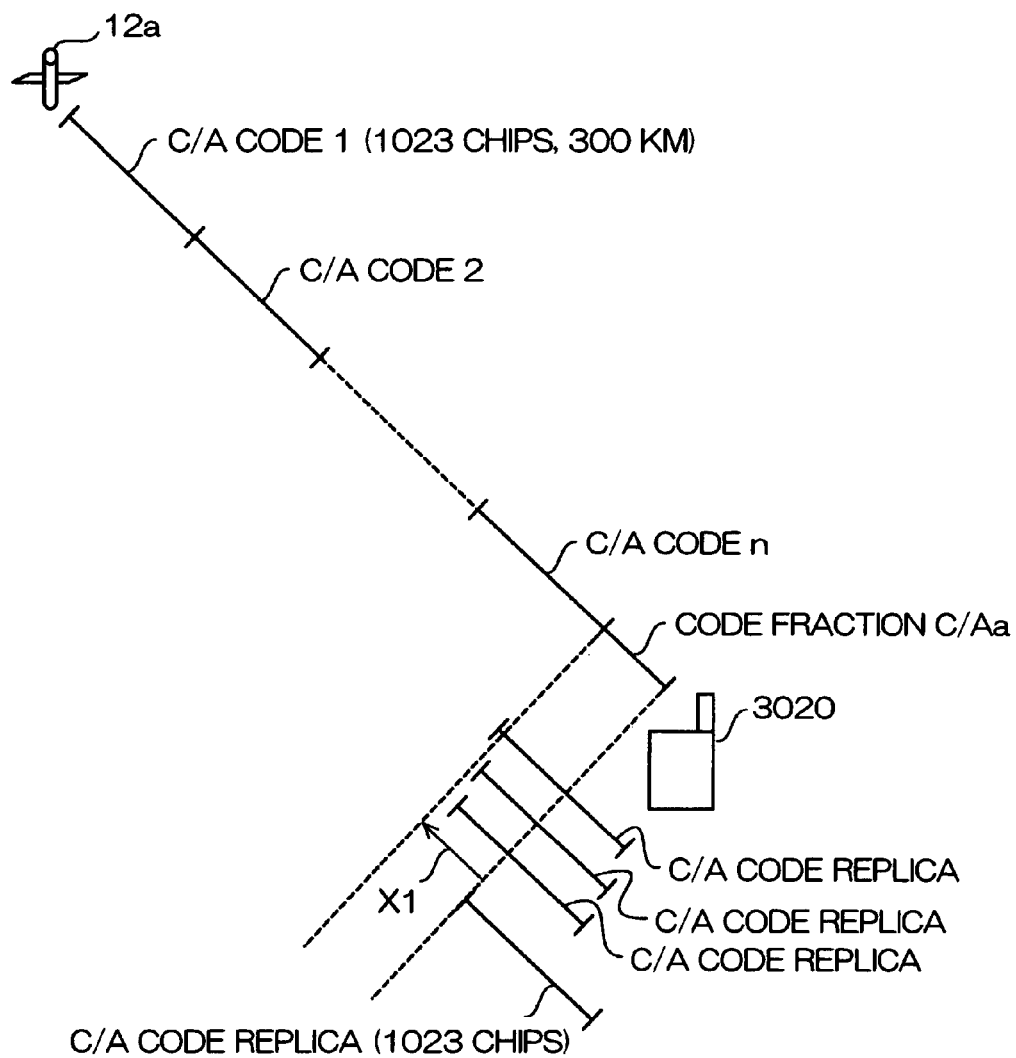
FIG. 36 is a schematic view showing a positioning method according to the third embodiment.

FIG. 36 is a schematic view showing an example of a positioning method.

As shown in FIG. 36, it may be considered that the C/A codes continuously line up between the GPS satellite 12a and the terminal 3020, for example. Since the distance between the GPS satellite 12a and the terminal 3020 is not necessarily a multiple of the length (300 kilometers (km)) of the C/A code, a code fraction C/Aa may exist. Specifically, a portion of a multiple of the C/A code and a fraction portion may exist between the GPS satellite 12a and the terminal 3020. The total length of the portion of a multiple of the C/A code and the fraction portion is the pseudo-range. The terminal 3020 locates the position using the pseudo-ranges for three or more GPS satellites 12a and the like.

In this embodiment, the fraction portion C/Aa of the C/A code is called a "code phase". The code phase may be indicated by the number of the chip included in the 1023 chips of the C/A code, or may be converted into distance, for example. When calculating the pseudo-range, the code phase is converted into distance.

The position of the GPS satellite 12a in the orbit can be calculated using the ephemeris Seh. The portion of a multiple of the C/A code can be specified by calculating the distance between the position of the GPS satellite 12a in the orbit and an initial position QC0 described later, for example. Since the length of the C/A code is 300 kilometers (km), the position error of the initial position QC0 must be 150 kilometers (km) or less.

As shown in FIG. 36, a correlation process is performed while moving the phase of the C/A code replica in the direction indicated by the arrow X1, for example. The terminal 3020 performs the correlation process while changing the synchronization frequency. The correlation process includes a coherent process and an incoherent process described later.

The phase having the maximum correlation cumulative value is the code fraction C/Aa.

Note that the terminal 3020 may locate the position using a radio wave from a portable telephone base station or the like, differing from the third embodiment. The terminal 3020 may locate the position by receiving a radio wave through a local area- network (LAN), differing from the third embodiment.

Figure 37:
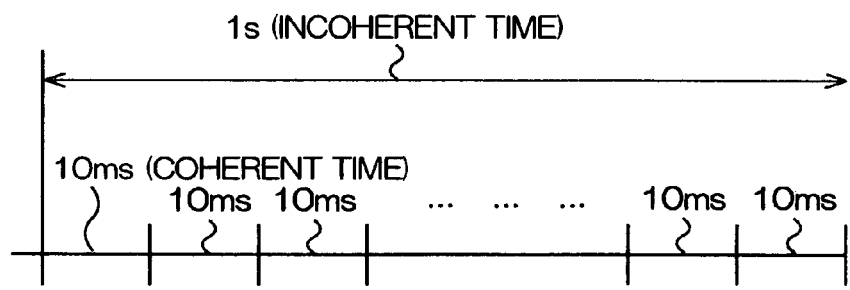
FIG. 37 is a view illustrative of a correlation process according to the third embodiment.

FIG. 37 is a view illustrative of the correlation process.

The coherent process is a process of correlating the C/A code received by the terminal 3020 with a C/A code replica. The C/A code replica is a code generated by the terminal 3020. The C/A code replica exemplifies a positioning base code replica.

For example, when the coherent time is 10 msec, as shown in FIG. 37, the correlation value between the C/A code synchronously accumulated over 10 msec and the C/A code replica and the like are calculated. The correlated phase (code phase) and the correlation value are output as a result of the coherent process.

The incoherent process is a process of calculating the correlation cumulative value (incoherent value) by accumulating the correlation values as the coherent results.

The code phase output by the coherent process and the correlation cumulative value are output as a result of the correlation process.

Figure 38:
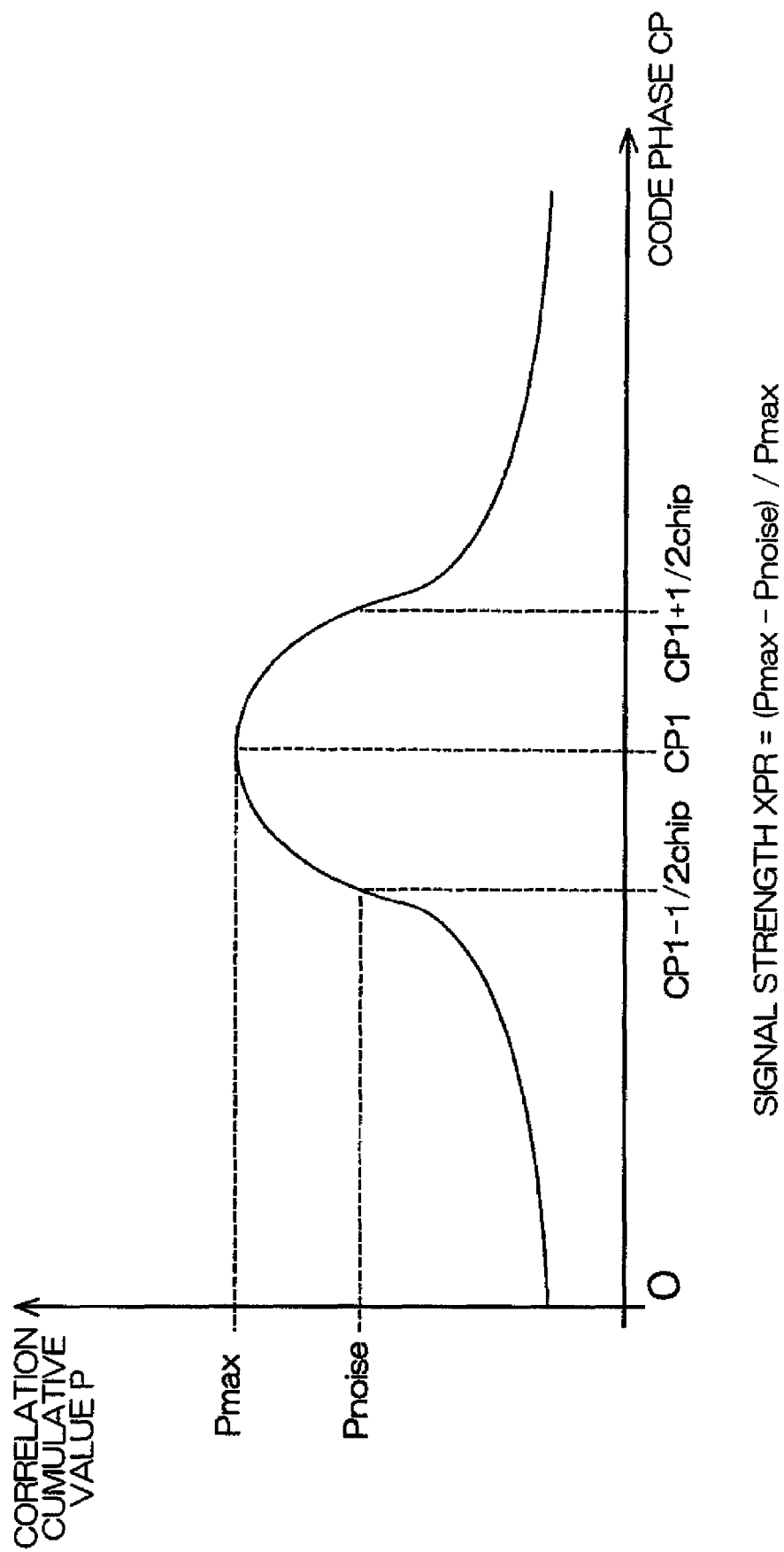
FIG. 38 is a view showing an example of the relationship between a correlation cumulative value and a code phase according to the third embodiment.

FIG. 38 is a view showing an example of the relationship between the correlation cumulative value and the code phase.

A code phase CP1 corresponding to the maximum correlation cumulative value Pmax shown in FIG. 38 is the code phase of the C/A code replica (i.e. the code phase of the C/A code).

The terminal 3020 sets the correlation cumulative value of one of the code phases at an interval of half of the chip from the code phase CP1 having a smaller correlation cumulative value to be a correlation cumulative value Pnoise of noise, for example.

The terminal 3020 specifies a value obtained by dividing the difference between the correlation cumulative values Pmax and Pnoise by the correlation cumulative value Pmax as a signal strength XPR. The signal strength XPR exemplifies a signal strength.

The terminal 3020 sets the code phase CP1 to be a candidate for the code phase used for positioning when the signal strength XPR is 0.2 or more, for example. This code phase is hereinafter also called a "candidate code phase". The candidate code phase is a candidate for the code phase used for positioning, and the terminal 3020 does not necessarily use the candidate code phase for positioning.

Figure 39:
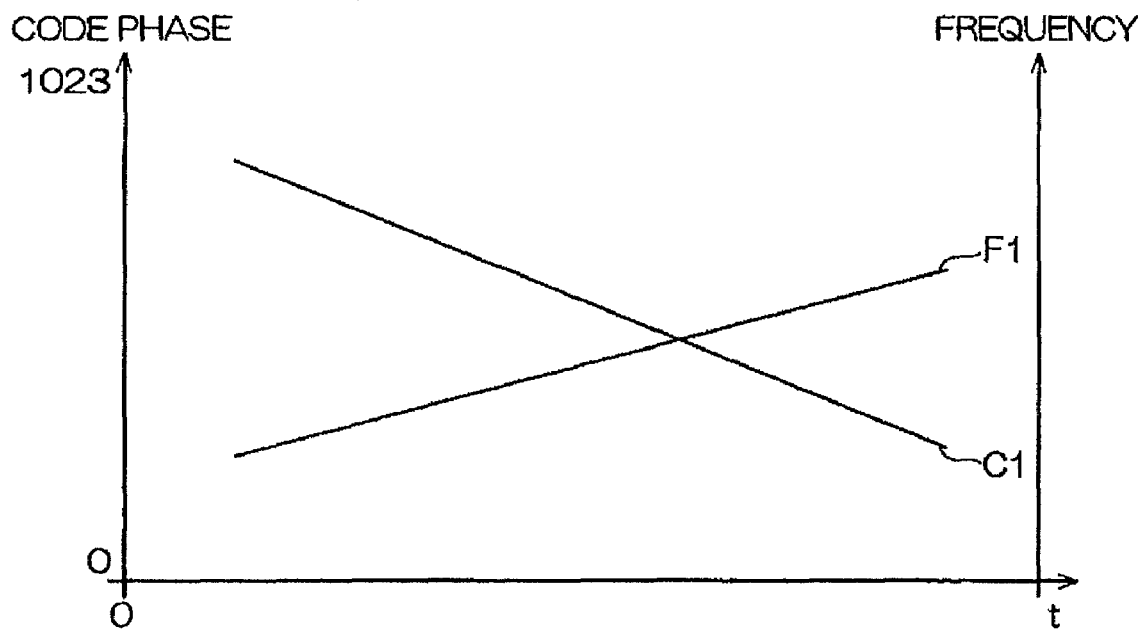
FIG. 39 is a view showing an example of the relationship between a candidate code phase and the passage of time and the like according to the third embodiment.
Figure 40:
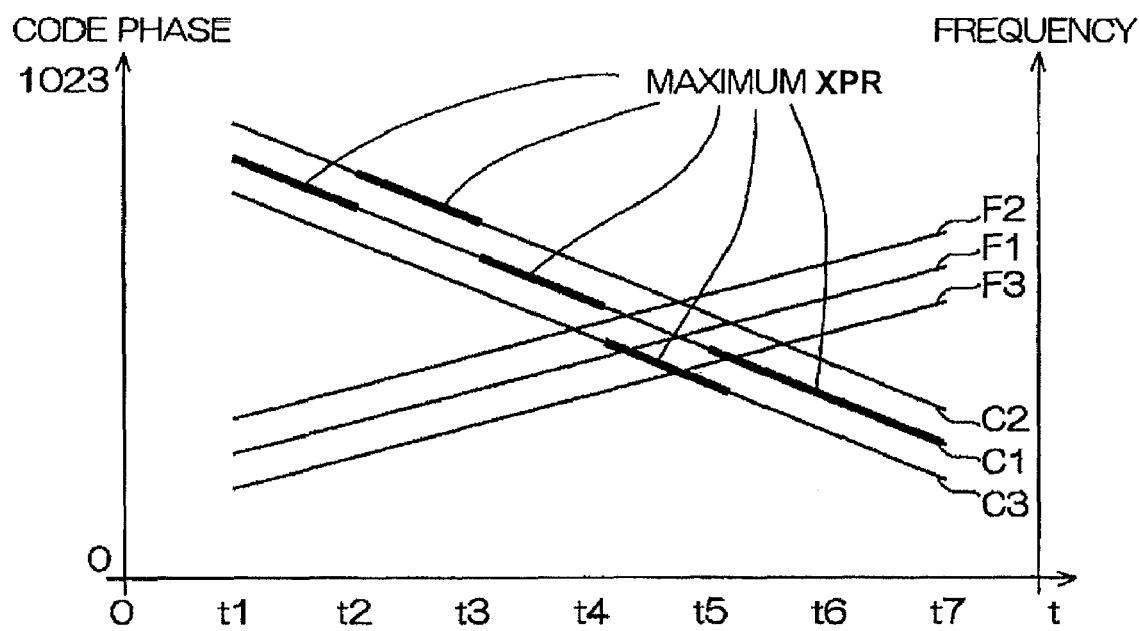
FIG. 40 is a view showing an example of the relationship between a candidate code phase and the passage of time and the like according to the third embodiment.

FIGS. 39 and 40 are views showing an example of the relationship between the candidate code phase and the passage of time and the like.

FIG. 39 shows a state in which the GPS satellite 12a approaches the terminal 3020, for example.

Since the distance between the GPS satellite 12a and the terminal 3020 decreases as the GPS satellite 12a approaches the terminal 3020, the candidate code phase C1 approaches zero with the passage of time.

The synchronization frequency F1 is set to become higher with the passage of time. This aims at dealing with a situation in which the arrival frequency of the radio wave S1 when the radio wave S1 reaches the terminal 3020 increases due to the Doppler shift which occurs when the GPS satellite 12a approaches the terminal 3020.

As shown in FIG. 40, the terminal 3020 uses three frequency sequences F1, F2, and F3 in order to efficiently achieve synchronization with the arrival frequency which changes, for example. The frequency sequences F1 and the like exemplify a frequency sequence. The frequency sequences F1 and F2 differ by a frequency width of 50 Hz. The frequency sequences F1 and F3 differ by a frequency width of 50 Hz. A frequency interval of 50 Hz is specified in advance. Specifically, a frequency interval of 50 Hz exemplifies a frequency interval. The frequency interval is set to be less than the frequency search step interval in the correlation process performed by the terminal 2020. For example, when the frequency search step interval is 100 Hz (see FIG. 45B), the frequency interval is set to be less than 100 Hz.

It suffices that the number of frequency sequences F1 and the like be two or more. For example, the number of frequency sequences F1 and the like may be four or more, differing from the third embodiment.

As shown in FIG. 40, each of the frequency sequences F1 and the like is set to change with the passage of time in expectation of the Doppler shift of the arrival frequency.

One of the frequency sequences F1 and the like follows the Doppler shift of the arrival frequency with the highest accuracy.

The code phase C1 is calculated using the frequency sequence F1. The code phase C2 is calculated using the frequency sequence F2. The code phase C3 is calculated using the frequency sequence F3.

The three code phases C1 and the like are calculated in parallel in this manner. It is assumed that the candidate code phase calculated with the highest signal strength XPR has the highest reliability.

However, the frequency sequences F1 and the like with the highest signal strength XPR are not necessarily maintained. As shown in FIG. 40, the signal strength XPR of the candidate code phase C1 calculated using the frequency sequence F1 is the highest between the times t1 and t2, and the signal strength XPR of the candidate code phase C2 calculated using the frequency sequence F2 is the highest between the times t2 and t3, for example.

Since the frequency of each of the frequency sequences F1 and the like is changed based on the expected Doppler shift, the accuracy of the candidate code phase calculated using one frequency sequence should be continuously higher than those of the candidate code phases calculated using other frequency sequences. In other words, the frequency sequence F1 should accurately follow the actual arrival frequency in comparison with other frequency sequences F2 and F3, for example.

Therefore, when the frequency sequence changes with the passage of time, the candidate code phase calculated with a high signal strength XPR does not necessarily have the highest accuracy.

The terminal 3020 can verify the accuracy of the candidate code phase and accurately locate the position under a weak electric field using the following hardware configuration and software configuration.

(Main Hardware Configuration of Terminal 3020)

Figure 41:
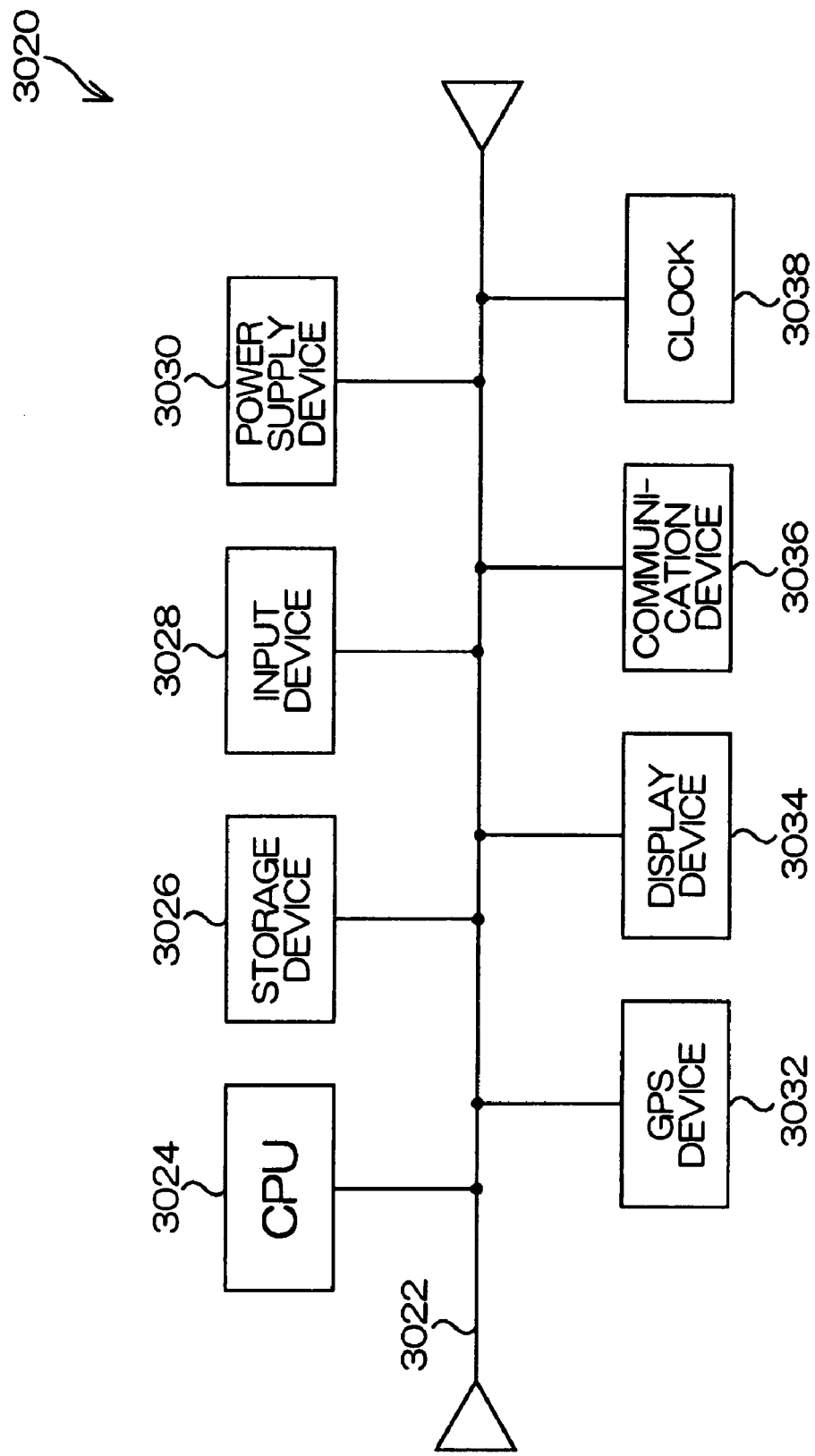
FIG. 41 is a schematic view showing the main hardware configuration of the terminal according to the third embodiment.
Figure 42:
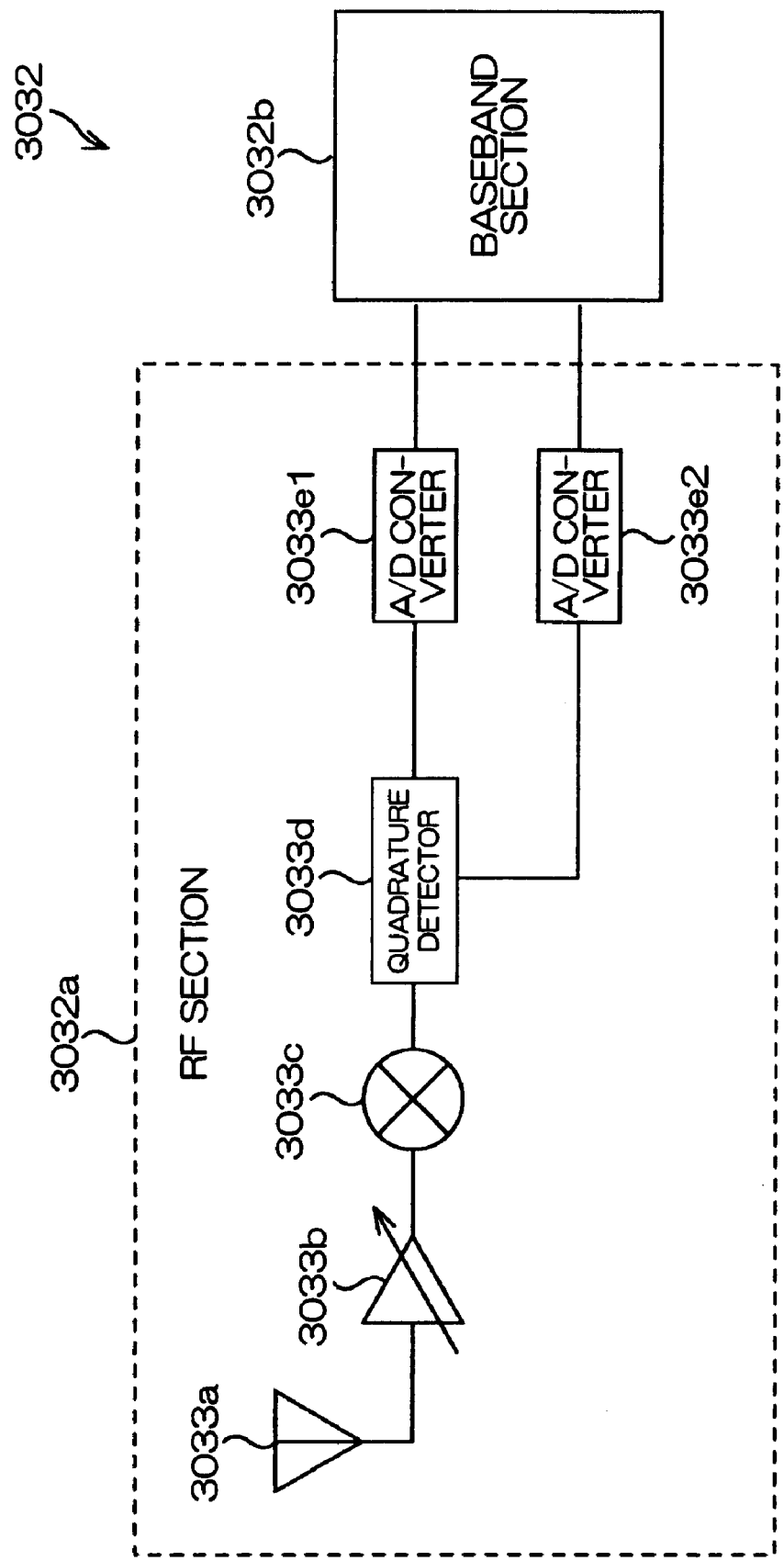
FIG. 42 is a schematic view showing an example of the configuration of a GPS device according to the third embodiment.

FIG. 41 is a schematic view showing the main hardware configuration of the terminal 3020.

As shown in FIG. 41, the terminal 3020 includes a computer which includes a bus 3022. A central processing unit (CPU) 3024, a storage device 3026, and the like are connected with the bus 3022. The storage device 3026 is a random access memory (RAM), a read only memory (ROM), or the like.

An input device 3028, a power supply device 3030, a GPS device 3032, a display device 3034, a communication device 3036, and a clock 3038 are also connected with the bus 3022.

(Configuration of GPS Device 3032)

FIG. 37 is a schematic view showing the configuration of the GPS device 3032.

As shown in FIG. 37, the GPS device 3032 includes an RF section 3032a and a baseband section 3032b.

The RF section 3032a receives the radio waves S1 and the like through an antenna 3033a. An LNA 3033a (amplifier) amplifies the signal such as the C/A code carried on the radio wave S1. A mixer 3033c down-converts the frequency of the signal. A quadrature (IQ) detector 3033d separates the signal. A/D converters 3033e1 and 3033e2 convert the separated signals into digital signals.

The baseband section 3032b receives the digitally-converted signals from the RF section 3032a, samples and accumulates the signals, and correlates the signals with the C/A code held by the baseband section 3032b. The baseband section 3032b includes 128 correlators (not shown) and accumulators (not shown), and can perform the correlation process at the same time for 128 phases. The correlator has a configuration for performing the coherent process. The accumulator has a configuration for performing the incoherent process.

(Main Software Configuration of Terminal 3020)

Figure 43:
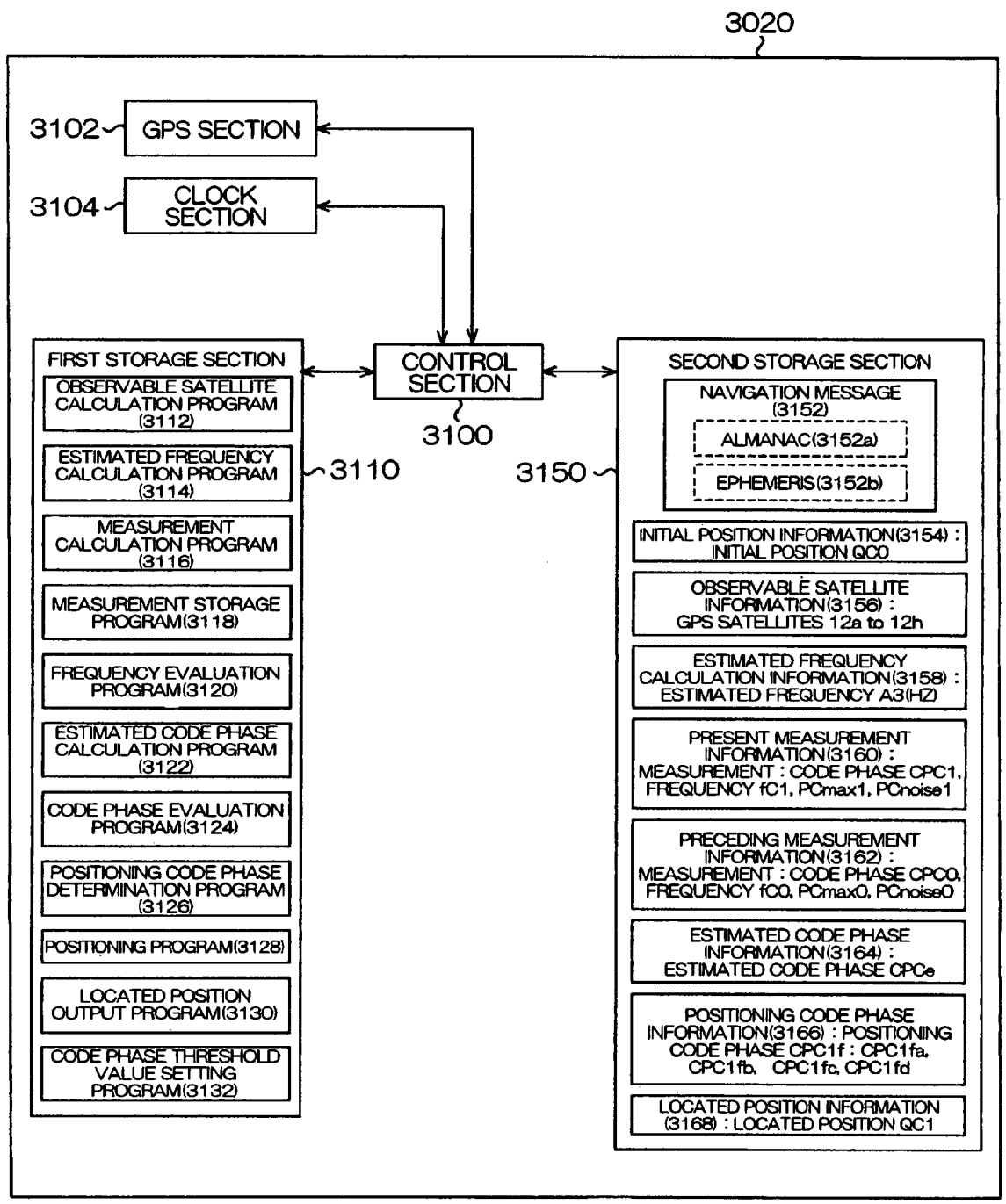
FIG. 43 is a schematic view showing the main software configuration of the terminal according to the third embodiment.

FIG. 43 is a schematic view showing the main software configuration of the terminal 3020.

As shown in FIG. 43, the terminal 3020 includes a control section 3100 which controls each section, a GPS section 3102 corresponding to the terminal GPS device 3032 shown in FIG. 41, a clock section 3104 corresponding to the clock 3038, and the like.

The terminal 3020 also includes a first storage section 3110 which stores various programs, and a second storage section 3150 which stores various types of information.

As shown in FIG. 43, the terminal 3020 stores navigation message 3152 in the second storage section 3150. The navigation message 3152 includes an almanac 3152*a* and an ephemeris 3152*b*.

The terminal 3020 uses the almanac 3152*a* and the ephemeris 3152*b* for positioning.

As shown in FIG. 43, the terminal 3020 stores initial position information 3154 in the second storage section 3150. The initial position QC0 is the preceding located position, for example.

As shown in FIG. 43, the terminal 3020 stores an observable satellite calculation program 3112 in the first storage section 3110. The observable satellite calculation program 3112 is a program for causing the control section 3100 to calculate the observable GPS satellites 12*a* and the like based on the initial position QC0 indicated by initial position information 3154.

In more detail, the control section 3100 determines the GPS satellites 12*a* and the like which can be observed at the present time measured by the clock section 3104 referring to the almanac 3152*a*. The control section 3100 stores observable satellite information 3156 indicating the observable GPS satellites 12*a* and the like (hereinafter called "observable satellite") in the second storage section 3150. In the third embodiment, the observable satellites are the GPS satellites 12*a* to 12*h* (see FIGS. 35 and 43).

As shown in FIG. 43, the terminal 3020 stores an estimated frequency calculation program 3114 in the first storage section 3110. The estimated frequency calculation program 3114 is a program for causing the control section 3100 to estimate the reception frequency of the radio waves S1 and the like from the GPS satellites 12*a* and the like.

The reception frequency is the arrival frequency when the radio wave S1 reaches the terminal 3020. In more detail, the reception frequency is the intermediate (IF) frequency when the radio wave S1 reaches the terminal 3020 and is down-converted in the terminal 3020.

FIG. 44 is a view illustrative of the estimated frequency calculation program 3114.

As shown in FIG. 44, the control section 3100 adds a Doppler shift H2 to a transmission frequency H1 from the GPS satellites 12*a* and the like to calculate an estimated frequency A3. The transmission frequency H1 of the GPS satellites 12*a* and the like is known (e.g. 1575.42 MHz).

The Doppler shift H2 occurs due to the relative movement between each of the GPS satellites 12*a* and the like and the terminal 3020. The control section 3100 calculates the line-of-sight velocity (velocity in the direction of the terminal 3020) of each of the GPS satellites 12*a* and the like at the present time using the ephemeris 3152*b* and the initial position QC0. The control section 2100 calculates the Doppler shift H2 based on the line-of-sight velocity.

The control section 3100 calculates the estimated frequency A3 in units of the GPS satellites 12*a* and the like (observable satellites).

The estimated frequency A3 includes an error of the drift of a clock (reference oscillator: not shown) of the terminal 3020. The term "drift" refers to a change in oscillation frequency due to a change in temperature.

Therefore, the control section 3100 searches for the radio waves S1 and the like around the estimated frequency A3 within a frequency range with a specific width. For example, the control section 3100 searches for the radio waves S1 and the like at intervals of 100 Hz within the range from (A3−100) kHz to (A3+100) kHz.

As shown in FIG. 43, the terminal 3020 stores a measurement calculation program 3116 in the first storage section 3110. The measurement calculation program 3116 is a program for causing the control section 3100 to perform the correlation process of the C/A code received from the GPS satellites 12*a* and the like and the C/A code replica generated by the terminal 3020 to calculate measurements including the maximum correlation cumulative value Pmax, the correlation cumulative value Pnoise of noise, the candidate code phase, and the reception frequency. The measurement calculation program 3116 and the control section 3100 exemplify a phase calculation section, and also exemplify a reception frequency determination section.

Figure 45A:
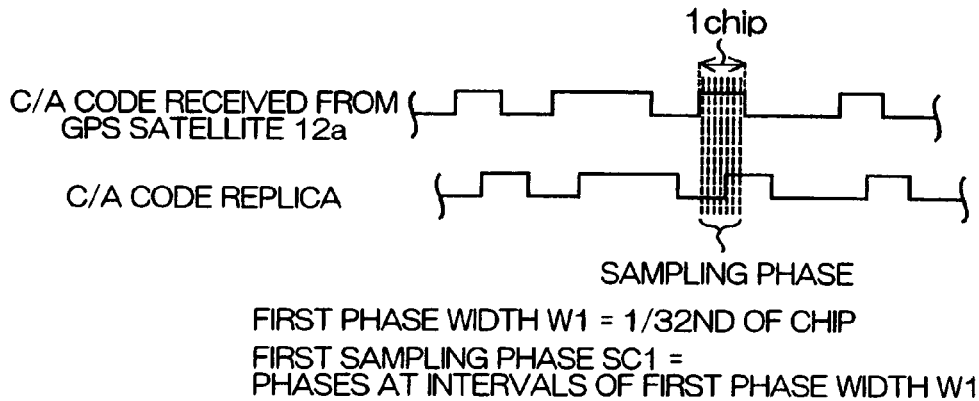
FIGS. 45A to 45C are views illustrative of a measurement calculation program according to the third embodiment.
Figure 45B:
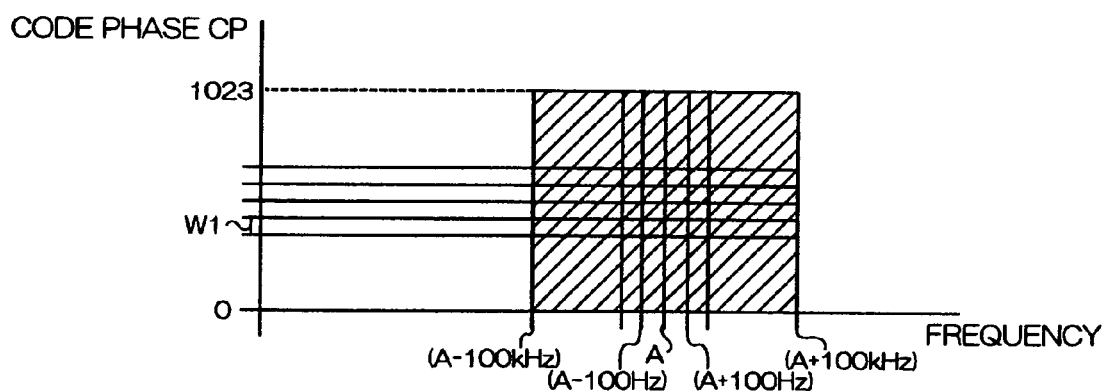
Figure 45C:
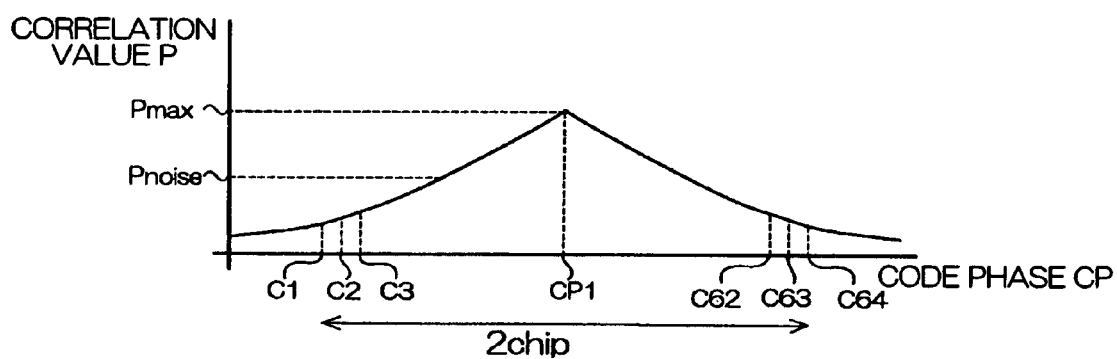

FIGS. 45A to 45C are views illustrative of the measurement calculation program 3116.

As shown in FIG. 45A, the control section 3100 equally divides one chip of the C/A code using the baseband section 3032*b*, and performs the correlation process, for example. One chip of the C/A code is equally divided into 32 sections, for example. Specifically, the control section 3100 performs the correlation process at intervals of a phase width of $\frac{1}{32}$nd of the chip (first phase width W1). The phases at intervals of the first phase width W1 when the control section 3100 performs the correlation process are called first sampling phases SC1.

The first phase width W1 is specified as a phase width which allows detection of the maximum correlation value Pmax if the signal strength when the radio waves S1 and the like reach the terminal 3020 is −155 dBm or more. A simulation revealed that the maximum correlation value Pmax can be detected when the signal strength is −155 dBm or more by using a phase width of $\frac{1}{32}$nd of the chip, even if the electric field is weak.

As shown in FIG. 45B, the control section 3100 performs the correlation process within the frequency range of ±100 kHz around the estimated frequency A3 at intervals of the first phase width W1. The control section 3100 performs the correlation process while changing the frequency by 100 Hz.

As shown in FIG. 45C, the correlation cumulative values P corresponding to phases C1 to C64 of two chips are output from the baseband section 3032*b*. Each of the phases C1 to C64 is the first sampling phase SC1.

The control section 3100 searches for the first chip to the 1023rd chip of the C/A code based on the measurement calculation program 3116, for example.

The control section 3100 calculates the signal strength XPR based on the correlation cumulative values Pmax and Pnoise, and uses a code phase CPC1, a reception frequency fC1, and correlation cumulative values PCmax1 and PCnoise1 corresponding to the highest signal strength XPR as the present measurement information 3160. The code phase CPC1, the reception frequency fC1, and the correlation cumulative values PCmax1 and PCnoise1 are each generically called a measurement. The terminal 3020 calculates the measurements in units of the GPS satellites 12*a* and the like.

The code phase CPC1 is converted into distance. Since the code length of the C/A code is 300 kilometers (km), for example, the code phase which is the fraction portion of the C/A code can be converted into distance.

The control section 3100 calculates the measurements for each of six GPS satellites 12*a* and the like among the observable satellites, for example. The measurements of a single GPS satellite 12*a* or the like are called corresponding measurements. For example, the code phase CPC1 of the GPS satellite 12a and the frequency fC1 of the GPS satellite 12a are corresponding measurements. The frequency fC1 is the reception frequency when receiving the radio wave S1 from the GPS satellite 12a.

A narrow correlator method (see JP-A-2000-312163, for example) may be employed as the method of the correlation process, differing from the third embodiment.

As shown in FIG. 43, the terminal 3020 stores a measurement storage program 3118 in the first storage section 3110. The measurement storage program 3118 is a program for causing the control section 3100 to store the measurements in the second storage section 3150.

The control section 3100 stores new measurements in the second storage section 3150 as the present measurement information 3160, and stores the existing present measurement information 3160 in the second storage section 3150 as preceding measurement information 3162. The preceding measurement information 3162 includes the code phase CPC0, the frequency fC0, and the correlation cumulative values PCmax0 and PCnoise0 during the preceding positioning.

As shown in FIG. 43, the terminal 3020 stores a frequency evaluation program 3120 in the first storage section 3110. The frequency evaluation program 3120 is a program for causing the control section 3100 to determine whether or not the difference between the reception frequency fC0 during the preceding positioning and the reception frequency fC1 during the present positioning is equal to or less than a frequency threshold value α3. A range equal to or less than the frequency threshold value α3 is specified in advance by a threshold value less than the frequency interval between the frequency sequences F1, F2, and F3. When the frequency interval is 50 Hz, as described above, the frequency threshold value α3 is 30 Hz, for example. The frequency evaluation program 3120 and the control section 3100 exemplify a frequency difference evaluation section. A range equal to or less than the frequency threshold value α3 exemplifies a frequency difference allowable range specified in advance.

As shown in FIG. 43, the terminal 3020 stores an estimated code phase calculation program 3122 in the first storage section 3110. The estimated code phase calculation program 3122 is a program for causing the control section 3100 to estimate the present phase and calculate an estimated code phase CPCe based on the code phase CPC0 during the preceding positioning, the Doppler shift of the radio waves S1 and the like, and an elapsed time dt from the preceding positioning time. The estimated code phase CPCe exemplifies an estimated phase. The estimated code phase calculation program 3122 and the control section 3100 exemplify an estimated phase calculation section.

The estimated code phase CPCe is converted into distance.

Figure 46:
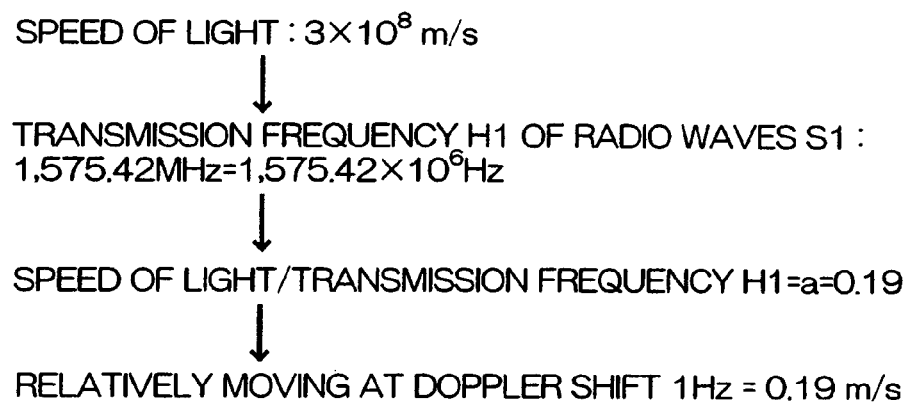
FIG. 46 is a view illustrative of an estimated code phase calculation program according to the third embodiment.

FIG. 46 is a view illustrative of the estimated code phase calculation program 3122.

As shown in FIG. 46, the control section 3100 calculates the estimated code phase CPCe using the expression 3, for example.

As indicated by the expression 3, the control section 3100 calculates the estimated code phase CPCe by subtracting a value obtained by multiplying the relative moving velocity between the GPS satellite 12a and the terminal 3020 by the elapsed time dt from the preceding positioning from the code phase CPC0 during the preceding positioning, for example.

In the expression 3, the estimated code phase CPCe and the preceding code phase CPC0 are converted into distance.

The radio waves S1 and the like propagate at the speed of light. Therefore, an approximate velocity corresponding to a Doppler shift of 1 Hz can be calculated by dividing the speed of light by the transmission frequency H1 of the radio waves S1 and the like. Specifically, when the Doppler shift is +1 Hz, the GPS satellite 12a approaches the terminal 3020 at 0.19 meters per second (m/s). Therefore, the estimated code phase CPCe becomes shorter than the code phase CPC0 during the preceding positioning. The Doppler shift is the difference between the frequency fC0 during the preceding positioning and the transmission frequency H1, for example.

On the other hand, when the Doppler shift is −1 Hz, the GPS satellite 12a moves away from the terminal 3020 at 0.19 meters per second (m/s). Therefore, the estimated code phase CPCe becomes longer than the code phase CPC0 during the preceding positioning.

Note that the expression 3 is satisfied provided that the time elapsed from the preceding positioning is short. In other words, the expression 3 is satisfied when the relationship between the code phase and the elapsed time can be indicated by a straight line on a graph.

The average value of the difference between the frequency fC0 during the preceding positioning and the transmission frequency H1 and the difference between the frequency fC1 during the present positioning and the transmission frequency H1 may be used as the Doppler shift, differing from the third embodiment. This allows the estimated code phase CPCe to be calculated more accurately.

The control section 3100 stores estimated code phase information 3164 indicating the calculated estimated code phase CPCe in the second storage section 3150.

As shown in FIG. 43, the terminal 3020 stores a code phase evaluation program 3124 in the first storage section 3110. The code phase evaluation program 3124 is a program for causing the control section 3100 to determine whether or not the difference between the present code phase CPC1 and the estimated code phase CPCe is equal to or less than a code phase threshold value β3 (hereinafter called "threshold value β3"). A range equal to or less than the threshold value β3 exemplifies a phase difference allowable range. The code phase evaluation program 3124 and the control section 3100 exemplify a phase difference evaluation section.

The threshold value β3 is specified in advance. The threshold value β3 is 80 meters (m), for example.

The control section 3100 uses the code phase CPC1, which is determined to have a frequency difference equal to or less than the threshold value α3 based on the frequency evaluation program 3120, for determination based on the code phase evaluation program 3124.

As shown in FIG. 43, the terminal 3020 stores a positioning code phase determination program 3126 in the first storage section 3110. The positioning code phase determination program 3126 is a program for causing the control section 3100 to determine the code phase CPC1 and the like of the GPS satellites 12a and the like having a frequency difference equal to or less than the frequency threshold value α3 and a code phase difference equal to or less than the threshold value β3 to be a positioning code phase CPC1f.

The control section 3100 excludes the code phases CPC1 and the like of the GPS satellites 12a and the like corresponding to a frequency difference which is not equal to or less than the frequency threshold value α3 from the positioning code phase CPC1f used for positioning. The control section 3100 uses the code phase CPC1 corresponding to a frequency difference equal to or less than the frequency threshold value α3 and a code phase difference equal to or less than the threshold value β3 for positioning. Specifically, the positioning code phase determination program 3126 and the control section 3100 exemplify a phase exclusion section.

In the third embodiment, the positioning code phases CPC1$f$ include the code phases CPC1$fa$, CPC1$fb$, CPC1$fc$, and CPC1$fd$ respectively corresponding to the GPS satellites 12*a*, 12*b*, 12*c*, and 12*d*, for example.

The control section 3100 stores positioning code phase information 3166 indicating the positioning code phase CPC1$f$ in the second storage section 3150.

In this embodiment, the term "uses the code phase CPC1 for positioning" is synonymous with the term "sets the code phase CPC1 to be the positioning code phase CPC1$f$".

As shown in FIG. 43, the terminal 3020 stores a positioning program 3128 in the first storage section 3110. The positioning program 3128 is a program for causing the control section 3100 to locate the present position using the positioning code phase CPC1$f$. The positioning program 3128 and the control section 3100 exemplify a positioning section.

The positioning code phase CPC1$f$ is the code phase CPC1 or the like having a value equal to or less than the threshold value $\beta 3$. Specifically, the term "locate the present position using the positioning code phase CPC1$f$" is synonymous with "locate the present position using the code phase CPC1 or the like having a value equal to or less than the threshold value $\beta 3$".

When the number of positioning code phases CPC1$f$ is three or more, the control section 3100 locates the present position using the positioning code phases CPC1$f$ to calculate the located position QC1.

The control section 3100 stores located position information 3168 indicating the calculated located position QC1 in the second storage section 3150.

As shown in FIG. 43, the terminal 3020 stores a located position output program 3130 in the first storage section 3110. The located position output program 3130 is a program for causing the control section 3100 to display the located position QC1 on the display device 3034 (see FIG. 41).

As shown in FIG. 43, the terminal 3020 stores a code phase threshold value setting program 3132 in the first storage section 3110. The code phase threshold value setting program 3132 is a program for causing the control section 3100 to determine the threshold value $\beta 3$ based on the reception state of the C/A code. The code phase threshold value setting program 3132 and the control section 3100 exemplify a phase difference allowable range determination section.

FIG. 47 is a view illustrative of the code phase threshold value setting program 3132.

The table shown in FIG. 47 is called a condition table.

The condition table includes a drift tendency 130*b*, a tracking satellite count 130*c*, a strong satellite existence 130*d*, a weak satellite existence 130*e*, a strong satellite ratio 130*f*, a weak satellite ratio 130*g*, an elapsed accumulation time 130*h*, and a code phase threshold value $\beta 3$.

The drift tendency 130*b*, the tracking satellite count 130*c*, the strong satellite existence 130*d*, the weak satellite existence 130*e*, the strong satellite ratio 130*f*, the weak satellite ratio 130*g*, and the elapsed accumulation time 130*h* exemplify the reception state of the C/A code. The drift tendency 130*b* and the like are generically called a reception state.

The condition table includes a positioning mode 130*a*. The positioning mode 130*a* includes a normal mode, a high sensitivity mode, and a movement mode.

The normal mode is a positioning mode in which the accumulation time is increased stepwise to 4 seconds (s), 8 seconds (s), 24 seconds (s), and the like when the initial accumulation time (incoherent time) is 1 second (s) and the signal strength of the C/A code is weak. The normal mode is suitable for the case where the strength of the signal input to the antenna 3033*a* of the GPS device 3032 is −150 dBM or more, for example.

The high sensitivity mode is a positioning mode in which the accumulation time is immediately increased to 24 seconds when the initial accumulation time (incoherent time) is 1 second (s) and the signal strength of the C/A code is weak. The high sensitivity mode is suitable for the case where the strength of the signal input to the antenna 3033*a* of the GPS device 3032 is less than −150 dBM, for example.

The movement mode is a positioning mode in which the initial accumulation time is fixed at 1 second (s). The movement mode is suitable for the case where the terminal 3020 moves.

The condition table includes the drift tendency 130*b*. The term "drift" refers to a change in the frequency of the reference clock (not shown) of the terminal 3020 due to a change in temperature. The accuracy of the measurements calculated by the terminal 3020 increases as the drift decreases. The drift may be calculated by preliminary positioning using three or more GPS satellites 12*a* and the like. The time error of the terminal 3020 can be calculated by preliminary positioning. The drift can be calculated based on the time error.

The drift tendency 130*b* is information indicating whether or not the frequency error with respect to the frequency setting value is within ±50 Hz.

The terminal 3020 determines that the drift is definite (drift tendency is present) when the frequency error with respect to the frequency setting value is within ±50 Hz.

The terminal 3020 determines that the drift is definite (drift tendency is present) when the frequency error with respect to the frequency setting value is not within ±50 Hz.

A frequency range within ±50 Hz exemplifies a drift allowable range specified in advance.

The terminal 3020 determines that the drift is definite when the frequency error with respect to the frequency setting value is within ±50 Hz, as described above. The error range is specified as a range less than the measurement calculation frequency step (see FIG. 45B).

The condition table includes the tracking satellite count 130*c*. The tracking satellite count 130*c* is the number of GPS satellites 12*a* and the like from which the terminal 3020 continuously receives the radio waves S1 and the like.

The condition table includes the strong satellite existence 130*d*. The strong satellite existence 130*d* indicates whether or not the GPS satellites 12*a* and the like with a signal strength XPR of 0.7 or more (hereinafter called "strong satellite") exist.

The terminal 3020 determines that a strong satellite exists when at least one strong satellite exists.

The terminal 3020 determines that a strong satellite does not exist when no strong satellite exists.

The condition table includes the weak satellite existence 130*e*. The weak satellite existence 130*e* indicates whether or not the GPS satellites 12*a* and the like with a signal strength XPR of 0.4 or less (hereinafter called "weak satellite") exist.

The terminal 3020 determines that a weak satellite exists when at least one weak satellite exists.

The terminal 3020 determines that a weak satellite does not exist when no weak satellite exists.

The condition table includes the strong satellite majority 130*f*. The strong satellite majority 130*f* indicates whether or not all of the GPS satellites 12*a* and the like tracked by the terminal 3020 are strong satellites.

The terminal 3020 determines that the result is "YES" when all of the GPS satellites 12*a* and the like tracked by the terminal 3020 are strong satellites.

The terminal 3020 determines that the result is "NO" when one or more of the GPS satellites 12*a* and the like tracked by the terminal 3020 are not strong satellites.

The condition table includes the weak satellite majority 130*g*. The weak satellite majority 130*g* indicates whether or not all of the GPS satellites 12*a* and the like tracked by the terminal 3020 are weak satellites.

The terminal 3020 determines that the result is "YES" when all of the GPS satellites 12*a* and the like tracked by the terminal 3020 are weak satellites.

The terminal 3020 determines that the result is "NO" when one or more of the GPS satellites 12*a* and the like tracked by the terminal 3020 are not weak satellites.

The condition table includes the elapsed accumulation time 130*h*. The elapsed accumulation time 130*h* indicates whether or not the elapsed time from the commencement of the incoherent process to the present time (hereinafter called "elapsed accumulation time") is equal to or less than a time threshold value (e.g. 12 seconds (s)). The term "the elapsed time from the commencement of the incoherent process to the present time" is synonymous with the term "elapsed time after the commencement of the correlation process".

The terminal 3020 determines that the result is "YES" when the elapsed accumulation time is equal to or less than 12 seconds (s).

The terminal 3020 determines that the result is "NO" when the elapsed accumulation time is longer than 12 seconds (s).

In general, the signal strength XPR and the accuracy of the code phase CPC1 increase as the elapsed accumulation time increases. Therefore, the time threshold value is specified depending on the accuracy of the code phase CPC1 required corresponding to the positioning accuracy.

The control section 3100 sets the code phase threshold value $\beta 3$ based on conditions such as the positioning mode 130*a* included in the condition table.

For example, when the positioning mode is the normal mode, the drift tendency 130*b* is "present", the tracking satellite count 130*c* is eight or more, the strong satellite existence 130*d* is "present", the strong satellite majority 130*f* is "YES", and the elapsed accumulation time 130*h* is "YES" (Cond1), the control section 3100 sets the code phase threshold value $\beta 3$ at the minimum value (e.g. 19 meters (m)).

Since the number of GPS satellites 12*a* and the like tracked by the terminal 3020 is sufficiently large and the signal strength XPR is excellent under the condition Cond1, the positioning accuracy is increased by setting the code phase threshold value $\beta 3$ at a small value.

The tracking satellite count of the condition Cond7 is smaller than that of the condition Cond1. In this case, the terminal 3020 sets the code phase threshold value $\beta 3$ at a value (e.g. 52 meters (m)) larger than that of the condition Cond1. This allows the GPS satellites which can be used for positioning to be secured in a number as large as possible, although the positioning accuracy deteriorates in comparison with the condition Cond1.

As described above, when the reception state is the same, the terminal 3020 sets the code phase threshold value $\beta 3$ at a smaller value as the number of GPS satellites 12*a* and the like tracked by the terminal 3020 increases, and sets the code phase threshold value $\beta 3$ at a larger value as the number of GPS satellites 12*a* and the like tracked by the terminal 3020 decreases.

For example, since the elapsed accumulation time 130*h* of the condition Cond3 is "NO", the accuracy of the code phase CPC1 is poor in comparison with the condition Cond1. Therefore, the terminal 3020 can ensure the code phases CPC1 in a number which allows positioning while minimizing deterioration in the positioning accuracy by setting the code phase threshold value $\beta 3$ at a value (e.g. 25 meters (m)) larger to some extent than that of the condition Cond1.

For example, since the tracking satellite count may be three (minimal number required for positioning) and the weak satellite majority 130*g* is "YES" in the condition Cond11, the number of GPS satellites 12*a* and the like may not reach the number required for positioning if the code phase threshold value $\beta 3$ is set at a small value. Therefore, the terminal 3020 ensures the code phases CPC1 in a number which allows positioning while limiting deterioration in the positioning accuracy within an allowable range by setting the code phase threshold value $\beta 3$ at a value (e.g. 80 meters (m)) larger than that of the condition Cond1 or Cond4.

In the third embodiment, the maximum value of the code phase $\beta$ is set at 80 meters (m). A length of 80 meters (m) is specified as a length equal to or less than the distance in which the code phase changes between the preceding positioning time and the present time when the terminal 3020 locates the position at intervals of 1 second (s) while moving with a high-speed mobile section such as a bullet train.

For example, since the positioning mode of the condition Cond23 is the movement mode, the arrival frequency of the radio waves S1 and the like which reach the terminal 3020 continuously changes due to the movement of the terminal 3020. Moreover, it is difficult to calculate a change in the arrival frequency. Therefore, the terminal 3020 ensures the code phases CPC1 in a number which allows positioning while allowing the positioning accuracy to deteriorate to an allowable limit by setting the code phase threshold value $\beta 3$ at a value (e.g. 80 meters (m)) larger than that of the condition Cond1 or Cond4.

The terminal 3020 is configured as described above.

The terminal 2020 can determine whether or not the difference between the present code phase CPC1 and the estimated code phase CPCe is equal to or less than the threshold value $\beta 3$ specified in advance. Therefore, the terminal 3020 can verify the accuracy of the code phase CPC1.

The terminal 3020 can locate the present position using the code phase CPC1 corresponding to a code phase difference equal to or less than the threshold value $\beta 3$.

Therefore, the terminal 3020 can verify the accuracy of the code phase of the positioning base code and accurately locate the position under a weak electric field in which the signal strength is weak.

The terminal 3020 can exclude the code phase CPC1 corresponding to the frequency fC1 outside the range equal to or less than the frequency threshold value $\alpha 3$ from positioning.

This means that the terminal 3020 can verify not only the accuracy of the code phase CPC1 of the C/A code, but also the accuracy of the reception frequency fC1 when calculating the code phase CPC1.

Therefore, the terminal 3020 can verify the accuracy of the code phase of the positioning base code and more accurately locate the position under a weak electric field in which the signal strength is weak.

The terminal 3020 can use only the code phase CPC1 with relatively high accuracy for positioning by reducing the code phase threshold value $\beta 3$ as the number of GPS satellites 12*a* and the like tracked by the terminal 3020 increases, for example.

Therefore, the terminal 3020 can locate the position using the code phase CPC1 with relatively high accuracy under a weak electric field in which the signal strength is weak.

The terminal 3020 can use only the code phase CPC1 with relatively high accuracy for positioning by reducing the code phase threshold value $\beta 3$ as the number of GPS satellites 12*a* and the like of which the signal strength XPR of the received C/A code is high increases, for example.

Therefore, the terminal 3020 can locate the position using the code phase CPC1 with relatively high accuracy under a weak electric field in which the signal strength is weak.

The terminal 3020 can use only the code phase CPC1 with relatively high accuracy for positioning by reducing the code phase threshold value β3 when the drift is within ±50 Hz, for example.

Therefore, the terminal 3020 can locate the position using the code phase CPC1 with relatively high accuracy under a weak electric field in which the signal strength is weak.

The terminal 3020 can use only the code phase CPC1 with relatively high accuracy for positioning by reducing the code phase threshold value β3 as the elapsed accumulation time increases, for example.

Therefore, the terminal 3020 can locate the position using the code phase CPC1 with relatively high accuracy under a weak electric field in which the signal strength is weak.

Since the terminal 3020 reduces the code phase threshold value β3 as the number of GPS satellites 12a and the like tracked by the terminal 3020 increases, the terminal 3020 can locate the position using the code phase CPC1 with high accuracy.

Since the terminal 3020 increases the code phase threshold value β3 as the number of GPS satellites 12a and the like tracked by the terminal 3020 decreases, the terminal 3020 can increase the possibility that the located position can be calculated.

The configuration of the terminal 3020 according to the third embodiment has been described above. An operation example of the terminal 3020 is described below mainly using FIG. 48.

Figure 48:
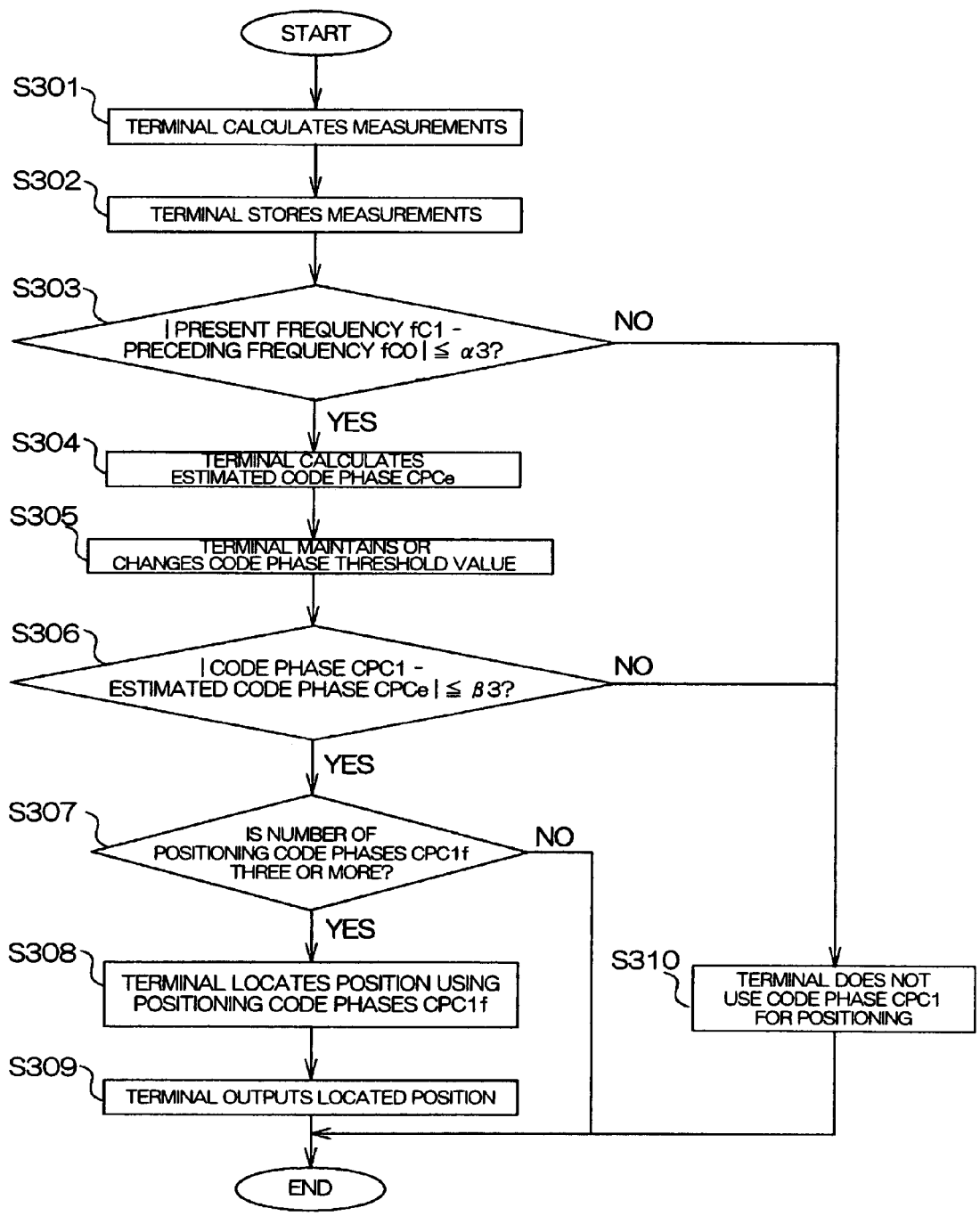
FIG. 48 is a schematic flowchart showing an operation example of the terminal according to the third embodiment.

FIG. 48 is a schematic flowchart showing an operation example of the terminal 3020.

The terminal 3020 receives the radio waves S1 and the like and calculates the measurements (step S301 in FIG. 47). The step S301 exemplifies a phase calculation step.

The terminal 3020 stores the measurements (step S302).

The terminal 3020 determines whether or not the absolute value of the difference between the present frequency fC1 and the preceding frequency fC0 is equal to or less than the frequency threshold value α3 (step S303).

The terminal 3020 does not use the code phase CPC1 corresponding to the frequency difference which has been determined to be greater than the frequency threshold value α3 in the step S303 for positioning (step S310). Specifically, the terminal 3020 does not use the code phase CPC1 as the positioning code phase CPC1f.

On the other hand, the terminal 3020 calculates the estimated code phase CPCe for the code phase CPC1 corresponding to the frequency difference which has been determined to be equal to or less than the frequency threshold value α3 in the step S303 (step S304). The step S304 exemplifies an estimated phase calculation step.

The terminal 3020 maintains or changes the code phase threshold value β3 (step S305). The step S305 exemplifies a phase difference allowable range determination step.

The terminal 3020 determines whether or not the absolute value of the difference between the code phase CPC1 and the estimated code phase CPCe is equal to or less than the threshold value β3 (step S306). The step S306 exemplifies a phase evaluation step. The terminal 3020 uses the code phase CPC1 of which the absolute value of the code phase difference has been determined to be equal to or less than the threshold value β3 as the positioning code phase CPC1f.

The terminal 3020 determines whether or not the number of positioning code phases CPC1f is three or more (step S307).

When the terminal 3020 has determined that the number of positioning code phases CPC1f is less than three in the step S307, the process is terminated since the position cannot be determined.

When the terminal 3020 has determined that the number of positioning code phases CPC1f is three or more in the step S307, the terminal 3020 locates the position using the positioning code phases CPC1f (step S308). The step S308 exemplifies a positioning step.

The terminal 3020 then outputs the located position QC1 (see FIG. 43) (step S309).

The above steps allow the terminal 3020 to verify the accuracy of the phase of the positioning base code and accurately locate the position under a weak electric field in which the signal strength is weak.

The invention is not limited to the above embodiments.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning device comprising:
a phase calculation section which performs a correlation process of a specific positioning base code replica and a positioning base code from a specific transmission source to calculate a present phase of the positioning base code;
an estimated phase calculation section which calculates an estimated phase when estimating the present phase based on the phase used during preceding positioning, a Doppler shift of a frequency of a radio wave carrying the positioning base code, and an elapsed time from the preceding positioning;
a phase difference evaluation section which determines whether or not a phase difference between the phase calculated by the phase calculation section and the estimated phase is within a specific phase difference allowable range; and
a positioning section which locates a present position using the phase corresponding to the phase difference within the phase difference allowable range.

2. The positioning device as defined in claim 1,
wherein the phase calculation section calculates the phase using a plurality of frequency sequences; and
wherein the phase difference evaluation section determines whether or not a phase difference between the phase calculated using one of the frequency sequences of which a signal strength of the positioning base code is maximum and the estimated phase is within the phase difference allowable range.

3. The positioning device as defined in claim 1,
wherein the phase calculation section calculates the phase of the positioning base code by performing the correlation process of the specific positioning base code replica and the positioning base code from the transmission source using at least one frequency sequence in units of the transmission sources;
wherein the positioning section includes:
a phase selection section which selects the phase of which the phase difference is minimum from the phases corresponding to the phase difference within the phase difference allowable range as a selected phase in units of the transmission sources;

a selected phase first evaluation section which determines whether or not a signal strength of the selected phase is maximum; and a selected phase second evaluation section which determines whether or not a number of times that the phase calculated using the frequency sequence to which the selected phase belongs has continuously fallen within the phase difference allowable range is within a predetermined count range specified in advance; and wherein the positioning section locates the present position using the selected phase when a determination result of the selected phase first evaluation section and/or a determination result of the selected phase second evaluation section is YES.

4. The positioning device as defined in claim 3, wherein the estimated phase calculation section calculates the estimated phase using the phase obtained during the preceding positioning and obtained when the correlation process has completed.

5. The positioning device as defined in claim 1, comprising:

a reception frequency determination section which specifies a reception frequency when receiving the radio wave carrying the positioning base code;

a frequency difference evaluation section which determines whether or not a frequency difference between the reception frequency during the preceding positioning and the present reception frequency is within a frequency difference allowable range specified in advance; and a phase exclusion section which excludes the phase of the positioning base code corresponding to the frequency difference outside the frequency difference allowable range from positioning.

6. The positioning device as defined in claim 2, comprising:

a reception frequency determination section which specifies a reception frequency when receiving the radio wave carrying the positioning base code;

a frequency difference evaluation section which determines whether or not a frequency difference between the reception frequency during the preceding positioning and the present reception frequency is within a frequency difference allowable range specified in advance; and a phase exclusion section which excludes the phase of the positioning base code corresponding to the frequency difference outside the frequency difference allowable range from positioning;

wherein the frequency sequences differ by a frequency interval specified in advance; and wherein the frequency difference allowable range is specified by a threshold value less than the frequency interval.

7. The positioning device as defined in claim 3, comprising:

a reception frequency determination section which specifies a reception frequency when receiving the radio wave carrying the positioning base code;

a frequency difference evaluation section which determines whether or not a frequency difference between the reception frequency during the preceding positioning and the present reception frequency is within a frequency difference allowable range specified in advance; and a phase exclusion section which excludes the phase of the positioning base code corresponding to the frequency difference outside the frequency difference allowable range from positioning;

wherein the frequency sequences differ by a frequency interval specified in advance; and wherein the frequency difference allowable range is specified by a threshold value less than the frequency interval.

8. The positioning device as defined in claim 1, comprising:

a phase difference allowable range determination section which determines the phase difference allowable range based on a reception state of the positioning base code;

wherein the phase difference evaluation section determines whether or not the phase difference is within the determined phase difference allowable range.

9. The positioning device as defined in claim 8, wherein the reception state includes a number of the transmission sources from which the positioning device receives the positioning base code.

10. The positioning device as defined in claim 8, wherein the reception state includes a signal strength of the positioning base code received by the positioning device.

11. The positioning device as defined in claim 8, wherein the reception state includes information indicating whether or not a drift of a reference clock of the positioning device is within a drift allowable range specified in advance.

12. The positioning device as defined in claim 8, wherein the reception state includes information indicating an elapsed time from commencement of the correlation process.

13. The positioning device as defined in claim 8, wherein the phase difference allowable range determination section decreases the phase difference allowable range as a number of the transmission sources from which the positioning device receives the positioning base code increases, and increases the phase difference allowable range as the number of the transmission sources from which the positioning device receives the positioning base code decreases.

14. The positioning device as defined in claim 1, wherein the transmission source is a satellite positioning system (SPS) satellite.

15. A positioning control method comprising:

performing a correlation process on a specific positioning base code replica and a positioning base code transmitted from a specific transmission source to calculate a phase of the positioning base code;

calculating an estimated phase when estimating the present phase based on the phase used during preceding positioning, a Doppler shift of a frequency of a radio wave that carries the positioning base code, and an elapsed time from the preceding positioning;

determining whether or not a phase difference between the phase that has been calculated and the estimated phase is within a phase difference allowable range specified in advance; and locating a present position using the phase corresponding to the phase difference within the phase difference allowable range.

16. The positioning control method as defined in claim 15, wherein the phase of the positioning base code is calculated by performing the correlation process on the specific positioning base code replica and the positioning base code from the transmission source using at least one frequency sequence in units of transmission sources, locating the present position includes
- selecting the phase of which the phase difference is minimum from the phases corresponding to the phase difference within the phase difference allowable range in units of the transmission sources,
- determining whether or not the signal strength of the selected phase is maximum,
- determining whether or not the number of times that the phase calculated using the frequency sequence to which the selected phase belongs has continuously fallen within the phase difference allowable range is within a predetermined count range specified in advance, and
- the present position is located using the selected phase when a determination result of determining whether or not the signal strength of the selected phase is maximum and/or a determination result of determining whether or not the number of times that the phase calculated using the frequency sequence to which the selected phase belongs has continuously fallen within the phase difference allowable range is within the predetermined count range specified in advance is YES.

17. The positioning control method as defined in claim 15, further comprising:
- determining the phase difference allowable range based on a reception state of the positioning base code, and
- determining whether or not the phase difference is within the determined phase difference allowable range.

18. A computer-readable recording medium having a positioning control program recorded thereon, the positioning control program comprising:
- code for performing a correlation process on a specific positioning base code replica and a positioning base code transmitted from a specific transmission source to calculate a phase of the positioning base code;
- code for calculating an estimated phase when estimating the present phase based on the phase used during preceding positioning, a Doppler shift of a frequency of a radio wave that carries the positioning base code, and an elapsed time from the preceding positioning;
- code for determining whether or not a phase difference between the phase that has been calculated and the estimated phase is within a phase difference allowable range specified in advance; and
- code for locating a present position using the phase corresponding to the phase difference within the phase difference allowable range.

19. The recording medium as defined in claim 18, wherein
- the phase of the positioning base code is calculated by performing the correlation process on the specific positioning base code replica and the positioning base code transmitted from the transmission source using at least one frequency sequence in units of the transmission sources,
- code for locating the present position includes
  - code for selecting the phase of which the phase difference is minimum from the phases corresponding to the phase difference within the phase difference allowable range in units of the transmission sources,
  - code for determining whether or not the signal strength of the selected phase is maximum,
  - code for determining whether or not the number of times that the phase calculated using the frequency sequence to which the selected phase belongs has continuously fallen within the phase difference allowable range is within a predetermined count range specified in advance, and
- the present position is located using the selected phase when a determination result of determining whether or not the signal strength of the selected phase is maximum and/or a determination result of determining whether or not the number of times that the phase calculated using the frequency sequence to which the selected phase belongs has continuously fallen within the phase difference allowable range is within a predetermined count range specified in advance is YES.

20. The recording medium as defined in claim 18, further comprising
- code for determining the phase difference allowable range based on a reception state of the positioning base code, and
- code for determining whether or not the phase difference is within the determined phase difference allowable range.

* * * * *